(12) United States Patent
Kawamura

(10) Patent No.: US 11,327,282 B2
(45) Date of Patent: May 10, 2022

(54) ZOOM LENS AND IMAGING APPARATUS

(71) Applicant: FUJIFILM Corporation, Tokyo (JP)

(72) Inventor: Daiki Kawamura, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/490,843

(22) Filed: Sep. 30, 2021

(65) Prior Publication Data

US 2022/0035143 A1 Feb. 3, 2022

Related U.S. Application Data

(63) Continuation of application No. 17/139,202, filed on Dec. 31, 2020, which is a continuation of application
(Continued)

(30) Foreign Application Priority Data

Mar. 29, 2018 (JP) .............................. JP2018-064597

(51) Int. Cl.
*G02B 15/14* (2006.01)
*G02B 15/163* (2006.01)
(Continued)

(52) U.S. Cl.
CPC ......... *G02B 15/163* (2013.01); *G02B 15/177* (2013.01); *G02B 5/005* (2013.01);
(Continued)

(58) Field of Classification Search
CPC ............ G02B 13/0045; G02B 27/0025; G02B 13/18; G02B 9/60; G02B 5/005;
(Continued)

(56) References Cited

U.S. PATENT DOCUMENTS 5,805,349 A * 9/1998 Sato ....................... G02B 13/04
359/679
9,696,520 B2 * 7/2017 Liang ................. G02B 13/0045
(Continued)

FOREIGN PATENT DOCUMENTS

CN 202453576 U 9/2012
JP 2008233284 A 10/2008
(Continued)

OTHER PUBLICATIONS

An Office Action; "Notice of Reasons for Refusal", mailed by the Japanese Patent Office dated Nov. 4, 2020, which corresponds to Japanese Patent Application No. 2018-064597 and is related to U.S. Appl. No. 16/355,942; with English language translation.
(Continued)

*Primary Examiner* — Evelyn A Lester
(74) *Attorney, Agent, or Firm* — Studebaker & Brackett PC

(57) ABSTRACT

A zoom lens includes a negative first lens group, a positive second lens group, and a subsequent lens group in order from an object side. A focusing lens group closer to an image side than the first lens group moves during focusing. The first lens group consists of a first-a lens group and a first-b lens group in order from the object side. Assuming that an average of refractive indices of the negative lenses of the first-a lens group is Nd1ave, a focal length of the focusing lens group is ff, and a focal length of the first lens group is f1, Conditional Expression (1) of 1.73<Nd1ave<1.95 and Conditional Expression (2) of 1<|ff/f1|<3 are satisfied.

30 Claims, 24 Drawing Sheets

Related U.S. Application Data

No. 16/355,942, filed on Mar. 18, 2019, now Pat. No. 10,914,929.

(51) Int. Cl.
| | |
|---|---|
| *G02B 15/177* | (2006.01) |
| *G02B 13/00* | (2006.01) |
| *G02B 9/62* | (2006.01) |
| *G02B 27/00* | (2006.01) |
| *G02B 9/60* | (2006.01) |
| *G02B 13/18* | (2006.01) |
| *G02B 9/34* | (2006.01) |
| *G02B 5/00* | (2006.01) |
| *G02B 15/20* | (2006.01) |
| *G02B 13/04* | (2006.01) |

(52) U.S. Cl.
CPC .............. *G02B 9/34* (2013.01); *G02B 9/60* (2013.01); *G02B 9/62* (2013.01); *G02B 13/009* (2013.01); *G02B 13/0045* (2013.01); *G02B 13/04* (2013.01); *G02B 13/18* (2013.01); *G02B 15/14* (2013.01); *G02B 15/20* (2013.01); *G02B 27/0025* (2013.01)

(58) Field of Classification Search
CPC .... G02B 13/04; G02B 15/177; G02B 13/009; G02B 9/34; G02B 15/20; G02B 15/14; G02B 15/163
USPC ........ 359/676, 680, 682–689, 713–716, 740, 359/761, 770, 781–783
See application file for complete search history.

(56) References Cited

U.S. PATENT DOCUMENTS

| | | | | |
|---|---|---|---|---|
| 9,823,452 | B2* | 11/2017 | Fujikura | ................. G02B 15/20 |
| 2006/0050406 | A1* | 3/2006 | Ishii | ..................... G02B 15/177 |
| | | | | 359/680 |
| 2006/0056054 | A1* | 3/2006 | Kashiki | ................. G02B 15/177 |
| | | | | 359/689 |
| 2009/0034091 | A1* | 2/2009 | Sakamoto | ........... G02B 15/173 |
| | | | | 359/687 |
| 2010/0053766 | A1 | 3/2010 | Okada | |
| 2010/0194969 | A1* | 8/2010 | Sakamoto | .......... H04N 5/23296 |
| | | | | 359/686 |
| 2010/0195216 | A1* | 8/2010 | Miyazaki | ............. G02B 15/177 |
| | | | | 359/686 |
| 2010/0196003 | A1* | 8/2010 | Miyazaki | ............... G03B 17/14 |
| | | | | 359/689 |
| 2012/0069440 | A1* | 3/2012 | Harada | .................. G03B 19/12 |
| | | | | 359/557 |
| 2014/0002908 | A1 | 1/2014 | Sugita | |
| 2016/0097920 | A1 | 4/2016 | Nakahara | |
| 2016/0124181 | A1 | 5/2016 | Noda et al. | |
| 2017/0068079 | A1 | 3/2017 | Kawamura et al. | |
| 2017/0293124 | A1 | 10/2017 | Kawamura | |
| 2019/0056571 | A1 | 2/2019 | Jang | |
| 2019/0302433 | A1* | 10/2019 | Kawamura | ............ G02B 15/20 |
| 2019/0306389 | A1* | 10/2019 | Kawamura | ........ H04N 5/23296 |

FOREIGN PATENT DOCUMENTS

| | | |
|---|---|---|
| JP | 2010060612 A | 3/2010 |
| JP | 2010176099 A | 8/2010 |
| JP | 2013015621 A | 1/2013 |
| JP | 2014010286 A | 1/2014 |
| JP | 2015138122 A | 7/2015 |
| JP | 2015203735 A | 11/2015 |
| JP | 2016075741 A | 5/2016 |
| JP | 2016090748 A | 5/2016 |
| JP | 2017122745 A | 7/2017 |
| JP | 2017187639 A | 10/2017 |

OTHER PUBLICATIONS

An Office Action mailed by China National Intellectual Property Administration dated Feb. 11, 2022, which corresponds to Chinese Patent Application No. 201910211741.7 and is related to U.S. Appl. No. 17/490,843; with English language translation.

* cited by examiner

EXAMPLE 5

EXAMPLE 9

EXAMPLE 10

EXAMPLE 1

EXAMPLE 2

EXAMPLE 3

EXAMPLE 4

EXAMPLE 5

EXAMPLE 6

EXAMPLE 7

EXAMPLE 8

EXAMPLE 9

EXAMPLE 10

EXAMPLE 11

ZOOM LENS AND IMAGING APPARATUS

CROSS-REFERENCE TO RELATED APPLICATIONS

The present application is a Continuation of U.S. patent application Ser. No. 17/139,202 filed Dec. 31, 2020, which is a Continuation of U.S. patent application Ser. No. 16/355,942 filed Mar. 18, 2019, which claims priority under 35 U.S.C. § 119 to Japanese Patent Application No. 2018-064597, filed on Mar. 29, 2018. The above application is hereby expressly incorporated by reference, in its entirety, into the present application.

BACKGROUND OF THE INVENTION

1. Field of the Invention

The present invention relates to a zoom lens and an imaging apparatus.

2. Description of the Related Art

In the related art, a wide-angle zoom lens is used as an imaging lens such as a digital camera. A configuration in which a first lens group having a negative refractive power, a second lens group having a positive refractive power, and a subsequent lens group are arranged in order from an object side to an image side has been known as a configuration of the wide-angle zoom lens. For example, in JP2016-090748A, JP2013-015621A, JP2015-203735A, and JP2015-138122A, a lens system having the same or similar configuration as or to the aforementioned configuration is described as a lens system considering a wide angle.

SUMMARY OF THE INVENTION

In recent years, there is an increasing need for a small-size imaging apparatus with a wide angle of view. To meet this need, it is necessary to achieve reduction in size of the first lens group of which a lens diameter is likely to be increased and is closest to the object side likely to be increased in lens diameter, reduction in size of a lens group (hereinafter, referred to as a focusing lens group) which moves during focusing, and reduction in size of the entire lens system including a decrease in movement amount of the focusing lens group.

However, in the zoom lens described in JP2016-090748A, a negative lens disposed so as to be closer to the object side within the first lens group is made of a low-dispersion material. Since the low-dispersion material has a low refractive index, an average refractive index of the first lens group becomes low, and thus, it is difficult to achieve the wide angle. For example, in a case where there is an attempt to achieve the wide angle while maintaining a condition in which the low-dispersion material described in JP2016-090748A is used, absolute values of radii of curvature of three negative lenses disposed so as to be close to the object side within the first lens group become small, and thus, aberration occurring in the first lens group is increased. Alternatively, the diameter of the lens constituting the first lens group becomes large.

In the zoom lens described in JP2013-015621A, the focusing lens group is disposed so as to be close to the image side within the first lens group. Since the outer diameter and weight of the lens disposed within the first lens group are large, a driving actuator is also large, and thus, the size of the entire imaging apparatus is increased. It is necessary to widen a distance between the focusing lens group and the lens group disposed so as to be close to the object side within the first lens group in order to secure a stroke for focusing, that is, the movement amount of the focusing lens group. However, in a case where this distance is widened, there is a problem that the outer diameter of the lens closest to the object side and the outer diameter of the lens disposed so as to be close to the object side within the first lens group become large. The zoom lens described in JP2013-015621A has also a problem that the movement amount of the focusing lens group is increased due to a low refractive power of the focusing lens group.

The zoom lens described in JP2015-203735A has a configuration in which the focusing lens group is disposed so as to be close to the image side within the lens group which is disposed so as to be closest to the object side and is fixed during zooming. The zoom lens described in JP2015-203735A has also a problem that the movement amount of the focusing lens group is increased due to the low refractive power of the focusing lens group.

In the zoom lens described in JP2015-138122A, the second lens group is the focusing lens group. However, there is a problem that the movement amount of the focusing lens group is increased due to the low refractive power of the focusing lens group.

The present invention has been made in view of the aforementioned circumstances, and an object of the present is to provide a small-size zoom lens having high optical performance while obtaining a wide angle of view and an imaging apparatus comprising the zoom lens.

In order to solve the problem, a zoom lens of the present invention consists of, in order from an object side to an image side, a first lens group having a negative refractive power, a second lens group having a positive refractive power, and a subsequent lens group. Mutual distances between the first lens group, the second lens group, and the subsequent lens group change due to movement of at least the first lens group and the second lens group during zooming, a focusing lens group disposed so as to be closer to the image side than the first lens group moves during focusing from an object at infinity from an object within a short range, the first lens group consists of, in order from the object side to the image side, a first-a lens group consisting of three negative lenses, and a first-b lens group including at least one negative lens and at least one positive lens, a distance between the first-a lens group and the first-b lens group does not change either during zooming or during focusing, and assuming that an average value of refractive indices of the three negative lenses of the first-a lens group at a d line is Nd1ave, a focal length of the focusing lens group is ff, and a focal length of the first lens group is f1, Conditional Expressions (1) and (2) are satisfied.

$$1.73 < Nd1\text{ave} < 1.95 \tag{1}$$

$$1 < |ff/f1| < 3 \tag{2}$$

In the zoom lens of the present invention, it is preferable that the focusing lens group consists of three or more lenses.

In the zoom lens of the present invention, it is preferable that assuming that a transverse magnification of the focusing lens group in a state in which the object at infinity at a wide-angle end is in focus is βfw, a combined transverse magnification of all the lenses closer to the image side than the focusing lens group in a state in which the object at infinity at the wide-angle end is in focus is βrw, and the βrw is 1 in a case where there is no lens disposed so as to be closer to the image side than the focusing lens group, Conditional Expression (3) is satisfied.

$$0.6<|(1-\beta fw^2)\times\beta rw^2|<2.3 \quad (3)$$

In the zoom lens of the present invention, it is preferable that the subsequent lens group includes a lens group which moves by changing a distance from the adjacent lens group during zooming and has a negative refractive power.

In the zoom lens of the present invention, it is preferable that the focusing lens group is a part of the subsequent lens group or the entire subsequent lens group. It is preferable that the focusing lens group has a negative refractive power.

In the zoom lens of the present invention, it is preferable that assuming that a minimum value of the refractive indices of the three negative lenses of the first-a lens group at the d line is Nd1amin, Conditional Expression (4) is satisfied.

$$1.52<Nd1amin<1.89 \quad (4)$$

In the zoom lens of the present invention, it is preferable that assuming that an Abbe number of at least one lens included in the focusing lens group with the d line as a reference is vdf, Conditional Expression (5) is satisfied.

$$60<vdf \quad (5)$$

In the zoom lens of the present invention, it is preferable that assuming that an Abbe number of at least one negative lens included in the first-b lens group with the d line as a reference is vd1bn, Conditional Expression (6) is satisfied.

$$60<vd1bn \quad (6)$$

In the zoom lens of the present invention, it is preferable that assuming that a refractive index of the lens disposed so as to be closest to the object side at the d line is Nd1, Conditional Expression (7) is satisfied.

$$1.7<Nd1<2.1 \quad (7)$$

In the zoom lens of the present invention, it is preferable that assuming that an on-axis air-equivalent distance from a lens surface closest to the image side to an image plane in a state in which the object at infinity at the wide-angle end is in focus is BFw, a focal length of the zoom lens in a state in which the object at infinity at the wide-angle end is in focus is fw, and a maximum half-angle of view in a state in which the object at infinity at the wide-angle end is in focus is ωw, Conditional Expression (8) is satisfied.

$$0.5<BFw/(fw\times\tan\omega w)<1.5 \quad (8)$$

In the zoom lens of the present invention, it is preferable that assuming that a maximum half-angle of view in a state in which the object at infinity at the wide-angle end is in focus is ωw and an open F number at the wide-angle end is FNow, Conditional Expression (9) is satisfied.

$$0.45<\tan\omega w/FNow<1 \quad (9)$$

In the zoom lens of the present invention, it is preferable that assuming that a radius of curvature of an object-side lens surface of the lens disposed so as to be closest to the object side is R1 and a radius of curvature of an image-side lens surface of the lens disposed so as to be closest to the object side is R2, Conditional Expression (10) is satisfied.

$$3.3<(R1+R2)/(R1-R2)<5.5 \quad (10)$$

In the zoom lens of the present invention, it is preferable that assuming that the focal length of the first lens group is f1 and a focal length of the second lens group is f2, Conditional Expression (11) is satisfied.

$$0.2<|f1/f2|<0.65 \quad (11)$$

In the zoom lens of the present invention, it is preferable that assuming that a focal length of the first-a lens group is f1a and a focal length of the first-b lens group is f1b, Conditional Expression (12) is satisfied.

$$0.02<|f1a/f1b|<0.15 \quad (12)$$

In the zoom lens of the present invention, it is preferable that the subsequent lens group includes a lens group closest to the image side, of which a distance from the adjacent lens group changes during zooming, and which has a positive refractive power.

In the zoom lens of the present invention, it is preferable that the lens group closest to the image side and has the positive refractive power within the subsequent lens group is fixed with respect to an image plane during zooming and during focusing.

In the zoom lens of the present invention, it is preferable that the subsequent lens group consists of an intermediate lens group which consists of one or two lens groups and has a positive refractive power as a whole, the focusing lens group having a negative refractive power, and a lens group having a positive refractive power in order from the object side to the image side, and a distance of each of the one or two lens groups within the intermediate lens group, the focusing lens group, and the lens group which is disposed so as to be closest to the image side and has the positive refractive power from the adjacent lens group changes during zooming.

In the zoom lens of the present invention, it is preferable that the first-b lens group is composed of two lenses consisting of a negative lens and a positive lens in order from the object side to the image side.

An imaging apparatus according to the present embodiment comprises the zoom lens according to the present invention.

In the present description, it should be noted that the terms "consisting of ~" and "consists of ~" mean that the imaging lens may include not only the above-mentioned elements but also lenses substantially having no refractive power, optical elements, which are not lenses, such as a stop, a filter, and a cover glass, and mechanism parts such as a lens flange, a lens barrel, an imaging element, and a camera shake correction mechanism in addition to the illustrated constituent elements.

In the present description, the term "~ group that has a positive refractive power" means that the group has a positive refractive power as a whole. Likewise, the term "~ group that has a negative refractive power" means that the group has a negative refractive power as a whole. The "lens having a positive refractive power" and the "positive lens" are synonymous. The "lens having a negative refractive power" and the "negative lens" are synonymous. The "lens group" is not limited to a configuration consisting of a plurality of lenses, and may consist of only one lens. It is assumed that a reference sign of a refractive power related to a lens including an aspherical surface, a surface shape of a lens surface, and a radius of curvature are considered in paraxial region unless otherwise noted. As a reference sign of a radius of curvature, a reference sign of a radius curvature of a surface having a shape in which a convex surface faces the object side is set to be positive, and a reference sign of a radius of curvature of a surface having a shape in which a convex surface faces the image side is set to be negative. The "focal length" used in Conditional Expressions is a paraxial focal length. The values in Conditional Expressions are values in a case where the d line is used as the reference. The "d line", "C line", "F line", and "g line" described in the present specification are bright lines. A wavelength of the d line is 587.56 nm (nanometers), a wavelength of the C line is 656.27 nm (nanometers), a wavelength of the F line is 486.13 nm (nanometers), and a wavelength of the g line is 435.84 nm (nanometers).

According to the present invention, it is possible to provide a small-size zoom lens having high optical performance while obtaining a wide angle of view and an imaging apparatus comprising the zoom lens.

DESCRIPTION OF THE PREFERRED EMBODIMENTS

Figure 1:
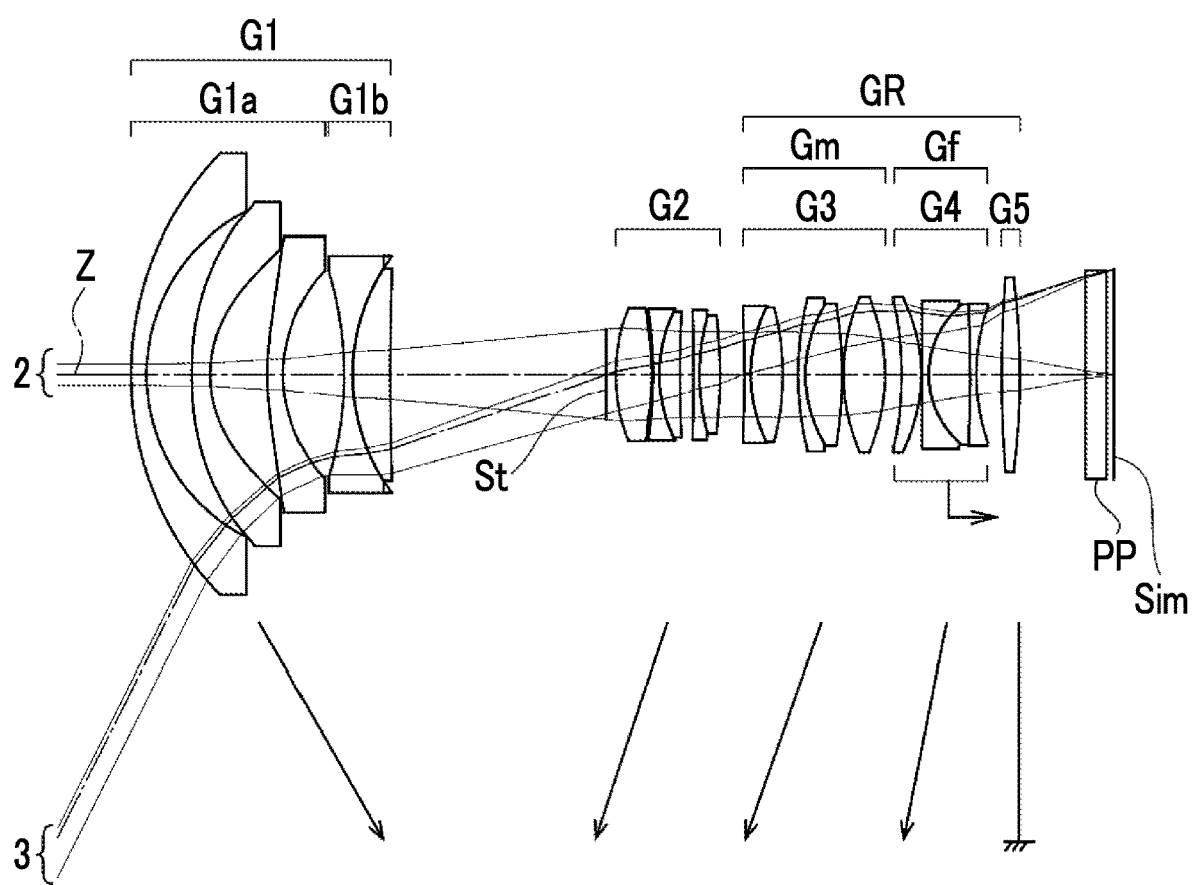
FIG. 1 is a diagram showing an optical path and a cross section of a lens configuration of a zoom lens according to an embodiment of the present invention, and a movement locus.

Hereinafter, embodiments of the present invention will be described with reference to drawings. FIG. 1 shows an optical path and a cross-sectional view at a wide-angle end of a zoom lens according to an embodiment of the present invention. The example shown in FIG. 1 corresponds to the zoom lens according to Example 1 to be described later. FIG. 1 shows a state where an object at infinity is in focus, where the left side of the drawing is an object side and the right side of the drawing is an image side, and shows on-axis rays 2 and maximum-view-angle rays 3 for the optical path.

In FIG. 1, it is assumed that the zoom lens is applied to the imaging apparatus, and an example in which an optical member PP having an incident surface and an exit surface parallel to each other is disposed between the zoom lens and an image plane Sim is illustrated. The optical member PP is a member assumed to include various filters and/or a cover glass. The various filters are, for example, a low-pass filter, an infrared cut filter, and a filter for cutting a specific wavelength range. The optical member PP is a member having no refractive power, and the optical member PP may be omitted.

The zoom lens according to the present embodiment consists of a first lens group G1 having a negative refractive power, a second lens group G2 having a positive refractive power, and a subsequent lens group GR in order from the object side to the image side along an optical axis Z. During zooming from the wide-angle end to a telephoto end, at least the first lens group G1 and the second lens group G2 move, and thus, mutual distances between the first lens group G1, the second lens group G2, and the subsequent lens group GR in an optical axis direction change.

For example, the subsequent lens group GR of FIG. 1 is composed of three lens groups consisting of the third lens group G3, the fourth lens group G4, and the fifth lens group G5 in order from the object side to the image side. The mutual distances between the third lens group G3, the fourth lens group G4, and the fifth lens group G5 in the optical axis direction change during zooming. In the example of FIG. 1, during zooming, the first lens group G1, the second lens group G2, the third lens group G3, and the fourth lens group G4 move, and the fifth lens group G5 is fixed with respect to the image plane Sim. In FIG. 1, under each lens group moving during zooming, a schematic movement locus of each lens group during zooming from the wide-angle end to the telephoto end is represented by an arrow, a ground symbol is represented under the fifth lens group G5.

For example, FIG. 1 shows a configuration in which an aperture stop St is disposed on a surface of the second lens group G2 closest to the object side. There are advantages in achieving a wide angle and reducing a diameter of a lens system by disposing the aperture stop St in this manner.

In the zoom lens according to the present embodiment, a focusing lens group Gf disposed so as to be closer to the image side than the first lens group G1 moves during focusing from an object at infinity to an object within a short range. In the example shown in FIG. 1, only the focusing lens group Gf moves during focusing. Focusing is performed by the lens group closer to the image side than the first lens group G1, and thus, it is easy to construct the focusing lens group Gf with a small size and a light weight. Accordingly, there is an advantage in increasing an autofocusing speed.

It is preferable that the focusing lens group Gf is a part of the subsequent lens group GR or the entire subsequent lens group GR in view of the following circumstances. As stated above, it is preferable that the focusing lens group Gf is disposed so as to be closer to the image side than the first lens group G1 in order to construct the focusing lens group Gf with a small size and a light weight such that the autofocusing speed can be increased. As for a positional relationship between the focusing lens group Gf and the second lens group G2, it is considered that the focusing lens group Gf is a part of the second lens group G2 or the entire second lens group G2. However, it is not preferable that a change in angle of view and a change in distortion become large along with the movement of the focusing lens group Gf in such a case. In a case where the change in angle of view and the change in distortion are large along with the movement of the focusing lens group Gf, there is a problem that a photographer feels these changes to be obstacles to view during a focusing operation and a wobbling operation. From the above, it is preferable that the focusing lens group Gf is disposed within the subsequent lens group GR.

For example, the entire fourth lens group G4 is the focusing lens group Gf in the zoom lens shown in FIG. 1. An arrow pointing an image-side direction under the fourth lens group G4 of FIG. 1 means that the fourth lens group G4 moves toward the image side during focusing from the object at infinity to the object within the short range.

It is preferable that the focusing lens group Gf has a negative refractive power. As stated above, it is preferable that the focusing lens group Gf is disposed so as to be closer to the image side than the first lens group G1, that is, between an object-side surface of the second lens group G2 closest to the object side and an image-side surface of the lens group closest to the image side in order to reduce the size of the focusing lens group Gf. Since a refractive power of a synthetic optical system is a positive value from the second lens group G2 to the lens group closest to the image side, the refractive power of the focusing lens group Gf can be increased by using the lens group having a negative refractive power of a different sign as the focusing lens group Gf, as opposed to using the lens group having the positive refractive power which is acquired by dividing the refractive power of the synthetic optical system as the focusing lens group Gf. Since the focusing lens group Gf has a high refractive power, it is possible to decrease a movement amount of the focusing lens group Gf, and it is possible to reduce the size of the entire lens system.

It is preferable that the focusing lens group Gf consists of three or more lenses. The focusing lens group Gf is composed of three or more lenses, and thus, it is possible to decrease a variation in aberration during focusing. For example, the focusing lens group Gf may consist of two positive lenses and two negative lenses. In this case, the focusing lens group Gf may consist of a positive lens, a negative lens, a positive lens, and a negative lens in order from the object side to the image side. In this case, three lenses on the image side may be joined together. More specifically, the focusing lens group Gf may consist of a positive meniscus lens of which a concave surface faces the object side, a negative lens of which a concave surface faces the image side, a positive lens, and a negative lens in order from the object side to the image side. Alternatively, the focusing lens group Gf may consist of two positive lenses and one negative lens. In this case, the focusing lens group Gf may consist of a positive lens, a negative lens, and a positive lens in order from the object side to the image side. In this case, two lenses on the image side may be joined together.

The first lens group G1 consists of a first-a lens group G1a and a first-b lens group G1b in order from the object side to the image side. A distance between the first-a lens group G1a and the first-b lens group G1b in the optical axis direction does not change either during zooming or during focusing. In a case where the distance between these two lens groups within the first lens group G1 changes, an actuator for driving at least one lens group and a wide distance for moving at least one lens group are required. Accordingly, the distance between the first-a lens group G1a and the first-b lens group G1b does not change during zooming and during focusing, and thus, there is an advantage in reducing the size of the lens group.

The first-a lens group G1a consists of three negative lenses. The first-a lens group G1a disposed on the object side within the first lens group G1 consists of only the negative lens, and thus, it is easy to prevent the lens diameter of the first lens group G1 from being increased even in a case where the wide angle of the lens group is achieved. It is possible to favorably correct off-axis aberration by using three negative lenses as the first-a lens group G1a. For example, the first-a lens group G1a consists of three negative meniscus lens of which convex surfaces face the object side, and there is an advantage in achieving the wide angle while correcting the off-axis aberration in such a case.

The first-b lens group G1b has at least one negative lens and at least one positive lens. As in the present embodiment, since on-axis ray height passing through the first lens group G1 on a wide-angle side is low and the on-axis ray height becomes high as the lens group becomes close to a telephoto side in the zoom lens comprising the first lens group G1 having the negative refractive power and the second lens group G2 having the positive refractive power, a variation in chromatic aberration along with zooming is easy to be large. Thus, the first-b lens group G1b which includes at least one negative lens and at least one positive lens on the image side on which the on-axis ray height becomes higher and has an achromatic effect is disposed within the first lens group G1. In this configuration, it is possible to decrease a change in longitudinal chromatic aberration along with zooming.

More specifically, it is preferable that the first-b lens group G1b is composed of two lenses consisting of a negative lens and a positive lens in order from the object side to the image side. In such a configuration, the negative refractive power is concentrated on the object side within the first lens group G1, and thus, it is possible to decrease the diameter of the lens disposed so as to be closest to the object side. The first-b lens group G1b consists of only two lenses, and thus, it is possible to reduce the size and weight thereof. For example, the first-b lens group G1b can consist of a biconcave lens and a positive lens of which a convex surface faces the object side. The negative lens and the positive lens included in the first-b lens group G1b may be joined together or may not be joined together.

Assuming that an average value of refractive indices of three negative lenses of the first-a lens group G1a at a d line is Nd1ave, the zoom lens according to the present embodiment satisfies the following Conditional Expression (1). Conditional Expression (1) assumes an average refractive index of the three lenses disposed in the first-a lens group G1a. The resultant value is not equal to or less than a lower limit of Conditional Expression (1). Thus, since an absolute value of a radius of curvature of the negative lens disposed in the first-a lens group G1a does not become too small even in a case where the wide angle is achieved, it is possible to restrain an increase in off-axis aberration. Alternatively, the resultant value is not equal to or less than the lower limit of Conditional Expression (1), it is possible to restrain an increase in lens diameter of the first-a lens group G1a even in a case where the wide angle is achieved. The resultant value is not equal to or greater than an upper limit of Conditional Expression (1), and thus, it is possible to restrain a dispersion of the negative lens of the first-a lens group G1a from being too large, particularly, there is an advantage in correcting lateral chromatic aberration on the wide-angle side. It is possible to obtain more favorable characteristics in a case where the zoom lens satisfies the following Conditional Expression (1-1), and it is possible to obtain still more favorable characteristics in a case where the zoom lens satisfies the following Conditional Expression (1-2).

$$1.73 < Nd1ave < 1.95 \tag{1}$$

$$1.75 < Nd1ave < 1.93 \tag{1-1}$$

$$1.77 < Nd1ave < 1.91 \tag{1-2}$$

Assuming that a focal length of the focusing lens group Gf is ff and a focal length of the first lens group G1 is f1, the zoom lens according to the present embodiment satisfies the following Conditional Expression (2). Conditional Expression (2) assumes the relationship between the focal length of the focusing lens group Gf and the focal length of the first lens group G1. The resultant value is not equal to or less than a lower limit of Conditional Expression (2), and thus, the refractive power of the first lens group G1 does not become too low. Accordingly, there is an advantage in restraining the increase in lens diameter of the first lens group G1 or decreasing the movement amount of the first lens group G1 along with zooming. Alternatively, the resultant value is not equal to or less than the lower limit of Conditional Expression (2), and thus, the refractive power of the focusing lens group Gf does not become too high. Accordingly, it is possible to restrain an increase in field curvature or it is possible to restrain a variation in field curvature along with the movement of the focusing lens group Gf. The resultant value is not equal to or greater than an upper limit of Conditional Expression (2), and thus, the refractive power of the first lens group G1 does not become too high, it is easy to correct distortion and astigmatism. Alternatively, the resultant value is not equal to or greater than the upper limit of Conditional Expression (2), and thus, the refractive power of the focusing lens group Gf does not become too low. Accordingly, it is possible to decrease the movement amount of the focusing lens group Gf during focusing. It is possible to obtain more favorable characteristics in a case where the zoom lens satisfies the following Conditional Expression (2-1), and it is possible to obtain still more favorable characteristics in a case where the zoom lens satisfies the following Conditional Expression (2-2).

$$1 < |ff/f1| < 3 \tag{2}$$

$$1.1 < |ff/f1| < 2.9 \tag{2-1}$$

$$1.2 < |ff/f1| < 2.3 \tag{2-2}$$

It is preferable that the zoom lens according to the present embodiment satisfies the following conditional expressions. Assuming that a transverse magnification of the focusing lens group Gf in a state in which an object at infinity at the wide-angle end is in focus is βfw, a combined transverse magnification of all the lenses closer to the image side than the focusing lens group Gf in a state in which the object at infinity at the wide-angle end is in focus is βrw, and βrw is 1 in a case where the lenses are not disposed so as to be closer to the image side than the focusing lens group Gf, it is preferable that the zoom lens satisfies the following Conditional Expression (3). Conditional Expression (3) assumes a focus movement amount with respect to the movement amount of the focusing lens group Gf. The resultant value is not equal to or less than a lower limit of Conditional Expression (3), and thus, it is possible to decrease the movement amount of the focusing lens group Gf during focusing. Accordingly, there is an advantage in reducing the entire length of the lens system. Alternatively, the resultant value is not equal to or less than the lower limit of Conditional Expression (3), it is possible to reduce the shortest imaging distance. The resultant value is not equal to or greater than an upper limit of Conditional Expression (3), and thus, the refractive power of the focusing lens group Gf does not become too high. Accordingly, it is possible to restrain various aberrations occurring in the focusing lens group Gf. It is possible to obtain more favorable characteristics in a case where the zoom lens satisfies the following Conditional Expression (3-1), and it is possible to obtain still more favorable characteristics in a case where the zoom lens satisfies the following Conditional Expression (3-2).

$$0.6 < |(1-\beta fw^2) \times \beta rw^2| < 2.3 \tag{3}$$

$$0.8 < |(1-\beta fw^2) \times \beta rw^2| < 2.1 \tag{3-1}$$

$$1.1 < |(1-\beta fw^2) \times \beta rw^2| < 1.9 \tag{3-2}$$

Assuming that a minimum value of the refractive indices of the three negative lenses of the first-a lens group G1a at the d line is Nd1amin, it is preferable that the zoom lens satisfies Conditional Expression (4). Conditional Expression (4) assumes the minimum refractive index of the negative lenses disposed in the first-a lens group G1a. It is considered that a material having a low dispersion is used for the negative lens disposed in the first-a lens group G1a in order to correct the lateral chromatic aberration on the wide-angle side, but such a material has a low refractive index. In a case where the lens is made of the material having the low refractive index, an absolute value of the radius of curvature is small, and thus, there is a problem that the increase in off-axis aberration and/or the increase in the lens diameter. The resultant value is not equal to or less than a lower limit of Conditional Expression (4), and thus, it is possible to avoid such a problem. The resultant value is not equal to or greater than an upper limit of Conditional Expression (4), and thus, the dispersion of the negative lenses of the first-a lens group G1a does not become too large. Accordingly, it is easy to particularly correct the lateral chromatic aberration at the wide-angle end. It is possible to obtain more favorable characteristics in a case where the zoom lens satisfies the following Conditional Expression (4-1), and it is possible to obtain still more favorable characteristics in a case where the zoom lens satisfies the following Conditional Expression (4-2).

$$1.52 < Nd1a\text{min} < 1.89 \tag{4}$$

$$1.56 < Nd1a\text{min} < 1.86 \tag{4-1}$$

Assuming that an Abbe number of at least one lens included in the focusing lens group Gf with the d line as a reference is vdf, it is preferable that the zoom lens satisfies the following Conditional Expression (5). That is, it is preferable that the focusing lens group Gf has at least one lens satisfying Conditional Expression (5). Conditional Expression (5) assumes the Abbe number of at least one lens disposed in the focusing lens group Gf. The resultant value is not equal to or less than a lower limit of Conditional Expression (5), and thus, it is possible to restrain the variation in chromatic aberration during focusing. It is preferable that the zoom lens satisfies the following Conditional Expression (5-1). The resultant value is not equal to or less than the lower limit of Conditional Expression (5-1), and thus, it is possible to increase an effect related to Conditional Expression (5). The resultant value is not equal to or greater than an upper limit of Conditional Expression (5-1), and thus, it is possible to secure a necessary refractive index. Accordingly, it is possible to favorably correct spherical aberration and astigmatism. In a case where the zoom lens satisfies the following Conditional Expression (5-2), it is possible to obtain more favorable characteristics.

$$60 < vdf \tag{5}$$

$$64 < vdf < 98 \tag{5-1}$$

$$68 < vdf < 85 \tag{5-2}$$

Assuming that an Abee number of at least one negative lens included in the first-b lens group G1b with the d line as the reference is vd1bn, it is preferable that the zoom lens satisfies the following Conditional Expression (6). That is, it is preferable that the first-b lens group G1b has at least one negative lens satisfying Conditional Expression (6). Conditional Expression (6) assumes the Abbe number of at least one negative lens disposed in the first-b lens group G1b. The resultant value is not equal to or less than a lower limit of Conditional Expression (6), and thus, it is possible to restrain the variation in longitudinal chromatic aberration during zooming. Alternatively, the resultant value is not equal to or less than the lower limit of Conditional Expression (6), and thus, it is possible to favorably correct the lateral chromatic aberration on the wide-angle side. It is preferable that the zoom lens satisfies the following Conditional Expression (6-1). The resultant value is not equal to or less than a lower limit of Conditional Expression (6-1), and thus, it is possible to increase an effect related to Conditional Expression (6). The resultant value is not equal to or greater than an upper limit of Conditional Expression (6-1), and thus, it is possible to secure a necessary refractive index. Accordingly, it is possible to favorably correct various aberrations such as spherical aberration. In a case where the zoom lens satisfies the following Conditional Expression (6-2), it is possible to still more favorable characteristics.

$$60 < vd1bn \tag{6}$$

$$66 < vd1bn < 100 \tag{6-1}$$

$$68 < vd1bn < 98 \tag{6-2}$$

Assuming that the refractive index of the lens disposed so as to be closest to the object side at the d line is Nd1, it is preferable that the zoom lens satisfies the following Conditional Expression (7). Conditional Expression (7) assumes the refractive index of the material used for the lens closest to the object side. The resultant value is not equal to or less than a lower limit of Conditional Expression (7), and thus, it is easy to reduce the size of the lens closest to the object side and decrease the entire size of the first lens group G1. The resultant value is not equal to or greater than an upper limit of Conditional Expression (7), and thus, it is easy to correct the field curvature. Alternatively, the resultant value is not equal to or greater than the upper limit of Conditional Expression (7), and thus, it is easy to construct the lens closest to the object side without using a material having a large dispersion. Accordingly, it is easy to favorably correct the lateral chromatic aberration.

$$1.7 < Nd1 < 2.1 \tag{7}$$

Assuming that an on-axis air-equivalent distance from a lens surface closest to the image side to the image plane Sim in a state in which the object at infinity at the wide-angle end is in focus is BFw, a focal length of the zoom lens in a state in which the object at infinity at the wide-angle end is in focus is fw, and the maximum half-angle of view in a state in which the object at infinity at the wide-angle end is in focus is ωw, it is preferable that the zoom lens satisfies the following Conditional Expression (8). In the example shown in FIG. 1, ωw corresponds to an angle formed by the optical axis Z and the principal ray with the maximum angle of view on the object side than the lens closest to the object side. In FIG. 1, the principal ray with the maximum angle of view is represented by a dash-dotted line within the maximum-view-angle rays 3. Conditional Expression (8) assumes the relationship between the air-equivalent distance from the lens surface closest to the image side at the wide-angle end to the image plane Sim, that is, back focus, a focal length at the wide-angle end, and a half angle of view at the wide-angle end. The resultant value is not equal to or less than a lower limit of Conditional Expression (8), and thus, it is easy to secure necessary back focus for each interchangeable-lens camera. The resultant value is not equal to or less than the lower limit of Conditional Expression (8), and thus, it is easy to secure the refractive power of the first lens group G1 or it is easy to narrow a distance between the first lens group G1 and the second lens group G2 at the wide-angle end. Accordingly, it is easy to reduce the size of the first lens group G1. The resultant value is not equal to or greater than an upper limit of Conditional Expression (8), and thus, the back focus does not become too long. Accordingly, it is possible to widen a range in which the lens can be disposed, and it is easy to provide the necessary number of lenses for securing favorable optical performance. In a case where the back focus is long, it is necessary to increase the refractive power of the first lens group G1 in order to secure the long back focus. However, the resultant value is not equal to or greater than the upper limit of Conditional Expression (8), and thus, the back focus does not become too long. Accordingly, it is not necessary to increase the refractive power of the first lens group G1. As a result, it is easy to particularly correct the astigmatism on the telephoto side. In a case where the zoom lens satisfies the following Conditional Expression (8-1), it is possible to obtain more favorable characteristics.

$$0.5 < BFw/(fw \times \tan \omega w) < 1.5 \tag{8}$$

$$0.6 < BFw/(fw \times \tan \omega w) < 1.3 \tag{8-1}$$

Assuming that the maximum half-angle of view in a state in which the object at infinity at the wide-angle end is in focus is ωw and an open F number at the wide-angle end is FNow, it is preferable that the zoom lens satisfies the following Conditional Expression (9). Conditional Expression (9) assumes the relationship between the maximum half-angle of view and the open F number at the wide-angle end. The resultant value is not equal to or less than a lower limit of Conditional Expression (9), and thus, it is possible to widen the angle of view at the wide-angle end or it is possible to decrease the open F number. Accordingly, it is possible to cope with a wide range of applications, and it is possible to achieve a high-value wide-angle zoom lens. The resultant value is not equal to or greater than an upper limit of Conditional Expression (9), and thus, it is easy to restrain an increase in number of lenses and it is easy to restrain an increase in size of the lens system while acquiring favorable optical performance. In a case where the zoom lens satisfies the following Conditional Expression (9-1), it is possible to obtain more favorable characteristics.

$$0.45 < \tan \omega w / FNow < 1 \tag{9}$$

$$0.46 < \tan \omega w / FNow < 0.8 \tag{9-1}$$

Assuming that a radius of curvature of an object-side lens surface of the lens disposed so as to be closest to the object side is R1 and a radius of curvature of an image-side lens surface of the lens disposed so as to be closest to the object side is R2, it is preferable that the zoom lens satisfies the following Conditional Expression (10). Conditional Expression (10) assumes the relationship between the radius of curvature of the object-side surface and the radius of curvature of the image-side surface of the lens disposed so as to be closest to the object side, that is, a shape factor of the lens. The resultant value is not equal to or less than a lower limit of Conditional Expression (10), and thus, it is easy to correct the astigmatism on the telephoto side. The resultant value is not equal to or greater than an upper limit of Conditional Expression (10), and thus, it is easy to favorably correct the spherical aberration on the telephoto side. The resultant value is not equal to or greater than the upper limit of Conditional Expression (10), and thus, the refractive power of the lens disposed so as to be closest to the object side does not become too low. Accordingly, it is easy to achieve the wide angle. In a case where the zoom lens satisfies the following Conditional Expression (10-1), it is possible to obtain more favorable characteristics.

$$3.3 < (R1+R2)/(R1-R2) < 5.5 \tag{10}$$

$$3.3 < (R1+R2)/(R1-R2) < 5 \tag{10-1}$$

Assuming that the focal length of the first lens group G1 is f1 and a focal length of the second lens group G2 is f2, it is preferable that the zoom lens satisfies the following Conditional Expression (11). Conditional Expression (11) assumes the relationship between the focal lengths of the first lens group G1 and the second lens group G2. The resultant value is not equal to or less than a lower limit of Conditional Expression (11), and thus, the refractive power of the first lens group G1 does not become too high. Accordingly, it is easy to correct the distortion and the astigmatism. Alternatively, Conditional Expression (11) is not equal to or less than the lower limit, and thus, the refractive power of the second lens group G2 does not become too low. Accordingly, it is easy to particularly correct the spherical aberration on the telephoto side. The resultant value is not equal to or greater than an upper limit of Conditional Expression (11), and thus, the refractive power of the first lens group G1 does not become too low. Accordingly, it is possible to restrain the increase in size of the first lens group G1 or restrain the movement amount of the first lens group G1 during zooming. Alternatively, the resultant value is not equal to or greater than the upper limit of Conditional Expression (11), and thus, the refractive power of the second lens group G2 does not become too high. Accordingly, it is easy to particularly correct the field curvature on the wide-angle side. In a case where the zoom lens satisfies the following Conditional Expression (11-1), it is possible to obtain more favorable characteristics.

$$0.2 < |f1/f2| < 0.65 \tag{11}$$

$$0.25 < |f1/f2| < 0.63 \tag{11-1}$$

Assuming that a focal length of the first-a lens group G1a is f1a, a focal length of the first-b lens group G1b is f1b, it is preferable that the zoom lens satisfies the following Conditional Expression (12). Conditional Expression (12) assumes the relationship between the focal length of the first-a lens group G1a and the focal length of the first-b lens group G1b. The resultant value is not equal to or less than a lower limit of Conditional Expression (12), and thus, a refractive power of the first-b lens group G1b does not become too low. Accordingly, it is easy to correct the distortion. The resultant value is not equal to or greater than an upper limit of Conditional Expression (12), and thus, the refractive power of the first-b lens group G1b does not become too high. Accordingly, it is easy to decrease the diameter of the lens disposed so as to be closest to the object side. It is possible to obtain more favorable characteristics in a case where the zoom lens satisfies the following Conditional Expression (12-1), and it is possible to obtain still more favorable characteristics in a case where the zoom lens satisfies the following Conditional Expression (12-2).

$$0.02 < |f1a/f1b| < 0.15 \tag{12}$$

$$0.03 < |f1a/f1b| < 0.12 \tag{12-1}$$

$$0.04 < |f1a/f1b| < 0.1 \tag{12-2}$$

Next, the subsequent lens group GR will be described. It is preferable that the subsequent lens group GR includes a lens group which moves by changing a distance from the adjacent lens group during zooming and has a negative refractive power. The second lens group G2 is disposed so as to be adjacent to the subsequent lens group GR, and a lens group having a refractive power of a sign different from the sign of the refractive power of the second lens group G2 is disposed within the subsequent lens group. Thus, it is possible to improve a zooming effect. The lens groups each having a negative refractive power are provided on the object side and the image side of the second lens group G2, and thus, there is an advantage in correcting the off-axis aberration.

It is preferable that the subsequent lens group GR includes a lens group closest to the image side, of which a distance from the adjacent lens group changes during zooming, and which has a positive refractive power. In the wide-angle zoom lens, an incidence angle of the principal ray with the maximum angle of view on the image plane Sim is easy to be particularly large at the wide-angle end. The lens group having the positive refractive power is disposed in the position closest to the image side, and thus, it is easy to decrease the incidence angle of the principal ray with the maximum angle of view on the image plane Sim.

In a case where the subsequent lens group GR includes the lens group closest to the image side and has the positive refractive power, it is preferable that the lens group closest to the image side and has the positive refractive power is fixed with respect to the image plane Sim during zooming and during focusing. The lens group in the position closest to the image side is fixed, and thus, it is possible to restrain dust from entering the zoom lens.

It is preferable that the lens group closest to the image side and has the positive refractive power within the subsequent lens group GR is fixed with respect to the image plane Sim during zooming and during focusing and consists of one lens. Since a diameter of a ray passing through the lens group disposed so as to be closest to the image side becomes small, the burden of aberration correction is not large, and thus, it is preferable that this lens group is composed of a small number of lenses. The lens group disposed so as to be closest to the image side is composed of only one lens, and thus, there is an advantage in reducing the size thereof.

It is preferable that the subsequent lens group GR consists of an intermediate lens group Gm which consists of one or two lens groups and has a positive refractive power as a whole, a focusing lens group Gf having a negative refractive power, and a lens group having a positive refractive power in order from the object side to the image side. In the example shown in FIG. 1, the third lens group G3 corresponds to the intermediate lens group Gm. Each of the one or two lens groups within the intermediate lens group Gm, the focusing lens group Gf, and the lens group which is disposed in the position closest to the image side and has the positive refractive power is a lens group of which the distance from the adjacent lens group change during zooming. That is, it is preferable that the zoom lens according to the present embodiment consists of the first lens group G1 having the negative refractive power, the second lens group G2 having the positive refractive power, the intermediate lens group Gm, the focusing lens group Gf having the negative refractive power, and the lens group having the positive refractive power in order from the object side to the image side. The zoom lens has five to six lens groups in which the mutual distances therebetween change during zooming, and thus, it is possible to favorably correct aberration in the entire zoom range, particularly, the field curvature while restraining a manufacturing difficulty level from being increased by restraining the occurrence of eccentric coma aberration caused by a manufacturing error.

In the example of FIG. 1, the number of lens groups in which the mutual distance changes during zooming and constitute the subsequent lens group GR is three. However, in the technology of the present disclosure, the number of lens groups constituting the subsequent lens group GR may be another number. The number of lens groups is one or more and four or less in order to reduce the size thereof and achieve high performance.

FIG. 1 illustrates the example in which the optical member PP is disposed between the lens system and the image plane Sim. However, various filters may be disposed between the lenses instead of disposing the low-pass filter and/or the various filters for shielding rays with a specific wavelength range between the lens system and the image plane Sim, or the lens surface of any of the lenses may be coated so as to have the same functions as the various filters.

The above-mentioned preferred configurations and available configurations may be any combinations, and it is preferable that the configurations are selectively adopted in accordance with required specification. According to the present embodiment, it is possible to realize the small-size zoom lens having high optical performance while obtaining the wide angle of view. The "wide angle of view" mentioned herein means that the maximum full-angle of view at the wide-angle end is higher than 120 degrees.

Next, numerical examples of the zoom lens according to the present invention will be described.

Example 1

Figure 2:
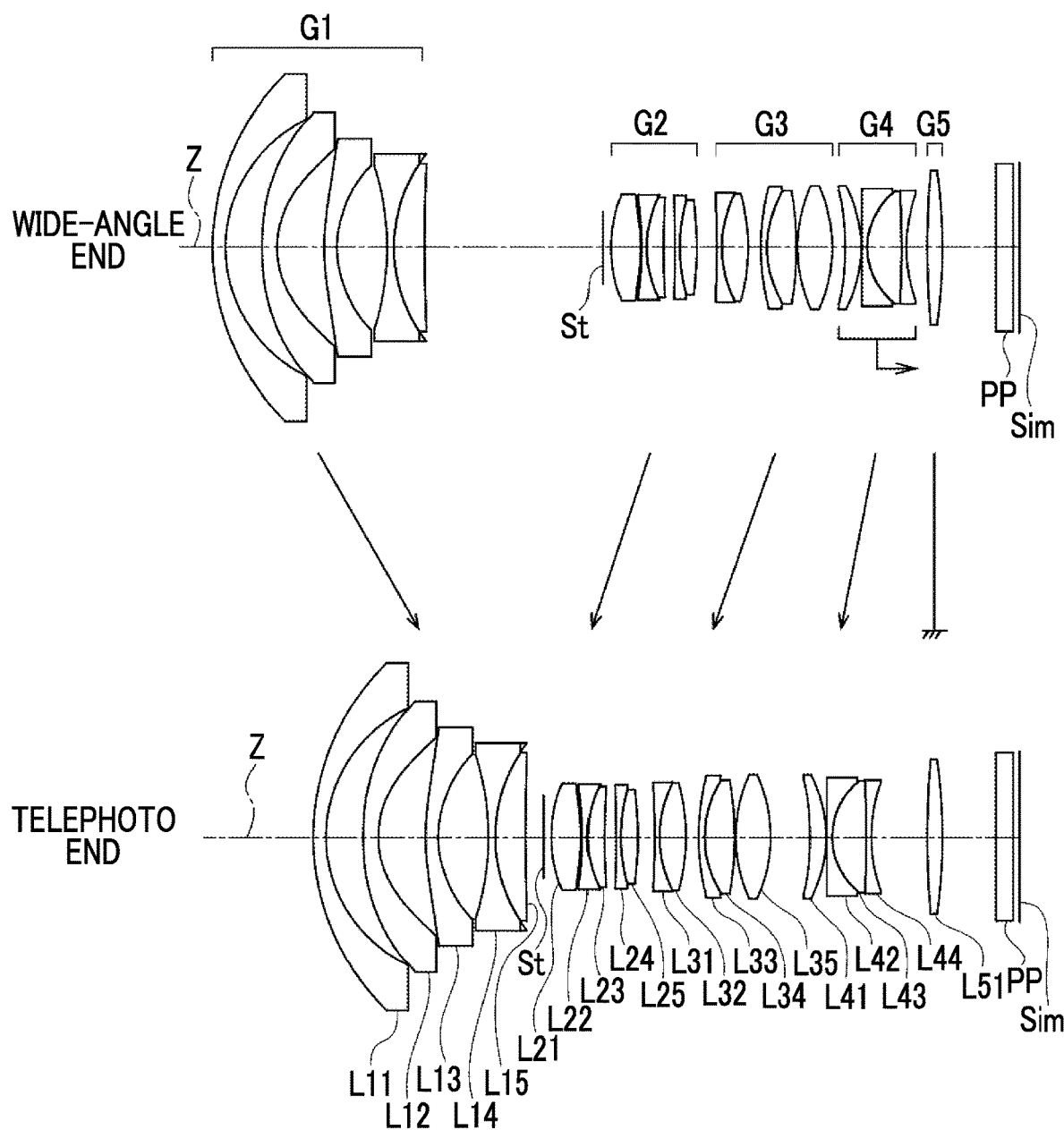
FIG. 2 is a diagram showing cross sections of lens configurations of a zoom lens according to Example 1 of the present invention at a wide-angle end and at a telephoto end and movement loci.

Cross-sectional views of a zoom lens according to Example 1 and schematic movement loci are shown in FIG. 2. FIG. 2 shows a state where the object at infinity is in focus, where the left side of the drawing is the object side and the right side of the drawing is the image side. In FIG. 2, a wide-angle end state is represented at an upper part labeled by "wide-angle end", and a telephoto end state is represented at a lower part labeled by "telephoto end". Between the upper part and the lower part of FIG. 2, the schematic movement locus of each lens group in a case where zooming from the wide-angle end to the telephoto end is performed is represented by an arrow for each lens group moving during zooming, and a ground symbol is represented for the lens group fixed with respect to the image plane sim during zooming.

The zoom lens according to Example 1 consists of a first lens group G1 having a negative refractive power, a second lens group G2 having a positive refractive power, a third lens group G3 having a positive refractive power, a fourth lens group G4 having a negative refractive power, and a fifth lens group G5 having a positive refractive power in order from the object side to the image side. During zooming from the wide-angle end to the telephoto end, the first lens group G1 moves to the image side, the second lens group G2, the third lens group G3, and the fourth lens group G4 move to the object side, and the fifth lens group G5 is fixed on to the image plane Sim. Thus, all the distances between the adjacent lens groups change. The first lens group G1 consists of five lenses such as lenses L11 to L15 in order from the object side to the image side, the second lens group G2 consists of the aperture stop St and five lenses such as lenses L21 to L25 in order from the object side to the image side, the third lens group G3 consists of five lenses such as lenses L31 to L35 in order from the object side to the image side, the fourth lens group G4 consists of four lenses such as lenses L41 to L44 in order from the object side to the image side, and the fifth lens group G5 consists of one lens such as a lens L51. The focusing lens group Gf is the entire fourth lens group G4. Similarly to FIG. 1, an arrow pointing the image-side direction is represented under the lens group corresponding to the focusing lens group Gf in FIG. 2. The outline of the zoom lens according to Example 1 has been described above.

Table 1 shows basic lens data of the zoom lens according to Example 1, Table 2 shows specifications and variable surface distances, and Table 3 shows aspherical surface coefficients thereof. In Table 1, the column of Sn shows surface numbers. The surface closest to the object side is the first surface, and the surface numbers increase one by one toward the image side. The column of R shows radii of curvature of the respective surfaces. The column of D shows surface distances on the optical axis between the respective surfaces and the surfaces adjacent to the image side. Further, the column of Nd shows a refractive index of each constituent element with the d line as the reference, the column of vd shows an Abbe number of each constituent element at the d line, and the column of θgF shows a partial dispersion ratio of each constituent element between the g line and the F line. It should be noted that the partial dispersion ratio θgF between the g line and the F line of a certain lens is defined by θgF=(Ng−NF)/(NF−NC), where the refractive indices of the lens at the g line, F line, and C line are Ng, NF, and NC, respectively.

In Table 1, a reference sign of a radius curvature of a surface having a shape in which a convex surface faces the object side is set to be positive, and a reference sign of a radius of curvature of a surface having a shape in which a convex surface faces the image side is set to be negative. Table 1 additionally shows the aperture stop St and the optical member PP. In Table 1, in a place of a surface number of a surface corresponding to the aperture stop St, the surface number and a term of (St) are noted. A value at the bottom place of D in Table 1 indicates a distance between the image plane Sim and the surface closest to the image side in the table. In Table 1, the variable surface distances are referenced by the reference signs DD[ ], and are written into places of D, where object side surface numbers of distances are noted in [ ].

In Table 2, values of the zoom ratio Zr, the focal length f of the entire system, the F number FNo., the maximum total angle of view 2ω, and the variable surface distance are represented with the d line as the reference. (°) in the place of 2ω indicates that the unit thereof is a degree. In Table 2, values in a state in which the object at infinity at the wide-angle end is in focus, in a state in which the object at infinity at the telephoto end is in focus, in a state in which an object at a distance of 500 mm (millimeters) from the image plane at the wide-angle end is in focus, and in a state in which an object at a distance of 500 mm (millimeters) from the image plane at the telephoto end is in focus are represented in the columns of W-Infinity, T-Infinity, W-500 mm, and T-500 mm, respectively. f in the column of W-Infinity corresponds to fw used in the aforementioned Conditional Expression.

In Table 1, the reference sign * is attached to surface numbers of aspherical surfaces, and numerical values of the paraxial radius of curvature are written into the column of the radius of curvature of the aspherical surface. In Table 3, the column of Sn shows surface numbers of aspherical surfaces, and the columns of KA and Am (m=3, 4, 5, ... ) show numerical values of the aspherical surface coefficients of the aspherical surfaces. The "E±n" (n: an integer) in numerical values of the aspherical surface coefficients of Table 3 indicates "×10$^{\pm n}$". KA and Am are aspherical surface coefficients in an aspherical surface expression expressed in the following expression.

$$Zd = C \times h^2 / \{1 + (1 - KA \times C^2 \times h^2)^{1/2}\} + \Sigma Am \times h^m$$

Here, Zd is an aspherical surface depth (a length of a perpendicular from a point on an aspherical surface at height h to a plane that is perpendicular to the optical axis and contacts with the vertex of the aspherical surface), h is a height (a distance from the optical axis to the lens surface), C is a reciprocal of paraxial curvature radius, KA and Am are aspherical surface coefficients, and Σ in the aspherical surface expression means the sum with respect to m.

In data of each table, a degree is used as a unit of an angle, and mm (millimeter) is used as a unit of a length, but appropriate different units may be used since the optical system can be used even in a case where the system is enlarged or reduced in proportion. Further, each of the following tables shows numerical values rounded off to predetermined decimal places.

TABLE 1

| | | Example 1 | | | |
|---|---|---|---|---|---|
| Sn | R | D | Nd | νd | θgF |
| 1 | 41.94034 | 2.100 | 1.85150 | 40.78 | 0.56958 |
| 2 | 24.28157 | 6.178 | | | |
| *3 | 75.00000 | 2.500 | 1.69259 | 53.07 | 0.54955 |
| *4 | 18.47265 | 7.784 | | | |
| *5 | 36.29274 | 2.100 | 1.85108 | 40.12 | 0.56852 |
| *6 | 17.10000 | 8.354 | | | |
| 7 | −46.41263 | 1.120 | 1.43875 | 94.66 | 0.53402 |
| 8 | 26.32000 | 5.100 | 1.95375 | 32.32 | 0.59015 |
| 9 | 366.77570 | DD[9] | | | |
| 10(St) | ∞ | 1.311 | | | |
| *11 | 26.26117 | 4.880 | 1.69350 | 53.18 | 0.54831 |
| *12 | −35.28129 | 0.203 | | | |
| 13 | −57.42580 | 0.820 | 1.75500 | 52.32 | 0.54737 |
| 14 | 19.66700 | 2.800 | 1.59522 | 67.73 | 0.54426 |
| 15 | 137.14630 | 1.893 | | | |
| 16 | −277.24752 | 0.790 | 1.81600 | 46.62 | 0.55682 |
| 17 | 29.77900 | 2.800 | 1.64769 | 33.79 | 0.59393 |
| 18 | −67.77760 | DD[18] | | | |
| 19 | −155.86052 | 0.810 | 1.81600 | 46.62 | 0.55682 |
| 20 | 20.41300 | 4.360 | 1.59282 | 68.62 | 0.54414 |
| 21 | −35.61991 | 2.100 | | | |
| 22 | 42.02719 | 1.010 | 1.85150 | 40.78 | 0.56958 |
| 23 | 18.24500 | 4.990 | 1.43875 | 94.66 | 0.53402 |
| 24 | −56.85949 | 0.150 | | | |
| 25 | 25.78476 | 5.800 | 1.43875 | 94.66 | 0.53402 |
| 26 | −25.78476 | DD[26] | | | |
| *27 | −64.12560 | 2.690 | 1.85343 | 40.56 | 0.56684 |
| *28 | −21.45850 | 0.100 | | | |
| 29 | ∞ | 0.890 | 1.88300 | 40.76 | 0.56679 |
| 30 | 12.20900 | 5.680 | 1.49700 | 81.54 | 0.53748 |
| 31 | −177.03000 | 0.810 | 1.88300 | 39.22 | 0.57295 |
| 32 | 27.74373 | DD[32] | | | |
| 33 | 155.15267 | 2.500 | 1.94595 | 17.98 | 0.65460 |
| 34 | −99.58637 | 8.949 | | | |
| 35 | ∞ | 2.850 | 1.51680 | 64.20 | 0.53430 |
| 36 | ∞ | 1.000 | | | |

TABLE 2

| | Example 1 | | | |
|---|---|---|---|---|
| | W-Infinity | T-Infinity | W-500 mm | T-500 mm |
| Zr | 1.000 | 1.883 | — | — |
| f | 8.238 | 15.516 | 8.195 | 15.327 |
| FNo. | 2.88 | 2.88 | 2.85 | 2.87 |
| 2ω(°) | 125.8 | 82.4 | 126.0 | 82.8 |
| DD[9] | 29.531 | 2.986 | 29.531 | 2.986 |
| DD[18] | 3.357 | 2.809 | 3.357 | 2.809 |
| DD[26] | 2.100 | 6.601 | 2.222 | 6.900 |
| DD[32] | 3.447 | 9.257 | 3.325 | 8.958 |

TABLE 3

| | Example 1 | | | |
|---|---|---|---|---|
| Sn | 3 | 4 | 5 | 6 |
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | 1.8160996E−04 | 1.8468610E−04 | −3.5121597E−05 | −5.1194646E−05 |
| A5 | −1.1335952E−05 | −1.2145091E−05 | −1.7847803E−05 | −1.8058170E−05 |

TABLE 3-continued

Example 1

| | | | | |
|---|---|---|---|---|
| A6  | −1.4335425E−06 | −1.2166255E−06 | 2.3507898E−06  | 3.5437269E−06 |
| A7  | 1.6657704E−07  | 7.3739848E−09  | 2.6791047E−07  | 1.0407126E−07 |
| A8  | 3.7176528E−09  | 1.1634818E−08  | −4.7251861E−08 | −6.5002915E−08 |
| A9  | −1.1789882E−09 | 1.7527294E−09  | −2.3578362E−09 | 1.5980818E−09 |
| A10 | 1.6846045E−11  | −2.3439242E−10 | 5.0985133E−10  | 9.6469129E−10 |
| A11 | 4.9683664E−12  | −2.0890135E−11 | 1.3769111E−11  | −1.1394206E−10 |
| A12 | −1.6509787E−13 | 2.6854226E−12  | −3.4119027E−12 | −3.5085860E−12 |
| A13 | −1.2889391E−14 | 1.1950808E−13  | −5.0951086E−14 | 1.5437474E−12 |
| A14 | 5.7379998E−16  | −1.6261627E−14 | 1.4344945E−14  | −4.8263251E−14 |
| A15 | 2.0021309E−17  | −3.8891310E−16 | 1.0991901E−16  | −8.5442321E−15 |
| A16 | −1.0471255E−18 | 5.3876680E−17  | −3.6564916E−17 | 4.8212604E−16 |
| A17 | −1.6950892E−20 | 6.9841033E−19  | −1.2242734E−19 | 2.0638114E−17 |
| A18 | 1.0001019E−21  | −9.2860078E−20 | 5.1534781E−20  | −1.5464338E−18 |
| A19 | 5.9701858E−24  | −5.4301162E−22 | 5.2084646E−23  | −1.7486813E−20 |
| A20 | −3.9636710E−25 | 6.5318111E−23  | −3.0822936E−23 | 1.6996115E−21 |
| Sn  | 11 | 12 | 27 | 28 |
| KA  | 1.0000000E+00  | 1.0000000E+00  | 1.0000000E+00  | 1.0000000E+00 |
| A3  | 0.0000000E+00  | 0.0000000E+00  | 0.0000000E+00  | 0.0000000E+00 |
| A4  | 3.4130173E−05  | 6.2420625E−05  | −6.0807770E−05 | 2.9716437E−05 |
| A5  | −2.6217914E−05 | −2.1062733E−05 | 3.6227550E−05  | 7.6242490E−07 |
| A6  | 9.8676344E−06  | 8.4905269E−06  | −2.5310378E−05 | −1.7092045E−06 |
| A7  | −4.8898264E−07 | −1.1036213E−06 | 9.4296047E−06  | 4.5860772E−07 |
| A8  | −7.2967595E−07 | −2.5485692E−07 | −1.6820493E−06 | 1.4557727E−08 |
| A9  | 1.9381422E−07  | 1.1852547E−07  | −6.1219487E−10 | −2.5304394E−08 |
| A10 | 1.5648615E−09  | −1.3534098E−08 | 5.3585618E−08  | 1.6289649E−09 |
| A11 | −6.6656712E−09 | −1.6863962E−09 | −7.2268338E−09 | 6.6338124E−10 |
| A12 | 4.6499647E−10  | 6.5309998E−10  | −2.3410749E−10 | −6.7515269E−11 |
| A13 | 1.2073678E−10  | −4.1165896E−11 | 1.2768330E−10  | −9.9334783E−12 |
| A14 | −1.2738591E−11 | −9.2191136E−12 | −6.9388519E−12 | 1.2373518E−12 |
| A15 | −1.4421479E−12 | 1.4785823E−12  | −6.7668240E−13 | 8.6500487E−14 |
| A16 | 1.7978446E−13  | 2.0460884E−14  | 8.4897976E−14  | −1.2293866E−14 |
| A17 | 1.0435769E−14  | −1.6419747E−14 | −9.8085392E−16 | −4.0666189E−16 |
| A18 | −1.3885918E−15 | 6.1368314E−16  | −2.5071105E−16 | 6.4330812E−17 |
| A19 | −3.2975909E−17 | 6.4961582E−17  | 1.3030111E−17  | 7.9572817E−19 |
| A20 | 4.4854674E−18  | −4.1335786E−18 | −1.9352472E−19 | −1.3910445E−19 |

Figure 13:
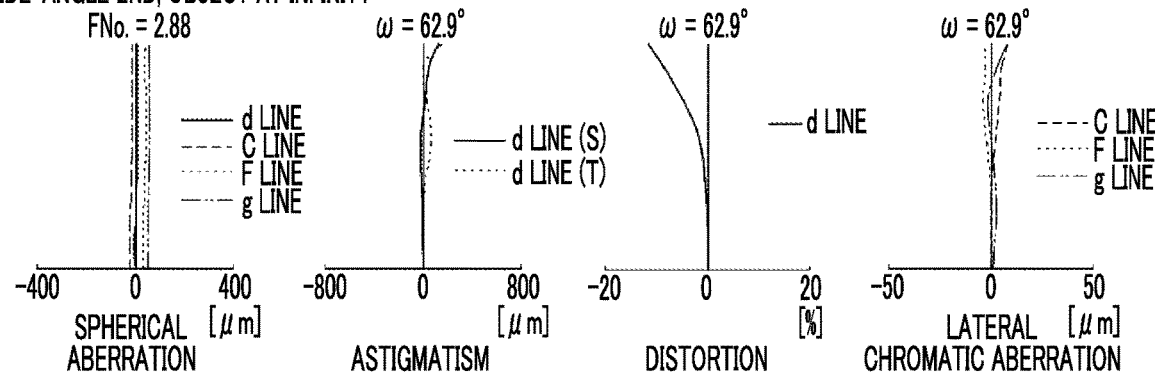
FIG. 13 shows aberration diagrams of the zoom lens according to Example 1 of the present invention.
Figure 13:
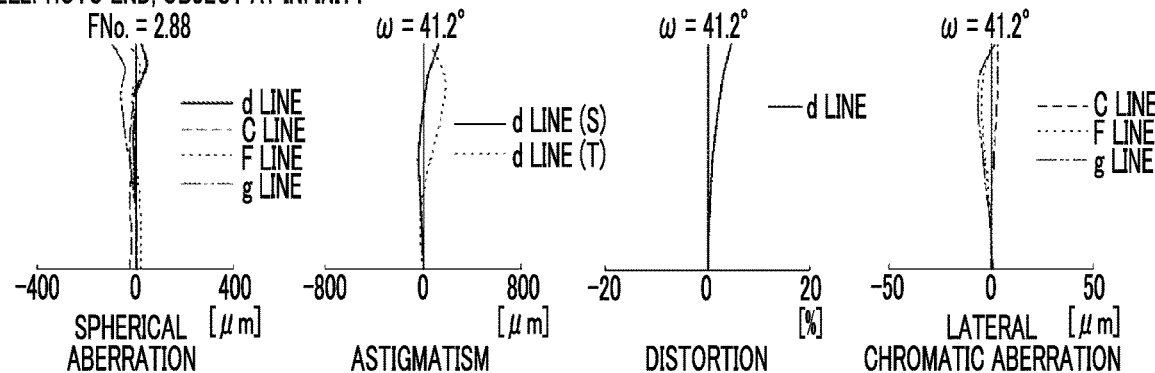
Figure 13:
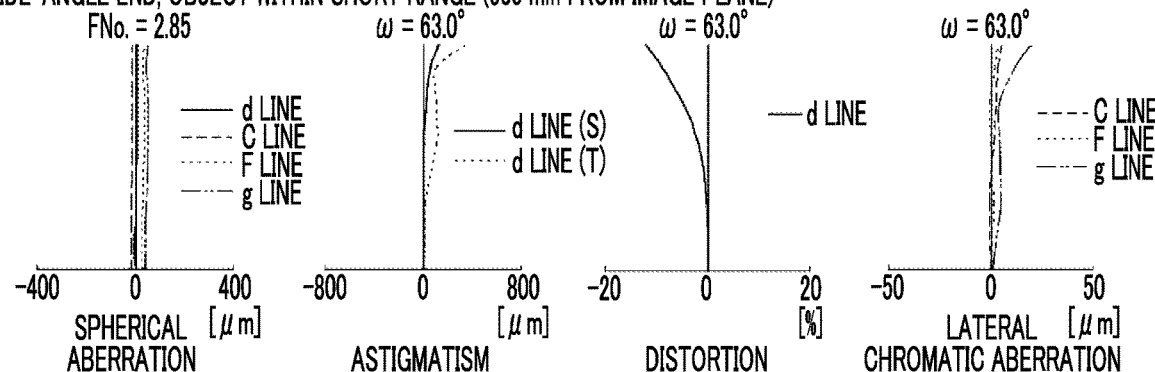
Figure 13:
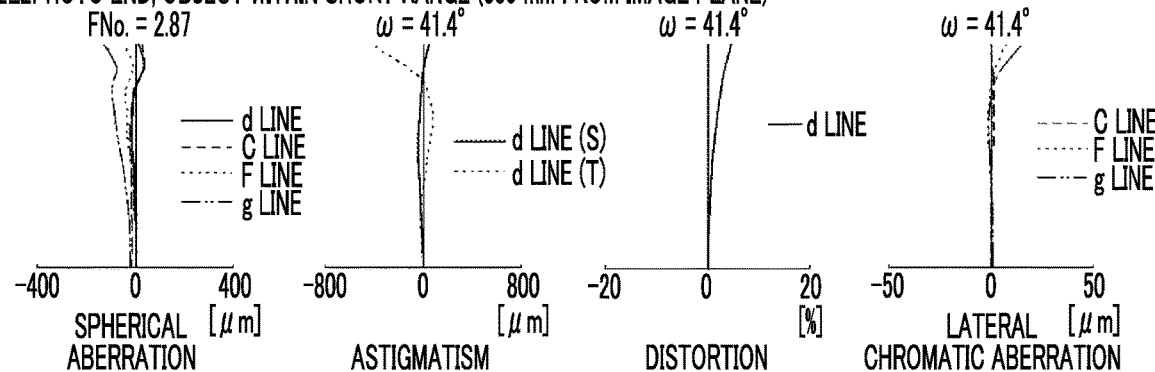

FIG. 13 shows aberration diagrams of the zoom lens according to Example 1. In FIG. 13, in order from the left side, spherical aberration, astigmatism, distortion, and lateral chromatic aberration are shown. In FIG. 13, aberration diagrams in a state in which the object at infinity at the wide-angle end is in focus is shown in the first row of "wide-angle end, object at infinity", aberration diagrams in a state in which the object at infinity at the telephoto end is in focus is shown in the second row of "telephoto end, object at infinity", aberration diagrams in a state in which the object at the distance of 500 mm (millimeters) from the image plane Sim at the wide-angle end is in focus is shown in the third row of "wide-angle end, object within short range (500 mm from image plane)", and aberration diagrams in a state in which the object at the distance of 500 mm (millimeters) from the image plane Sim at the telephoto end is in focus is shown in the fourth row of "telephoto end, object within short range (500 mm from image plane)".

In FIG. 13, in the spherical aberration diagram, aberrations at the d line, the C line, the F line, and the g line are respectively indicated by the solid line, the long dashed line, the short dashed line, and the dashed double-dotted line. In the astigmatism diagram, aberration in the sagittal direction at the d line is indicated by the solid line, and aberration in the tangential direction at the d line is indicated by the short dashed line. In the distortion diagram, aberration at the d line is indicated by the solid line. In the lateral chromatic aberration diagram, aberrations at the C line, the F line, and the g line are respectively indicated by the long dashed line, the short dashed line, and the dashed double-dotted line. In the spherical aberration diagram, FNo. indicates an F number. In the other aberration diagrams, ω indicates a half angle of view.

Reference signs, meanings, description methods, illustration methods of the respective data pieces related to Example 1 are the same as those in the following examples unless otherwise noted. Therefore, in the following description, repeated description will be omitted.

Example 2

Figure 3:
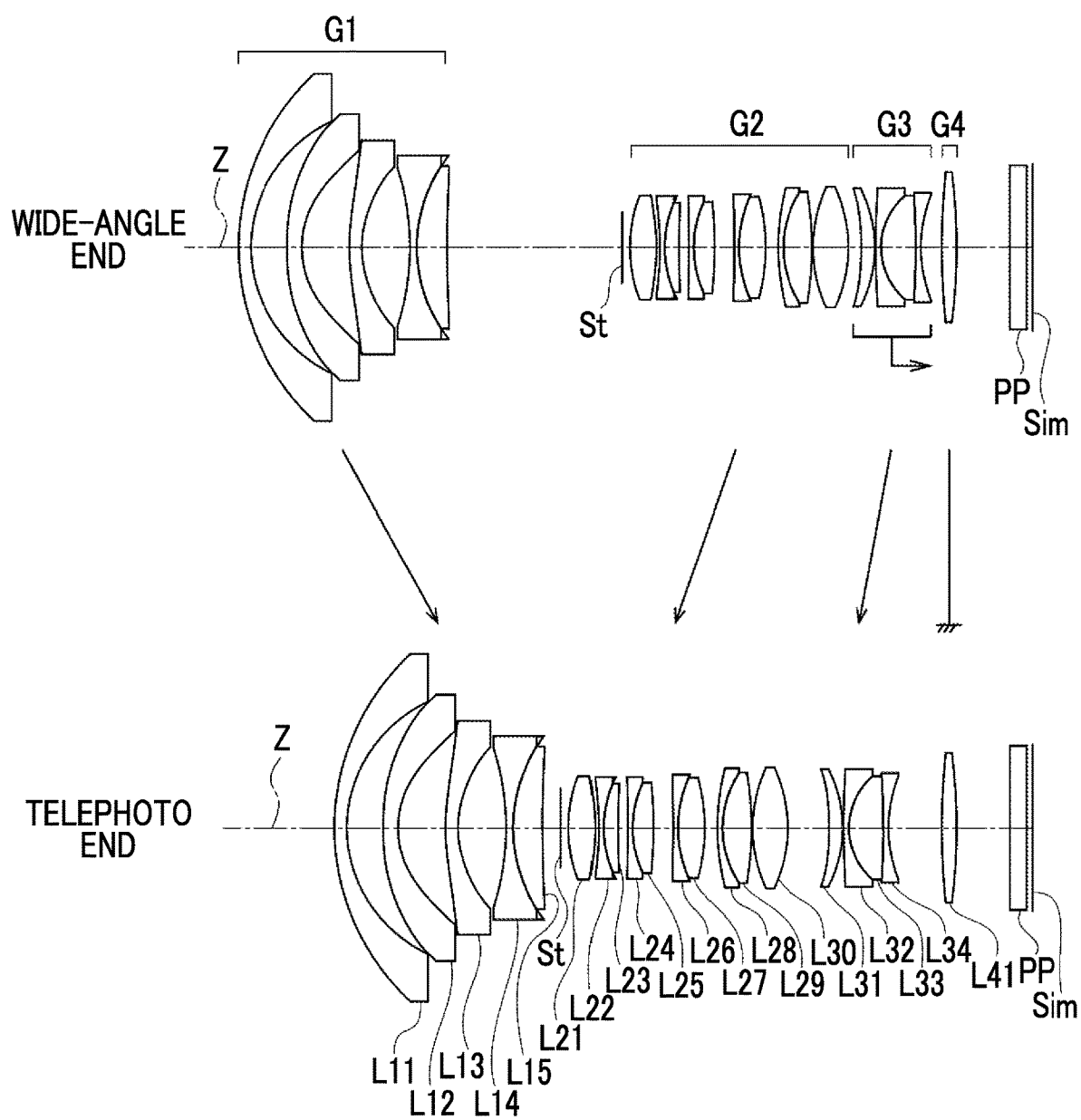
FIG. 3 is a diagram showing cross sections of lens configurations of a zoom lens according to Example 2 of the present invention at the wide-angle end and at the telephoto end and movement loci.

FIG. 3 shows cross sections and schematic movement loci of a zoom lens according to Example 2. The zoom lens according to Example 2 consists of a first lens group G1 having a negative refractive power, a second lens group G2 having a positive refractive power, a third lens group G3 having a negative refractive power, and a fourth lens group G4 having a positive refractive power in order from the object side to the image side. During zooming from the wide-angle end to the telephoto end, the first lens group G1 moves to the image side, the second lens group G2 and the third lens group G3 move to the object side, and the fourth lens group G4 is fixed on to the image plane Sim. Thus, all the distances between the adjacent lens groups change. The first lens group G1 consists of five lenses such as lenses L11 to L15 in order from the object side to the image side, the second lens group G2 consists of an aperture stop St and ten lenses such as lenses L21 to L30 in order from the object side to the image side, the third lens group G3 consists of four lenses such as lenses L31 to L34 in order from the object side to the image side, and the fourth lens group G4 consists of one lens such as a lens L41. The focusing lens group Gf is the entire third lens group G3.

Figure 14:
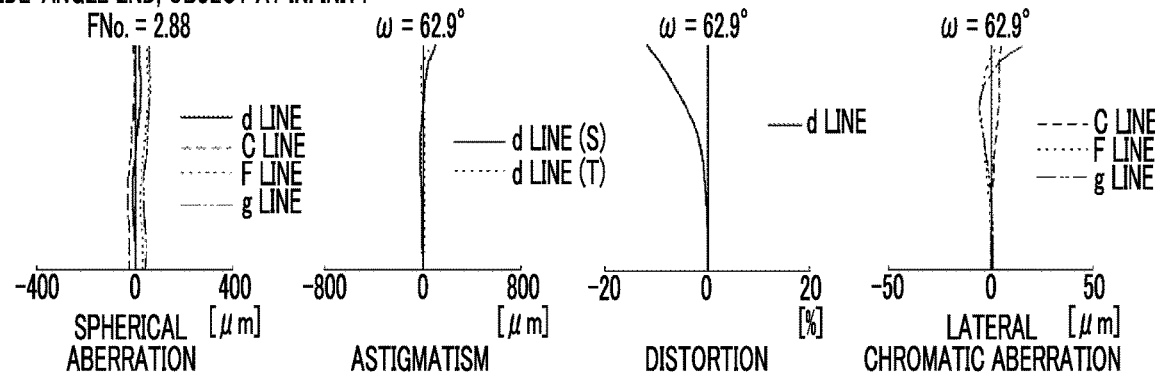
FIG. 14 shows aberration diagrams of the zoom lens according to Example 2 of the present invention.
Figure 14:
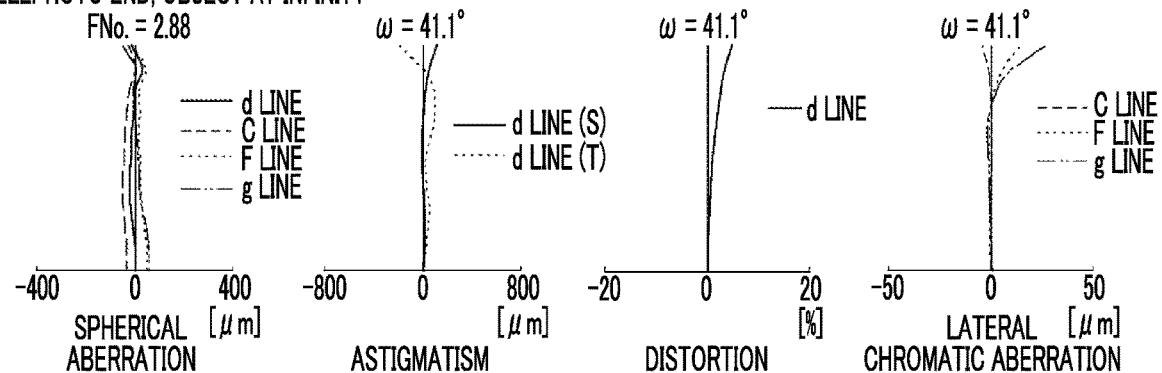
Figure 14:
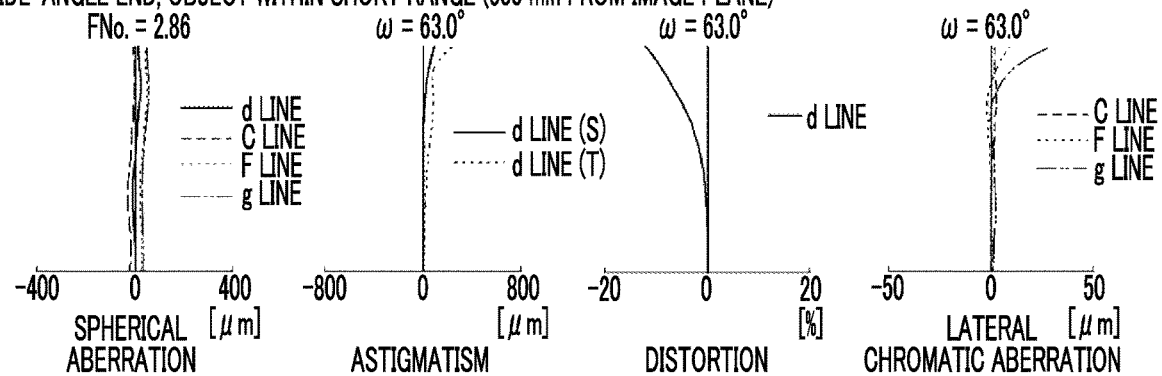
Figure 14:
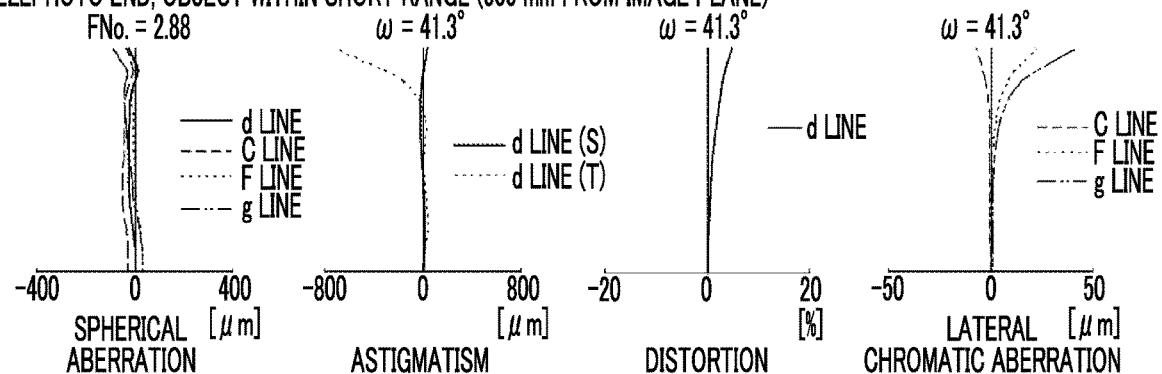

Table 4 shows basic lens data of the zoom lens according to Example 2, Table 5 shows specifications and variable surface distances, Table 6 shows aspherical surface coefficients thereof, and FIG. 14 shows aberration diagrams.

TABLE 4

Example 2

| Sn | R | D | Nd | νd | θgF |
|---|---|---|---|---|---|
| 1 | 41.57886 | 2.100 | 1.85150 | 40.78 | 0.56958 |
| 2 | 24.25407 | 6.125 | | | |
| *3 | 75.00000 | 2.504 | 1.69259 | 53.07 | 0.54955 |
| *4 | 18.47265 | 7.966 | | | |
| *5 | 35.69926 | 2.100 | 1.85108 | 40.12 | 0.56852 |
| *6 | 17.26489 | 8.101 | | | |
| 7 | −46.17859 | 1.146 | 1.43875 | 94.66 | 0.53402 |
| 8 | 26.32898 | 5.100 | 1.95375 | 32.32 | 0.59015 |
| 9 | 262.11995 | DD[9] | | | |
| 10(St) | ∞ | 1.300 | | | |
| *11 | 26.80662 | 4.452 | 1.69350 | 53.18 | 0.54831 |
| *12 | −35.63650 | 0.566 | | | |
| 13 | −61.30614 | 0.820 | 1.75500 | 52.32 | 0.54737 |
| 14 | 20.38264 | 2.417 | 1.59522 | 67.73 | 0.54426 |
| 15 | 178.44871 | 1.659 | | | |
| 16 | −317.69015 | 0.810 | 1.81600 | 46.62 | 0.55682 |
| 17 | 19.46256 | 3.500 | 1.64769 | 33.79 | 0.59393 |
| 18 | −81.81627 | 3.300 | | | |
| 19 | −277.52941 | 0.810 | 1.83481 | 42.72 | 0.56486 |
| 20 | 22.47336 | 4.482 | 1.59282 | 68.62 | 0.54414 |
| 21 | −34.64629 | 2.116 | | | |
| 22 | 42.23848 | 0.880 | 1.85150 | 40.78 | 0.56958 |
| 23 | 17.93578 | 4.893 | 1.43875 | 94.66 | 0.53402 |
| 24 | −57.98556 | 0.150 | | | |
| 25 | 25.48677 | 5.959 | 1.43875 | 94.66 | 0.53402 |

TABLE 4-continued

Example 2

| Sn | R | D | Nd | νd | θgF |
|---|---|---|---|---|---|
| 26 | −25.37606 | DD[26] | | | |
| *27 | −60.59195 | 2.288 | 1.85135 | 40.10 | 0.56954 |
| *28 | −22.78953 | 0.150 | | | |
| 29 | 170.69147 | 0.890 | 1.88300 | 40.76 | 0.56679 |
| 30 | 12.07645 | 5.852 | 1.49700 | 81.54 | 0.53748 |
| 31 | −141.73694 | 0.850 | 1.88300 | 40.76 | 0.56679 |
| 32 | 24.97038 | DD[32] | | | |
| 33 | 131.85158 | 2.500 | 1.95906 | 17.47 | 0.65993 |
| 34 | −104.15265 | 8.943 | | | |
| 35 | ∞ | 2.850 | 1.51680 | 64.20 | 0.53430 |
| 36 | ∞ | 0.998 | | | |

TABLE 5

Example 2

| | W-Infinity | T-Infinity | W-500 mm | T-500 mm |
|---|---|---|---|---|
| Zr | 1.000 | 1.883 | — | — |
| f | 8.238 | 15.517 | 8.195 | 15.323 |
| FNo. | 2.88 | 2.88 | 2.86 | 2.88 |
| 2ω(°) | 125.8 | 82.2 | 126.0 | 82.6 |
| DD[9] | 29.463 | 3.031 | 29.463 | 3.031 |
| DD[26] | 2.200 | 7.022 | 2.317 | 7.316 |
| DD[32] | 3.525 | 8.963 | 3.408 | 8.670 |

TABLE 6

Example 2

| Sn | 3 | 4 | 5 | 6 |
|---|---|---|---|---|
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | 1.5156791E−04 | 1.6374914E−04 | −8.8814963E−05 | −1.0516987E−04 |
| A5 | −9.0712096E−06 | −1.7761710E−05 | −1.8121361E−05 | −1.9226538E−05 |
| A6 | −9.2049009E−07 | 1.2690117E−07 | 4.3273839E−06 | 5.7643749E−06 |
| A7 | 1.3501012E−07 | 1.6616531E−07 | 2.7891184E−07 | 1.8068743E−07 |
| A8 | −7.0607683E−10 | −2.5650069E−08 | −8.3364000E−08 | −1.1421078E−07 |
| A9 | −9.3380967E−10 | 3.2446511E−09 | −2.6690256E−09 | −7.2236724E−10 |
| A10 | 3.7112077E−11 | −3.7601892E−10 | 9.0189314E−10 | 1.6310740E−09 |
| A11 | 3.8730063E−12 | 1.0528382E−11 | 1.7826049E−11 | −7.7246524E−11 |
| A12 | −2.1801993E−13 | 2.4804841E−12 | −6.1170327E−12 | −9.2933398E−12 |
| A13 | −1.0001266E−14 | −2.2284338E−13 | −7.7659318E−14 | 1.2135241E−12 |
| A14 | 6.5297267E−16 | 3.1132163E−15 | 2.6275845E−14 | −1.5859194E−14 |
| A15 | 1.5600421E−17 | 4.2397882E−16 | 1.9733519E−16 | −6.8377351E−15 |
| A16 | −1.1114900E−18 | −3.3465602E−17 | −6.8550768E−17 | 3.6853799E−16 |
| A17 | −1.3315482E−20 | 9.4421093E−19 | −2.5653251E−19 | 1.5918878E−17 |
| A18 | 1.0237693E−21 | 3.1045963E−20 | 9.8373488E−20 | −1.3183203E−18 |
| A19 | 4.7249477E−24 | −2.3173255E−21 | 1.2756392E−22 | −1.2072567E−20 |
| A20 | −3.9773030E−25 | 2.9331005E−23 | −5.9369543E−23 | 1.4970035E−21 |

| Sn | 11 | 12 | 27 | 28 |
|---|---|---|---|---|
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | 8.5013625E−06 | 3.7181176E−05 | −3.2617943E−05 | 4.9919455E−05 |
| A5 | −1.0632579E−05 | −7.1364321E−06 | 2.4946959E−05 | −9.5939703E−06 |
| A6 | 5.0286367E−06 | 3.0821562E−06 | −2.6744343E−05 | −1.8216522E−06 |
| A7 | −3.4509972E−07 | −7.3929168E−07 | 1.0475990E−05 | 7.4076796E−07 |
| A8 | −5.4904660E−07 | 1.0309078E−07 | −1.7888595E−06 | 5.4487057E−09 |
| A9 | 1.9465468E−07 | 2.4163434E−08 | −1.8253488E−08 | −2.9098532E−08 |
| A10 | −1.2451284E−08 | −1.6651615E−08 | 5.7224245E−08 | 1.8045725E−09 |
| A11 | −4.7794533E−09 | 2.0283161E−09 | −7.1464254E−09 | 6.6952922E−10 |
| A12 | 6.8206386E−10 | 4.7502649E−10 | −2.7951142E−10 | −6.6775033E−11 |
| A13 | 6.1078129E−11 | −1.1926956E−10 | 1.2731880E−10 | −9.3706892E−12 |
| A14 | −1.1895987E−11 | −2.8048301E−12 | −6.6195473E−12 | 1.1702961E−12 |
| A15 | −8.3816391E−13 | 2.4980730E−12 | −6.5672099E−13 | 7.8505572E−14 |
| A16 | 1.4724643E−13 | −8.1177234E−14 | 8.2505317E−14 | −1.1326790E−14 |
| A17 | 8.7093403E−15 | −2.4247830E−14 | −1.2144609E−15 | −3.6190285E−16 |
| A18 | −1.2640897E−15 | 1.4587642E−15 | −2.3266490E−16 | 5.8242693E−17 |

TABLE 6-continued

Example 2

| | | | | |
|---|---|---|---|---|
| A19 | −3.5687348E−17 | 9.1266978E−17 | 1.3805449E−17 | 7.0603159E−19 |
| A20 | 4.7637251E−18 | −7.0550367E−18 | −2.5097872E−19 | −1.2437938E−19 |

Example 3

Figure 4:
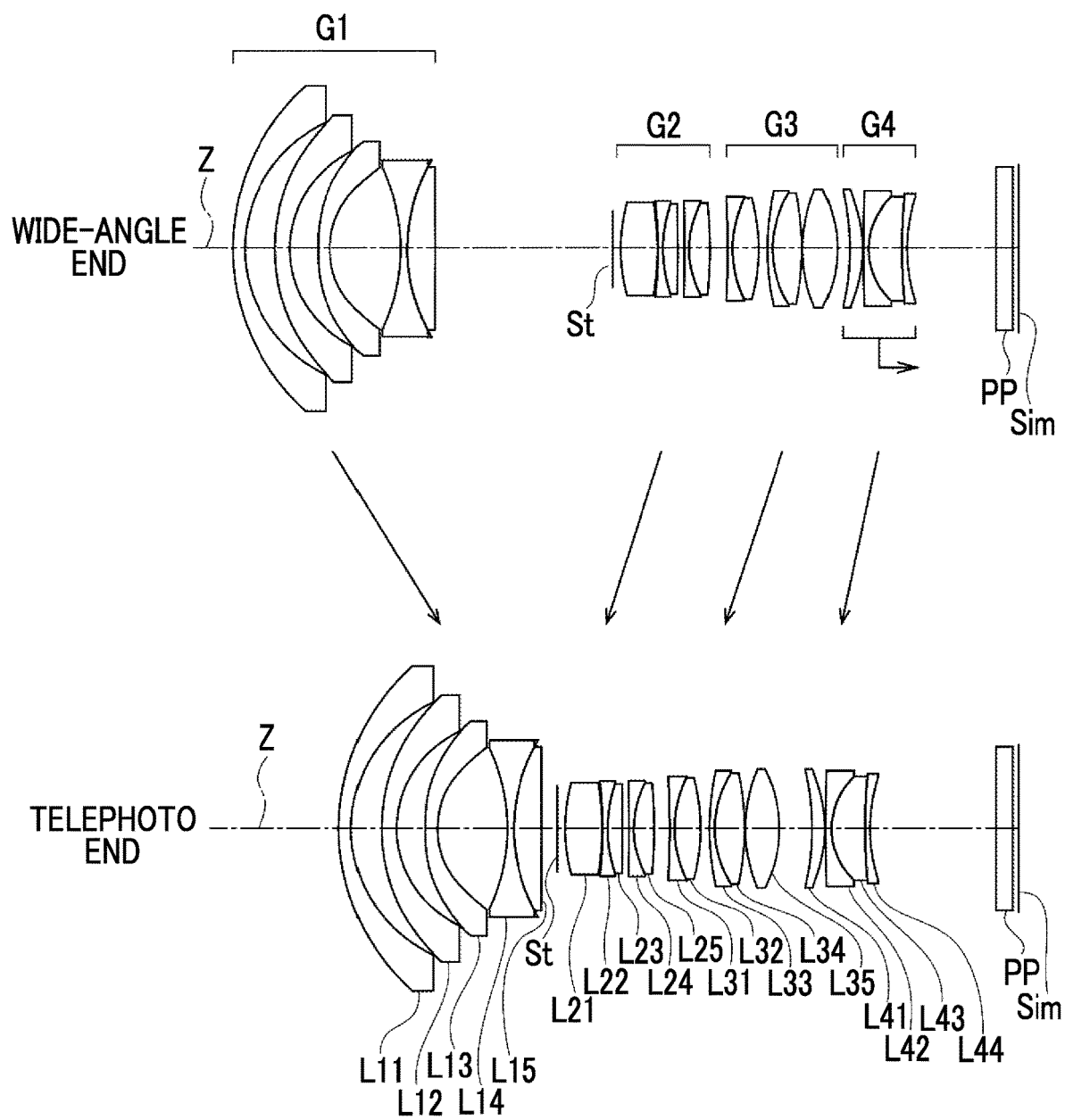
FIG. 4 is a diagram showing cross sections of lens configurations of a zoom lens according to Example 3 of the present invention at the wide-angle end and at the telephoto end and movement loci.

FIG. 4 shows cross sections and schematic movement loci of a zoom lens according to Example 3. The zoom lens according to Example 3 consists of a first lens group G1 having a negative refractive power, a second lens group G2 having a positive refractive power, a third lens group G3 having a positive refractive power, and a fourth lens group G4 having a negative refractive power in order from the object side to the image side. During zooming from the wide-angle end to the telephoto end and the first lens group G1 moves to the image side, the second lens group G2, the third lens group G3, and the fourth lens group G4 move to the object side. Thus, all the distances between the adjacent lens groups change. The first lens group G1 consists of five lenses such as lenses L11 to L15 in order from the object side to the image side, the second lens group G2 consists of an aperture stop St and five lenses such as lenses L21 to L25 in order from the object side to the image side, the third lens group G3 consists of five lenses such as lenses L31 to L35 in order from the object side to the image side, and the fourth lens group G4 consists of four lenses such as lenses L41 to L44 in order from the object side to the image side. The focusing lens group Gf is the entire fourth lens group G4.

Figure 15:
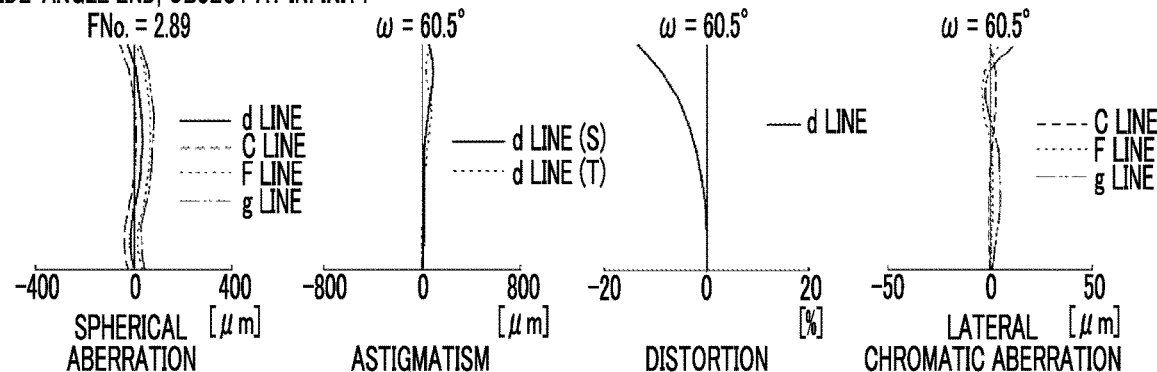
FIG. 15 shows aberration diagrams of the zoom lens according to Example 3 of the present invention.
Figure 15:
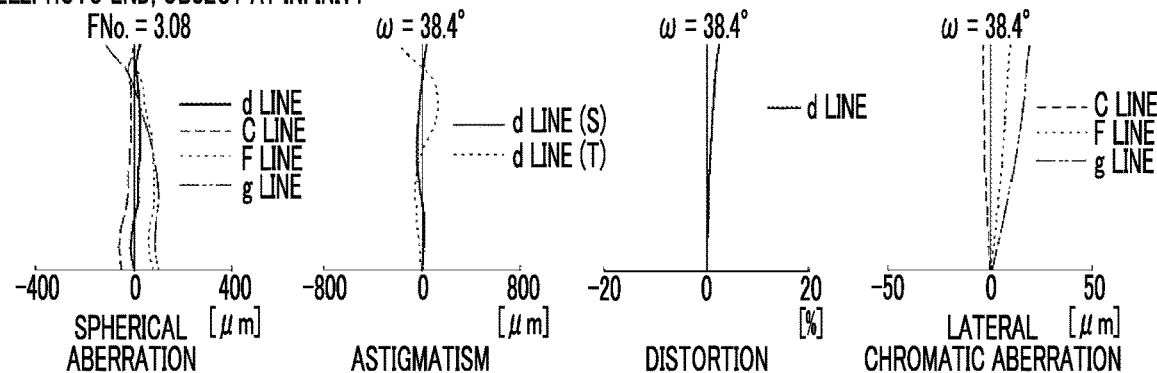
Figure 15:
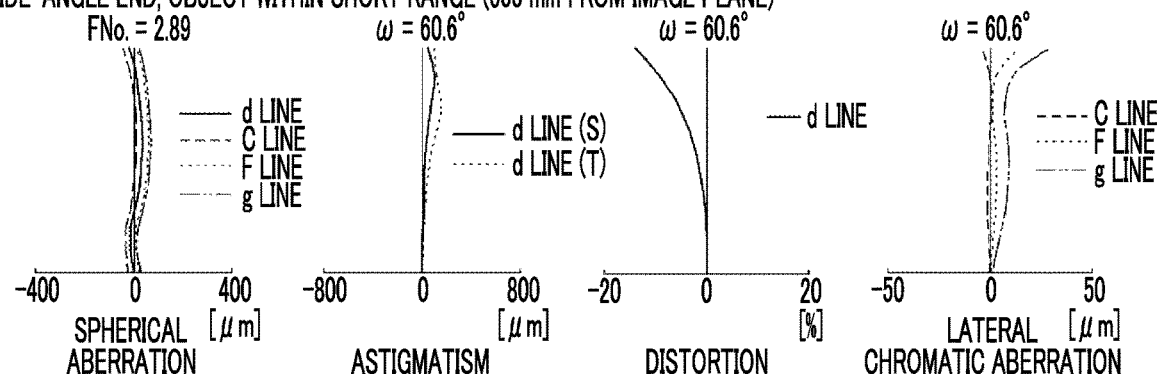
Figure 15:
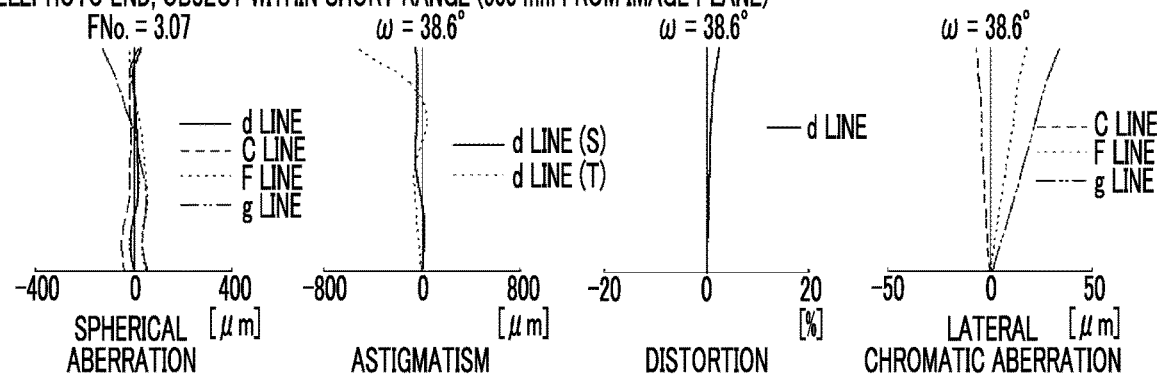

Table 7 shows basic lens data of the zoom lens according to Example 3, Table 8 shows specifications and variable surface distances, Table 9 shows aspherical surface coefficients thereof, and FIG. 15 shows aberration diagrams.

TABLE 7

Example 3

| Sn | R | D | Nd | vd | θgF |
|---|---|---|---|---|---|
| 1 | 37.99918 | 2.050 | 1.81352 | 46.65 | 0.55465 |
| 2 | 24.14081 | 5.099 | | | |
| *3 | 35.59663 | 2.504 | 1.99289 | 23.69 | 0.62146 |
| *4 | 19.04644 | 4.779 | | | |
| *5 | 42.92988 | 2.100 | 1.85108 | 40.12 | 0.56852 |
| *6 | 17.08576 | 11.798 | | | |
| 7 | −33.34593 | 1.120 | 1.43875 | 94.66 | 0.53402 |
| 8 | 30.28942 | 4.699 | 1.95375 | 32.32 | 0.59015 |

TABLE 7-continued

Example 3

| Sn | R | D | Nd | vd | θgF |
|---|---|---|---|---|---|
| 9 | −1553.33353 | DD[9] | | | |
| 10 (St) | ∞ | 1.314 | | | |
| *11 | 30.80661 | 6.239 | 1.77794 | 50.21 | 0.54894 |
| *12 | −42.33093 | 0.100 | | | |
| 13 | −71.71406 | 0.820 | 1.74073 | 50.89 | 0.55099 |
| 14 | 24.54512 | 2.469 | 1.49700 | 81.54 | 0.53748 |
| 15 | −399.64726 | 1.121 | | | |
| 16 | −470.41576 | 0.790 | 1.83259 | 44.74 | 0.55815 |
| 17 | 17.16717 | 3.493 | 1.68073 | 31.38 | 0.59488 |
| 18 | −84.47041 | DD[18] | | | |
| 19 | −158.35527 | 0.810 | 1.84607 | 43.39 | 0.56082 |
| 20 | 20.45760 | 4.379 | 1.59522 | 67.73 | 0.54426 |
| 21 | −34.34684 | 1.499 | | | |
| 22 | 47.46752 | 0.880 | 1.85312 | 40.61 | 0.56839 |
| 23 | 18.09806 | 5.018 | 1.43875 | 94.66 | 0.53402 |
| 24 | −45.56510 | 0.100 | | | |
| 25 | 26.85043 | 5.802 | 1.43875 | 94.66 | 0.53402 |
| 26 | −22.66757 | DD[26] | | | |
| *27 | −55.13921 | 2.165 | 1.85135 | 40.10 | 0.56954 |
| *28 | −23.68550 | 0.100 | | | |
| 29 | 261.49355 | 0.890 | 1.88300 | 40.76 | 0.56679 |
| 30 | 12.58792 | 5.610 | 1.49700 | 81.54 | 0.53748 |
| 31 | 99.37997 | 0.850 | 1.88300 | 40.76 | 0.56679 |
| 32 | 30.07342 | DD[32] | | | |
| 33 | ∞ | 2.850 | 1.51680 | 64.20 | 0.53430 |
| 34 | ∞ | 0.999 | | | |

TABLE 8

Example 3

| | W-Infinity | T-Infinity | W-500 mm | T-500 mm |
|---|---|---|---|---|
| Zr | 1.000 | 1.883 | — | — |
| f | 9.265 | 17.451 | 9.198 | 17.117 |
| FNo. | 2.89 | 3.08 | 2.89 | 3.07 |
| 2ω(°) | 121.0 | 76.8 | 121.2 | 77.2 |
| DD[9] | 29.998 | 2.633 | 29.998 | 2.633 |
| DD[18] | 3.000 | 2.605 | 3.000 | 2.605 |
| DD[26] | 2.055 | 5.567 | 2.195 | 5.900 |
| DD[32] | 14.970 | 21.200 | 14.830 | 20.868 |

TABLE 9

Example 3

| Sn | 3 | 4 | 5 | 6 |
|---|---|---|---|---|
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | 1.8653627E−05 | −1.1249714E−05 | 3.6774134E−05 | 5.4538416E−05 |
| A5 | 5.4631576E−06 | 2.6719413E−06 | −3.8926308E−07 | 2.4279446E−06 |
| A6 | −4.3657788E−08 | 2.7010546E−07 | 1.1365741E−06 | 1.0970747E−06 |
| A7 | 6.4042895E−09 | −4.5270907E−08 | 1.2306813E−07 | 6.5575677E−08 |
| A8 | −1.6980981E−09 | 1.5229011E−10 | −2.9597008E−08 | −3.0893979E−08 |
| A9 | −1.1629932E−10 | 4.3579310E−10 | −2.0002280E−10 | −1.7685576E−09 |
| A10 | 1.8465428E−11 | −5.7910082E−11 | 3.1290814E−10 | 3.6785292E−10 |
| A11 | 7.6190855E−13 | −2.4789705E−12 | 1.7767508E−11 | 1.3104759E−11 |
| A12 | −8.6113503E−14 | 6.3341097E−13 | −2.0558369E−12 | −2.8242882E−12 |
| A13 | −2.6321701E−15 | 8.4672178E−15 | −9.0257914E−14 | 3.4455869E−14 |
| A14 | 2.1838804E−16 | −2.8362378E−15 | 8.8187018E−15 | 1.2002433E−14 |
| A15 | 5.0664220E−18 | −1.6347103E−17 | 2.5331244E−16 | −1.0257913E−15 |

TABLE 9-continued

Example 3

| | | | | |
|---|---|---|---|---|
| A16 | −3.1186625E−19 | 5.2804074E−18 | −2.3226910E−17 | −3.8788912E−18 |
| A17 | −5.1403336E−21 | 1.4460835E−20 | −3.5949537E−19 | 5.1891087E−18 |
| A18 | 2.3427439E−22 | −1.2301601E−21 | 3.3201571E−20 | −1.5551891E−19 |
| A19 | 2.1453680E−24 | −2.1312597E−24 | 1.9814768E−22 | −8.4230290E−21 |
| A20 | −7.1222569E−26 | −5.1665384E−24 | −1.9382541E−23 | 3.7039395E−22 |

| Sn | 11 | 12 | 27 | 28 |
|---|---|---|---|---|
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | 1.2347920E−05 | 8.1546419E−06 | −8.2942493E−05 | 2.1750019E−05 |
| A5 | −8.7165270E−06 | 1.5376740E−05 | 4.3001829E−05 | −2.1594780E−05 |
| A6 | 1.5967426E−06 | −2.7311680E−06 | −2.6894541E−05 | 6.4033127E−06 |
| A7 | 2.9623001E−07 | −1.2522831E−06 | 1.0254390E−05 | 6.2601402E−07 |
| A8 | −4.7555152E−08 | 5.5735626E−07 | −1.8342978E−06 | −4.5779192E−07 |
| A9 | −3.2382724E−08 | −6.2854035E−09 | −2.1012585E−08 | 1.0366821E−08 |
| A10 | 3.4554272E−09 | −3.2039148E−08 | 6.19527.13E−08 | 1.4493944E−08 |
| A11 | 1.9451415E−09 | 4.3094838E−09 | −7.4166387E−09 | −9.0472639E−10 |
| A12 | −2.6402955E−10 | 7.2546476E−10 | −3.6147037E−10 | −2.5315989E−10 |
| A13 | −5.1438216E−11 | −1.8677460E−10 | 1.3335709E−10 | 2.0689556E−11 |
| A14 | 8.7946270E−12 | −4.1184787E−12 | −6.0801859E−12 | 2.5426916E−12 |
| A15 | 6.2022429E−13 | 3.7896816E−12 | −6.6634932E−13 | −2.3269348E−13 |
| A16 | −1.3800331E−13 | −1.3499925E−13 | 7.8955818E−14 | −1.4053020E−14 |
| A17 | −2.8974041E−15 | −3.6109174E−14 | −1.6593657E−15 | 1.3190157E−15 |
| A18 | 1.0122026E−15 | 2.3256214E−15 | −1.9197625E−16 | 3.6194488E−17 |
| A19 | 8.6045771E−19 | 1.3934838E−16 | 1.6095999E−17 | −3.0132977E−18 |
| A20 | −2.7124865E−18 | −1.1500892E−17 | −4.3047273E−19 | −2.3000887E−20 |

Example 4

Figure 5:
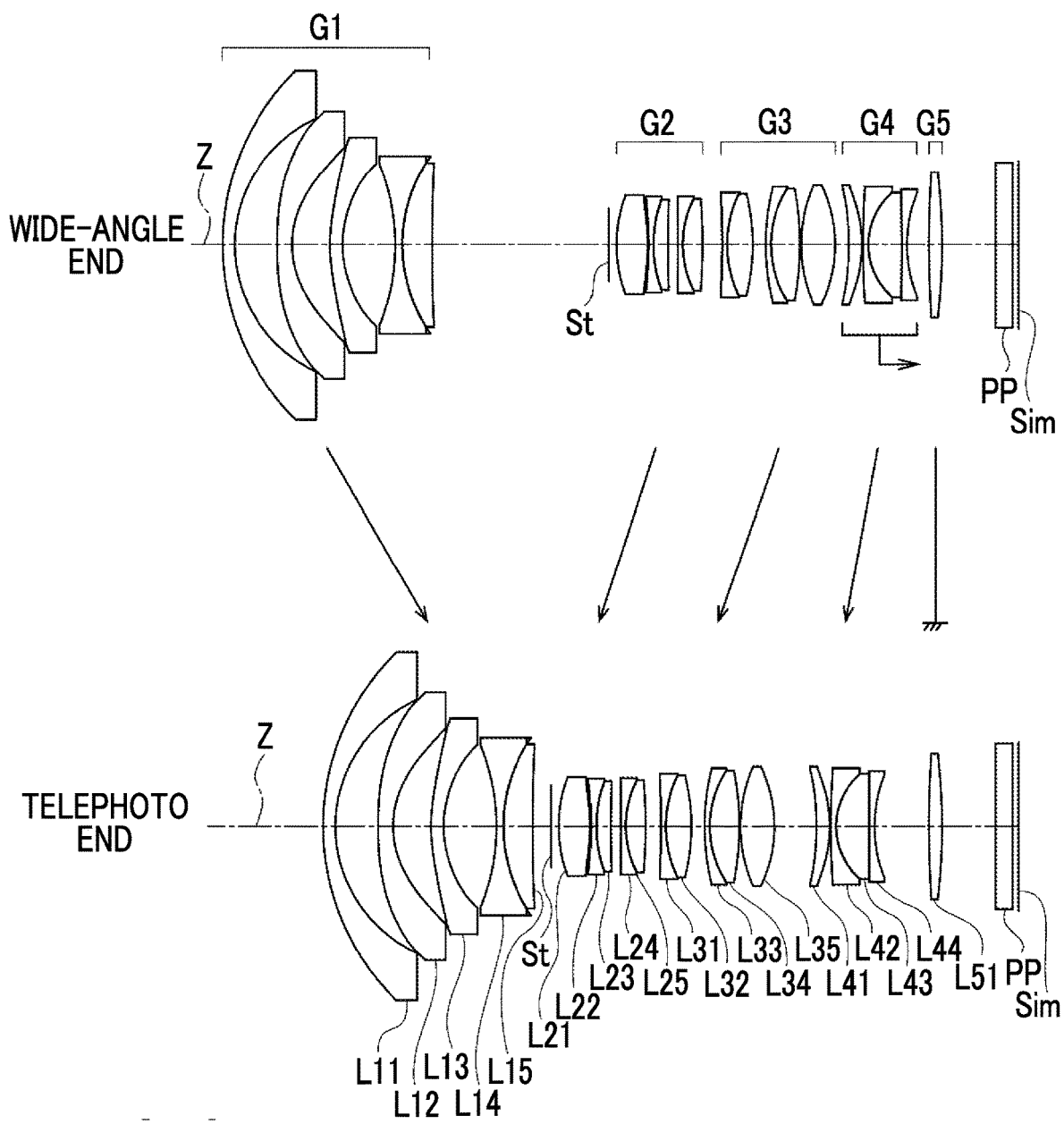
FIG. 5 is a diagram showing cross sections of lens configurations of a zoom lens according to Example 4 of the present invention at the wide-angle end and at the telephoto end and movement loci.
Figure 16:
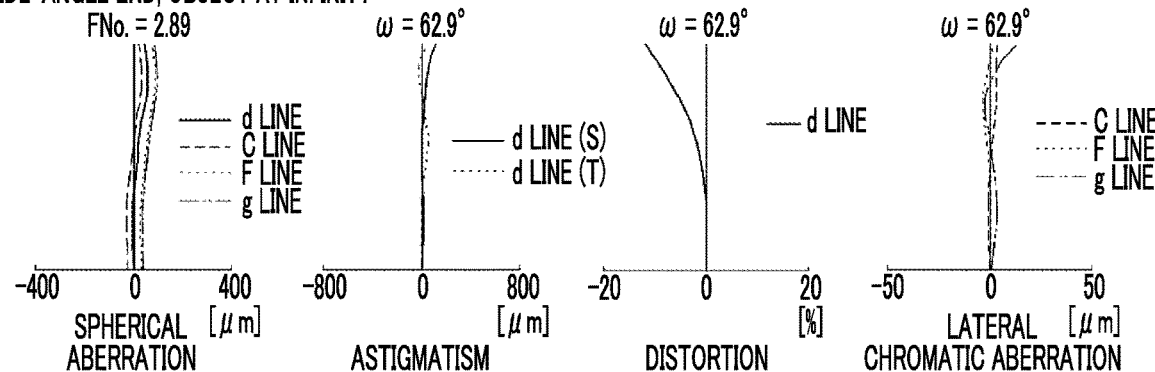
FIG. 16 shows aberration diagrams of the zoom lens according to Example 4 of the present invention.
Figure 16:
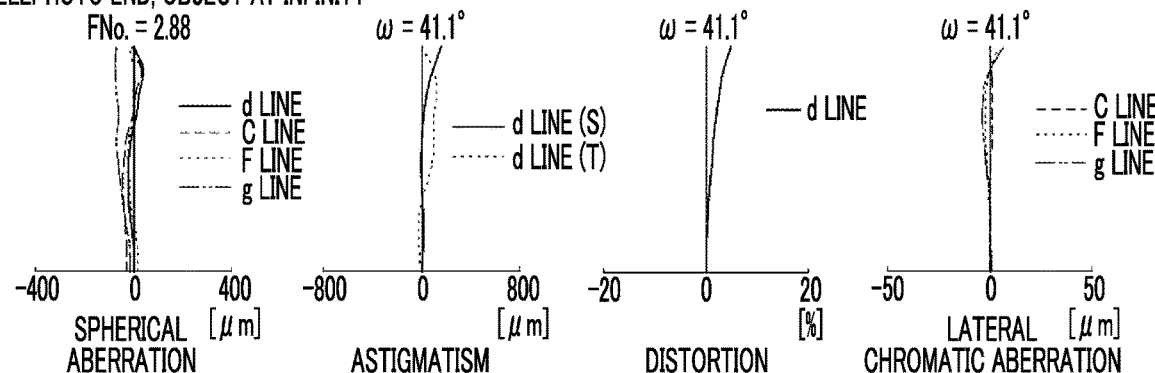
Figure 16:
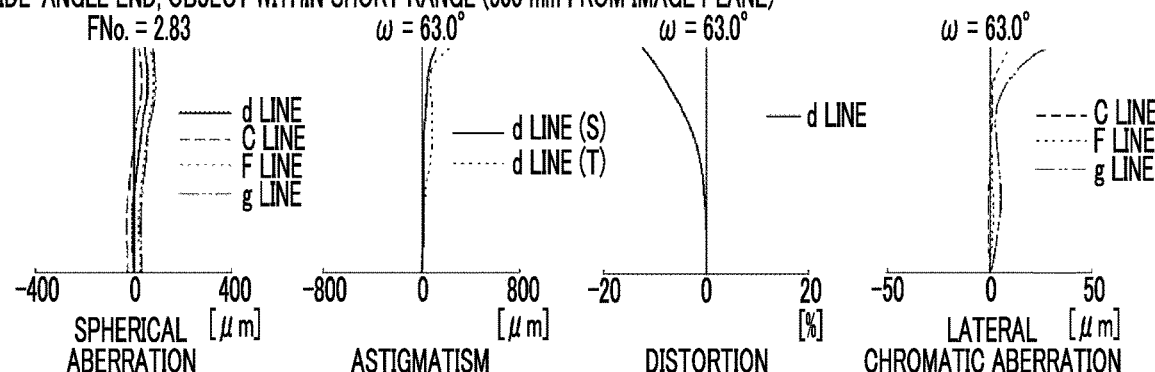
Figure 16:
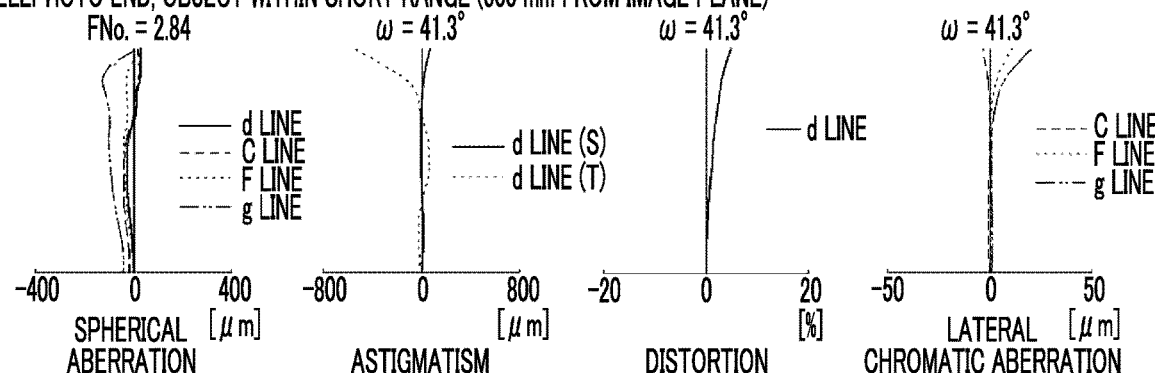

FIG. 5 shows cross sections and schematic movement loci of a zoom lens according to Example 4. The zoom lens according to Example 4 has the same configuration as the outline of the zoom lens according to Example 1. Table 10 shows basic lens data of the zoom lens according to Example 4, Table 11 shows specifications and variable surface distances, Table 12 shows aspherical surface coefficients thereof, and FIG. 16 shows aberration diagrams.

TABLE 10

Example 4

| Sn | R | D | Nd | vd | θgF |
|---|---|---|---|---|---|
| 1 | 42.67431 | 2.050 | 1.85150 | 40.78 | 0.56958 |
| 2 | 24.17403 | 7.218 | | | |
| *3 | 186.38308 | 2.504 | 1.69350 | 53.18 | 0.54831 |
| *4 | 18.76100 | 6.342 | | | |
| *5 | 27.10033 | 2.100 | 1.85108 | 40.12 | 0.56852 |
| *6 | 17.33532 | 8.887 | | | |
| 7 | −37.31014 | 1.161 | 1.43875 | 94.66 | 0.53402 |
| 8 | 26.93188 | 4.990 | 1.95375 | 32.32 | 0.59015 |
| 9 | 294.00006 | DD[9] | | | |
| 10(St) | ∞ | 1.300 | | | |
| *11 | 25.98740 | 5.209 | 1.69350 | 53.18 | 0.54831 |
| *12 | −37.87609 | 0.161 | | | |
| 13 | −71.74406 | 0.820 | 1.73354 | 50.92 | 0.55158 |
| 14 | 23.13730 | 2.423 | 1.59522 | 67.73 | 0.54426 |
| 15 | 272.15551 | 1.696 | | | |
| 16 | −438.10014 | 0.790 | 1.83954 | 44.05 | 0.55951 |
| 17 | 17.80689 | 3.333 | 1.64769 | 33.79 | 0.59393 |
| 18 | −95.82496 | DD[18] | | | |
| 19 | −160.67334 | 0.810 | 1.84584 | 43.42 | 0.56078 |
| 20 | 20.65061 | 4.297 | 1.59522 | 67.73 | 0.54426 |
| 21 | −36.01869 | 2.187 | | | |
| 22 | 42.31198 | 0.880 | 1.83517 | 44.22 | 0.55940 |
| 23 | 17.93272 | 4.972 | 1.43875 | 94.66 | 0.53402 |
| 24 | −51.39177 | 0.181 | | | |
| 25 | 26.04523 | 5.716 | 1.43875 | 94.66 | 0.53402 |
| 26 | −24.11193 | DD[26] | | | |
| *27 | −62.75366 | 2.250 | 1.85135 | 40.10 | 0.56954 |
| *28 | −23.11976 | 0.169 | | | |

TABLE 10-continued

Example 4

| Sn | R | D | Nd | vd | θgF |
|---|---|---|---|---|---|
| 29 | 160.90135 | 0.899 | 1.88300 | 40.76 | 0.56679 |
| 30 | 12.14725 | 5.630 | 1.49700 | 81.54 | 0.53748 |
| 31 | −650.23820 | 0.850 | 1.88300 | 40.76 | 0.56679 |
| 32 | 24.56773 | DD[32] | | | |
| 33 | 186.91532 | 2.241 | 1.95906 | 17.47 | 0.65993 |
| 34 | −106.63809 | 8.957 | | | |
| 35 | ∞ | 2.850 | 1.51680 | 64.20 | 0.53430 |
| 36 | ∞ | 1.001 | | | |

TABLE 11

Example 4

| | W-Infinity | T-Infinity | W-500 mm | T-500 mm |
|---|---|---|---|---|
| Zr | 1.000 | 1.883 | — | — |
| f | 8.236 | 15.513 | 8.192 | 15.310 |
| FNo. | 2.89 | 2.88 | 2.83 | 2.84 |
| 2ω(°) | 125.8 | 82.2 | 126.0 | 82.6 |
| DD[9] | 29.677 | 3.146 | 29.677 | 3.146 |
| DD[18] | 3.300 | 2.597 | 3.300 | 2.597 |
| DD[26] | 2.292 | 7.117 | 2.414 | 7.420 |
| DD[32] | 3.670 | 9.122 | 3.548 | 8.819 |

TABLE 12

Example 4

| Sn | 3 | 4 | 5 | 6 |
|---|---|---|---|---|
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | 2.1445858E−04 | 1.8461883E−04 | −9.9451065E−05 | −1.0906043E−04 |
| A5 | −1.2985368E−05 | −1.0276536E−05 | −1.8928099E−05 | −1.8477134E−05 |
| A6 | −1.8231203E−06 | −1.7101198E−06 | 3.6234741E−06 | 5.1614028E−06 |
| A7 | 2.0074909E−07 | −4.0339021E−08 | 2.9745042E−07 | 1.4877817E−07 |
| A8 | 5.3954269E−09 | 2.4237593E−08 | −7.3434536E−08 | −1.1587250E−07 |
| A9 | −1.4924077E−09 | 2.1920222E−09 | −2.8111215E−09 | 3.8059684E−09 |
| A10 | 2.2509337E−11 | −4.4007090E−10 | 8.7573188E−10 | 1.3795096E−09 |
| A11 | 6.4380756E−12 | −2.2330857E−11 | 1.8483791E−11 | −1.1020155E−10 |
| A12 | −2.4169095E−13 | 4.8045007E−12 | −6.5447584E−12 | −7.7291138E−12 |
| A13 | −1.6909836E−14 | 1.1579301E−13 | −7.9024448E−14 | 1.2515626E−12 |
| A14 | 8.7441380E−16 | −2.9447988E−14 | 3.0505737E−14 | 1.4431896E−16 |
| A15 | 2.6729528E−17 | −3.4578372E−16 | 1.9651707E−16 | −7.4977127E−15 |
| A16 | −1.6506986E−18 | 1.0169269E−16 | −8.5263067E−17 | 2.3649071E−16 |
| A17 | −2.3394713E−20 | 5.7555226E−19 | −2.4621714E−19 | 2.3175488E−17 |
| A18 | 1.6313682E−21 | −1.8580166E−19 | 1.3009301E−19 | −1.1434451E−18 |
| A19 | 8.7255160E−24 | −4.2121116E−22 | 1.1262502E−22 | −2.8962941E−20 |
| A20 | −6.6986610E−25 | 1.4019617E−22 | −8.3130498E−23 | 1.7554360E−21 |

| Sn | 11 | 12 | 27 | 28 |
|---|---|---|---|---|
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | 1.3870308E−05 | 3.4408218E−05 | −4.9852148E−05 | 7.0704335E−05 |
| A5 | −6.1377377E−06 | −9.2976724E−07 | 3.6346981E−05 | −2.8667850E−05 |
| A6 | 1.6839811E−06 | 2.1508636E−06 | −2.9076299E−05 | 3.1860450E−06 |
| A7 | −1.1998101E−07 | −9.7173789E−07 | 1.0451078E−05 | 1.1265996E−06 |
| A8 | −2.7600084E−08 | 1.6408518E−07 | −1.7136700E−06 | −3.2201902E−07 |
| A9 | 5.7943768E−09 | 3.2018083E−08 | −2.4313123E−08 | −9.6344043E−08 |
| A10 | −1.9503453E−10 | −1.8323815E−08 | 5.7437014E−08 | 1.0755792E−08 |
| A11 | 2.6957849E−10 | 1.5646972E−09 | −7.4019612E−09 | −4.2522302E−10 |
| A12 | −6.8858616E−11 | 5.3622644E−10 | −2.5485055E−10 | −1.8665796E−10 |
| A13 | −1.0464501E−11 | −1.0243464E−10 | 1 .3381511E−10 | 1.3641831E−11 |
| A14 | 3.7334450E−12 | −5.6492979E−12 | −7.6502144E−12 | 1.7883771E−12 |
| A15 | 5.2379685E−14 | 2.4053660E−12 | −6.7509620E−13 | −1.7058365E−13 |
| A16 | −6.9105098E−14 | −4.8592127E−14 | 9.2941619E−14 | −8.8014053E−15 |
| A17 | 1.2502318E−15 | −2.4268411E−14 | −1.5973514E−15 | 1.0183495E−15 |
| A18 | 5.5457564E−16 | 1.2608473E−15 | −2.6086785E−16 | 1.5800993E−17 |
| A19 | −1.1465453E−17 | 9.7877074E−17 | 1.5932396E−17 | −2.3995132E−18 |
| A20 | −1.6242722E−18 | −6.9875921E−18 | −2.8644656E−19 | 1.0828343E−20 |

Example 5

Figure 6:
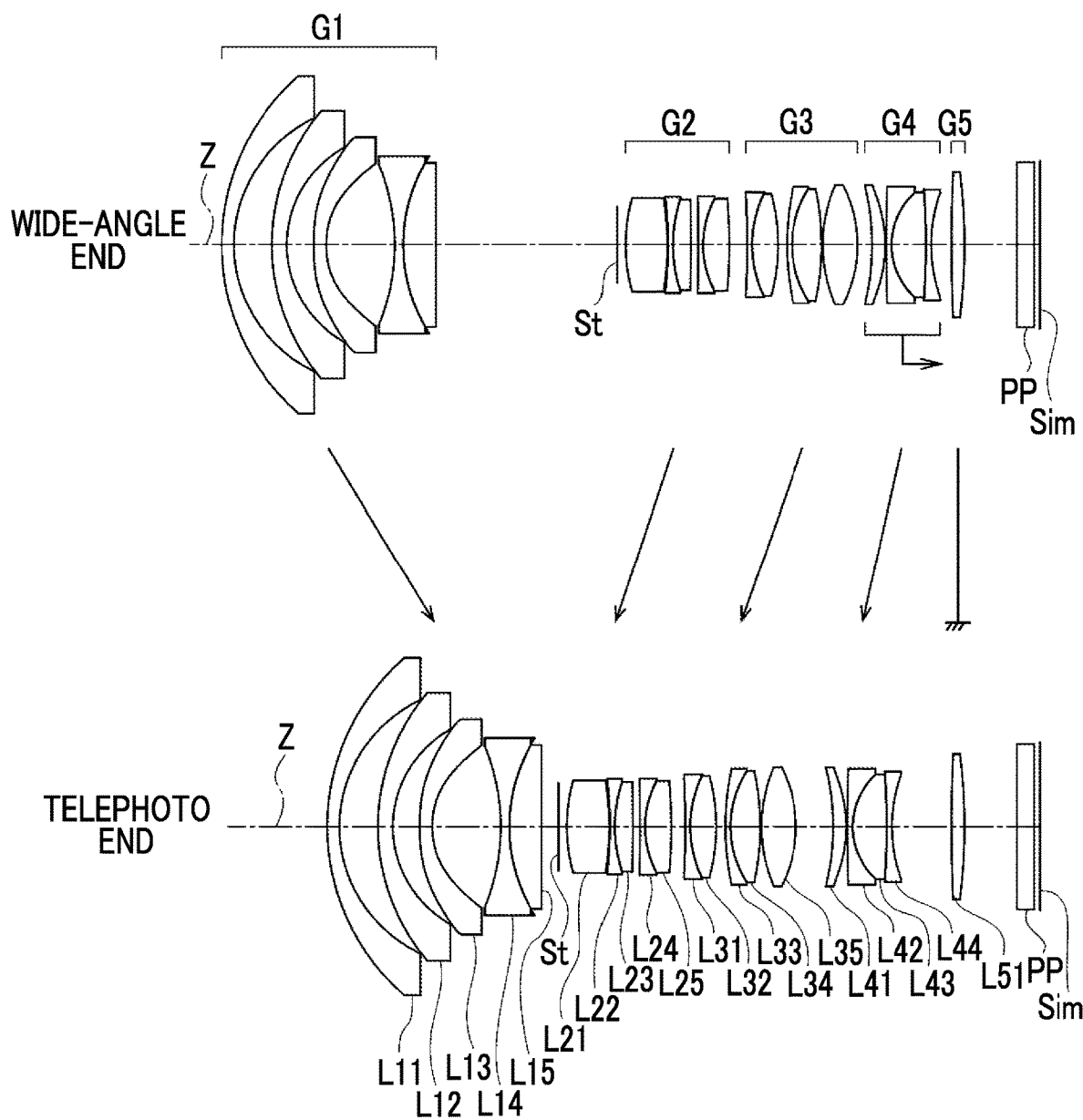
FIG. 6 is a diagram showing cross sections of lens configurations of a zoom lens according to Example 5 of the present invention at the wide-angle end and at the telephoto end and movement loci.
Figure 17:
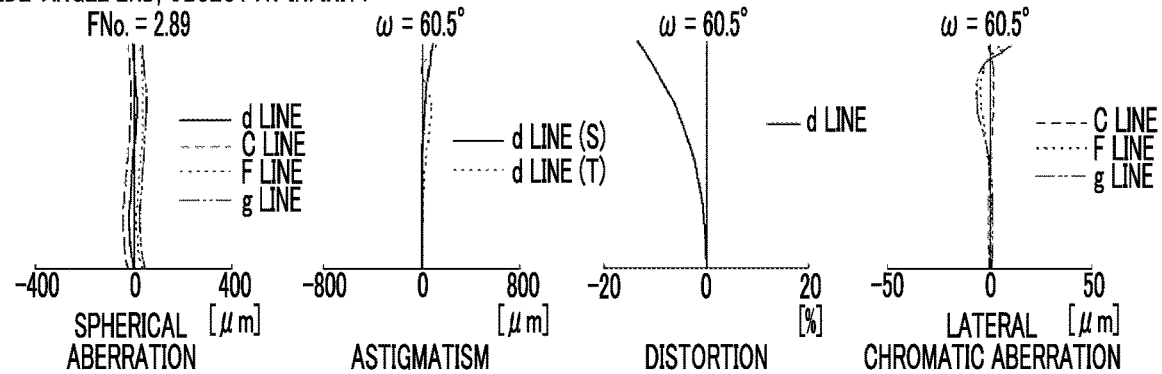
FIG. 17 shows aberration diagrams of the zoom lens according to Example 5 of the present invention.
Figure 17:
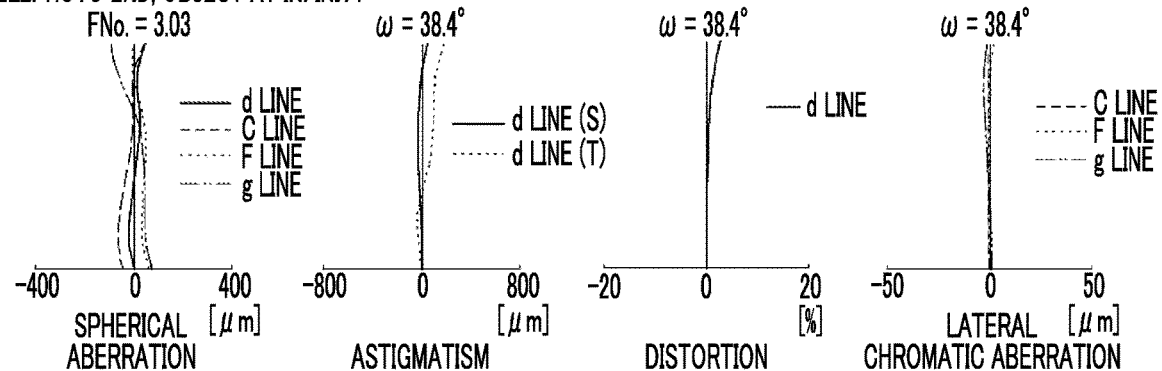
Figure 17:
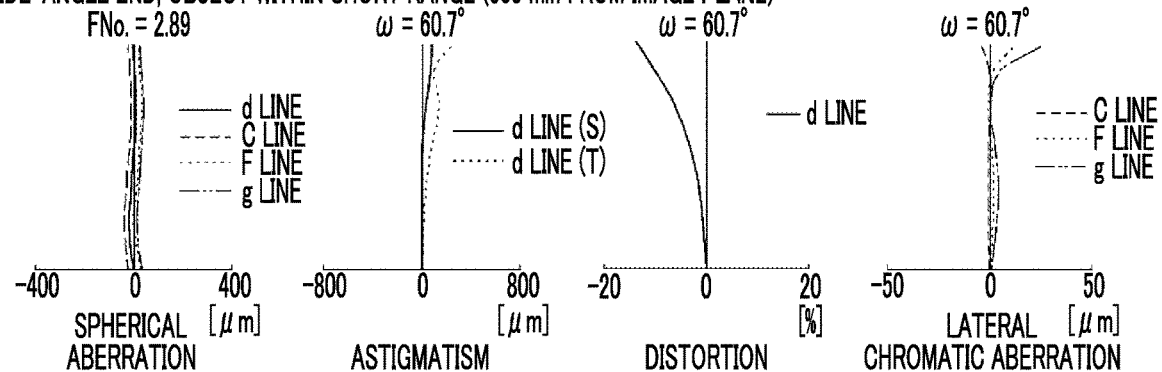
Figure 17:
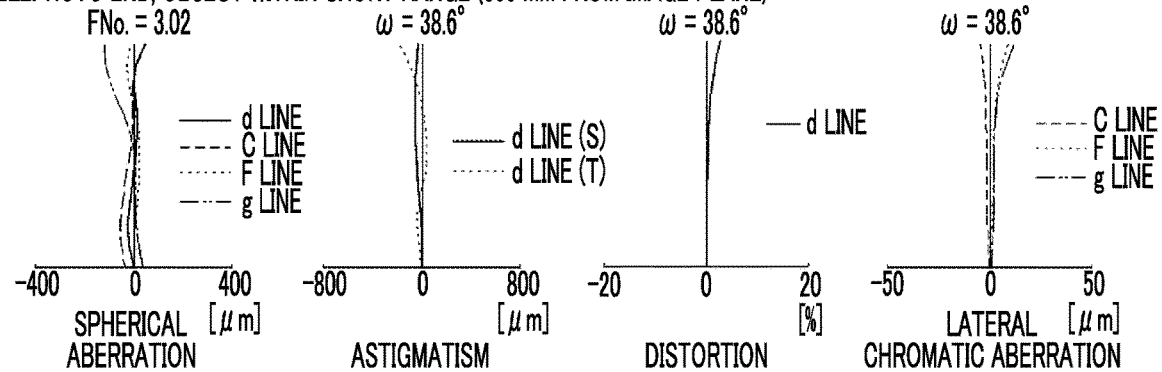

FIG. 6 shows cross sections and schematic movement loci of a zoom lens according to Example 5. The zoom lens according to Example 5 has the same configuration as the outline of the zoom lens according to Example 1. Table 13 shows basic lens data of the zoom lens according to Example 5, Table 14 shows specifications and variable surface distances, Table 15 shows aspherical surface coefficients thereof, and FIG. 17 shows aberration diagrams.

TABLE 13

Example 5

| Sn | R | D | Nd | vd | θgF |
|---|---|---|---|---|---|
| 1 | 38.95404 | 2.050 | 1.59964 | 61.17 | 0.54207 |
| 2 | 24.29601 | 6.461 | | | |
| 3 | 36.16852 | 2.504 | 1.95986 | 29.28 | 0.60068 |
| 4 | 19.41637 | 4.501 | | | |
| *5 | 55.83133 | 2.100 | 1.85108 | 40.12 | 0.56852 |
| *6 | 17.07895 | 11.507 | | | |
| 7 | −36.94534 | 1.410 | 1.43875 | 94.66 | 0.53402 |
| 8 | 28.85934 | 5.496 | 1.95375 | 32.32 | 0.59015 |
| 9 | 7631.46066 | DD[9] | | | |
| 10(St) | ∞ | 1.400 | | | |
| *11 | 30.78601 | 7.000 | 1.78831 | 49.17 | 0.55050 |
| *12 | −42.25353 | 0.100 | | | |

TABLE 13-continued

Example 5

| Sn | R | D | Nd | vd | θgF |
|---|---|---|---|---|---|
| 13 | −72.06911 | 0.820 | 1.73493 | 43.37 | 0.56861 |
| 14 | 25.11815 | 3.000 | 1.49700 | 81.54 | 0.53748 |
| 15 | −462.01491 | 1.248 | | | |
| 16 | −446.27718 | 0.810 | 1.83102 | 44.90 | 0.55785 |
| 17 | 17.21951 | 4.402 | 1.68037 | 31.40 | 0.59482 |
| 18 | −88.23306 | DD[18] | | | |
| 19 | −154.73880 | 0.810 | 1.84875 | 43.13 | 0.56138 |
| 20 | 20.58594 | 4.370 | 1.59522 | 67.73 | 0.54426 |
| 21 | −34.11180 | 1.500 | | | |
| 22 | 48.07929 | 0.880 | 1.85369 | 42.63 | 0.56241 |
| 23 | 18.18623 | 4.989 | 1.43875 | 94.66 | 0.53402 |
| 24 | −46.01267 | 0.218 | | | |
| 25 | 26.55479 | 5.798 | 1.43875 | 94.66 | 0.53402 |
| 26 | −22.98546 | DD[26] | | | |
| *27 | −55.09969 | 2.222 | 1.85135 | 40.10 | 0.56954 |
| *28 | −23.71329 | 0.178 | | | |
| 29 | 325.34179 | 0.890 | 1.88300 | 40.76 | 0.56679 |
| 30 | 12.39644 | 5.769 | 1.49700 | 81.54 | 0.53748 |
| 31 | −124.40641 | 0.850 | 1.88300 | 40.76 | 0.56679 |
| 32 | 27.25871 | DD[32] | | | |
| 33 | 258.79796 | 2.209 | 1.95906 | 17.47 | 0.65993 |
| 34 | −100.37566 | 8.821 | | | |
| 35 | ∞ | 2.850 | 1.51680 | 64.20 | 0.53430 |
| 36 | ∞ | 1.000 | | | |

TABLE 14

Example 5

| | W-Infinity | T-Infinity | W-500 mm | T-500 mm |
|---|---|---|---|---|
| Zr | 1.000 | 1.883 | — | — |
| f | 9.267 | 17.454 | 9.201 | 17.171 |
| FNo. | 2.89 | 3.03 | 2.89 | 3.02 |
| 2ω(°) | 121.0 | 76.8 | 121.4 | 77.2 |
| DD[9] | 30.402 | 2.885 | 30.402 | 2.885 |
| DD[18] | 3.000 | 2.366 | 3.000 | 2.366 |
| DD[26] | 2.474 | 6.282 | 2.603 | 6.581 |
| DD[32] | 3.408 | 9.972 | 3.279 | 9.673 |

TABLE 15

Example 5

| Sn | 5 | 6 | 11 | 12 |
|---|---|---|---|---|
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | 2.0772371E−04 | 2.1632508E−04 | 1.3826615E−05 | 1.5775499E−05 |
| A5 | −4.1471929E−06 | −9.8785219E−07 | −6.9889974E−06 | 1.3419060E−05 |
| A6 | −3.1143594E−06 | −3.7514022E−06 | 1.9974955E−06 | −2.7890153E−06 |
| A7 | 1.7787261E−07 | 8.3797182E−08 | −8.6684708E−08 | −1.0340126E−06 |
| A8 | 2.8665480E−08 | 4.6521246E−08 | −4.6580772E−08 | 5.4165665E−07 |
| A9 | −2.4917792E−09 | −1.2711851E−09 | 2.3780837E−09 | −1.5194860E−08 |
| A10 | −1.6995693E−10 | −3.9769932E−10 | 3.5898884E−10 | −3.1479767E−08 |
| A11 | 2.0579761E−11 | 1.8314111E−12 | 4.2716089E−10 | 4.5115844E−09 |
| A12 | 5.0157450E−13 | 2.4650398E−12 | −6.4331176E−11 | 7.3514117E−10 |
| A13 | −1.0065191E−13 | 1.4088074E−13 | −1.5217439E−11 | −1.8892909E−10 |
| A14 | −2.3232230E−17 | −1.5818956E−14 | 2.9853151E−12 | −5.1732299E−12 |
| A15 | 2.7747474E−16 | −1.5650129E−15 | 1.3900173E−13 | 3.7904676E−12 |
| A16 | −3.6766558E−18 | 1.0398961E−16 | −4.8689669E−14 | −1.0793788E−13 |
| A17 | −3.9172344E−19 | 6.6253374E−18 | 4.1371128E−16 | −3.5932906E−14 |
| A18 | 7.9372975E−21 | −4.1542718E−19 | 3.0715607E−16 | 2.0185135E−15 |
| A19 | 2.1699753E−22 | −1.0008167E−20 | −8.1902841E−18 | 1.3831668E−16 |
| A20 | −4.8577618E−24 | 6.4757165E−22 | −4.6179543E−19 | −1–0164821E−17 |

| Sn | 27 | 28 |
|---|---|---|
| KA | 1.0000000E+00 | 1.0000000E+00 |
| A3 | 0.0000000E+00 | 0.0000000E+00 |
| A4 | −6.1140987E−05 | 3.2909579E−05 |
| A5 | 3.5907112E−05 | −2.4137581E−05 |
| A6 | −2.8614464E−05 | 5.0471046E−06 |
| A7 | 1.0698290E−05 | 7.1457390E−07 |
| A8 | −1.7422518E−06 | −3.6422952E−07 |
| A9 | −3.7463861E−08 | 8.3383377E−09 |
| A10 | 5.8692232E−08 | 1.0747926E−08 |
| A11 | −7.0438545E−09 | −8.7608398E−10 |
| A12 | −2.8756471E−10 | −1.6344056E−10 |
| A13 | 1.2813248E−10 | 2.0455516E−11 |
| A14 | −7.1396755E−12 | 1.2309547E−12 |
| A15 | −6.2217890E−13 | −2.3174784E−13 |
| A16 | 8.8240113E−14 | −2.5667183E−15 |
| A17 | −1.8657032E−15 | 1.3182165E−15 |
| A18 | −2.3729374E−16 | −1.9140597E−17 |
| A19 | 1.6504872E−17 | −3.0171406E−18 |
| A20 | −3.3620442E−19 | 8.9735427E−20 |

Example 6

Figure 7:
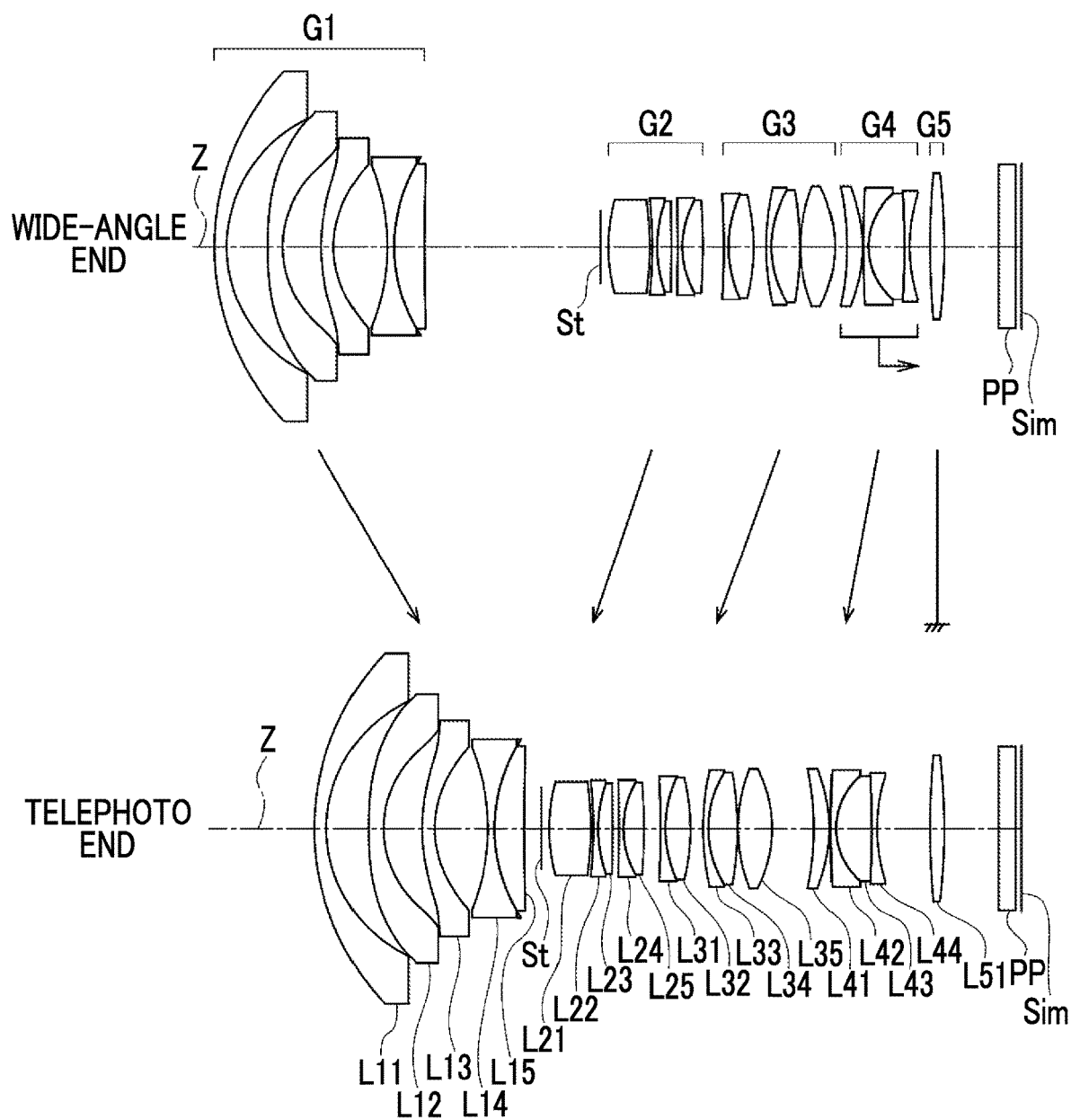
FIG. 7 is a diagram showing cross sections of lens configurations of a zoom lens according to Example 6 of the present invention at the wide-angle end and at the telephoto end and movement loci.
Figure 18:
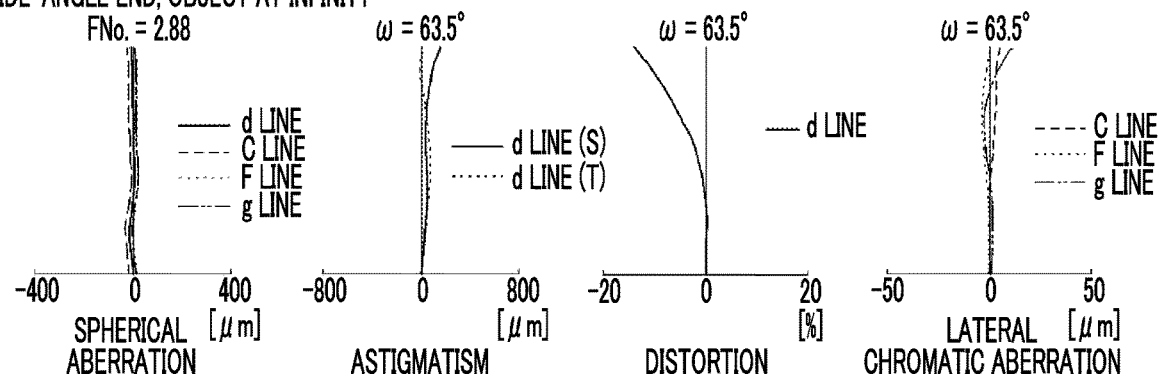
FIG. 18 shows aberration diagrams of the zoom lens according to Example 6 of the present invention.
Figure 18:
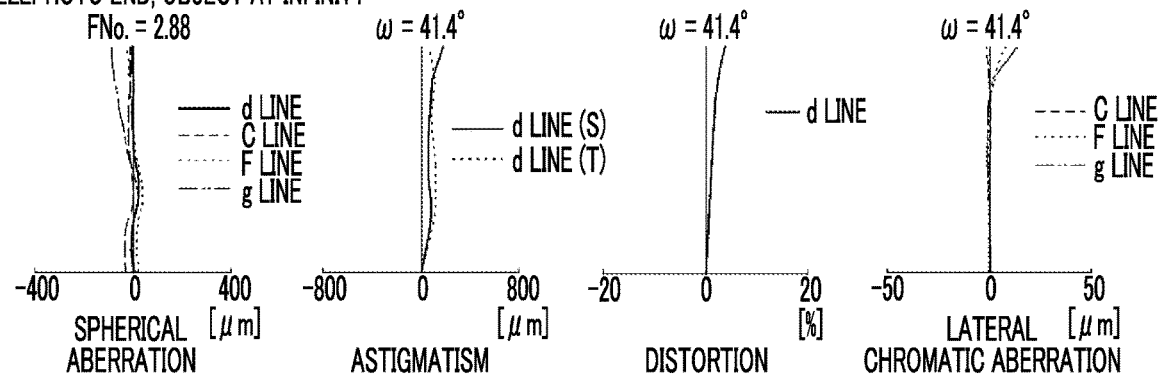
Figure 18:
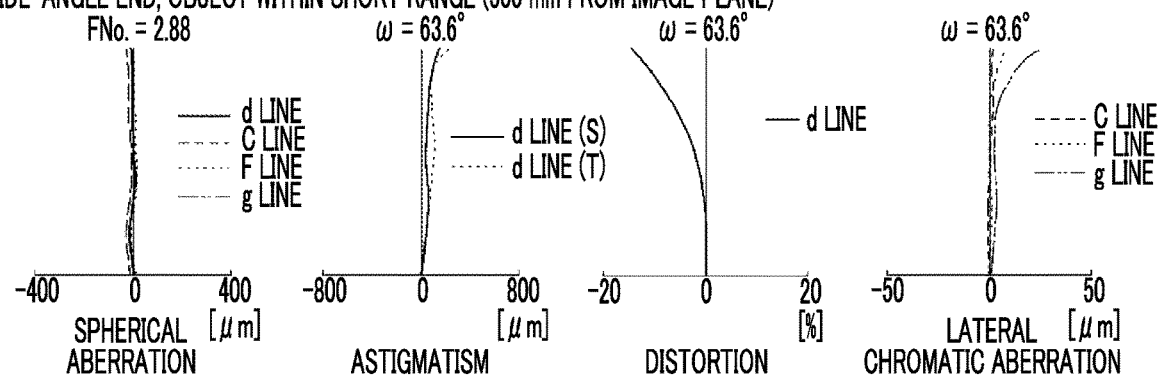
Figure 18:
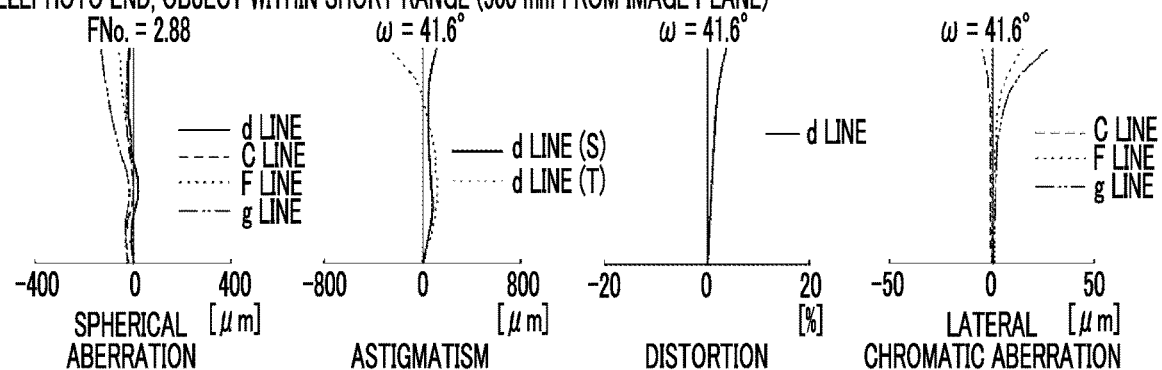

FIG. 7 shows cross sections and schematic movement loci of a zoom lens according to Example 6. The zoom lens according to Example 6 has the same configuration as the outline of the zoom lens according to Example 1. Table 16 shows basic lens data of the zoom lens according to Example 6, Table 17 shows specifications and variable surface distances, Table 18 shows aspherical surface coefficients thereof, and FIG. 18 shows aberration diagrams.

TABLE 16

Example 6

| Sn | R | D | Nd | vd | θgF |
|---|---|---|---|---|---|
| 1 | 44.04000 | 2.050 | 1.85150 | 40.78 | 0.56958 |
| 2 | 24.24864 | 6.981 | | | |
| *3 | 154.83912 | 2.504 | 1.69350 | 53.18 | 0.54831 |
| *4 | 20.19733 | 6.438 | | | |
| *5 | 29.09945 | 2.100 | 1.85108 | 40.12 | 0.56852 |
| *6 | 17.13338 | 8.955 | | | |
| 7 | −37.39517 | 1.120 | 1.43875 | 94.66 | 0.53402 |
| 8 | 28.39216 | 5.078 | 1.95375 | 32.32 | 0.59015 |
| 9 | 474.79304 | DD[9] | | | |
| 10(St) | ∞ | 1.300 | | | |
| *11 | 31.62408 | 7.000 | 1.80998 | 40.95 | 0.56644 |
| *12 | −45.95742 | 0.409 | | | |

TABLE 16-continued

Example 6

| Sn | R | D | Nd | vd | θgF |
|---|---|---|---|---|---|
| 13 | −79.85552 | 0.820 | 1.72047 | 34.71 | 0.58350 |
| 14 | 24.37152 | 2.379 | 1.49700 | 81.54 | 0.53748 |
| 15 | −549.86003 | 1.049 | | | |
| 16 | −574.16402 | 0.790 | 1.81600 | 46.62 | 0.55682 |
| 17 | 16.36729 | 3.437 | 1.67270 | 32.10 | 0.59891 |

TABLE 16-continued

| Example 6 | | | | | |
|---|---|---|---|---|---|
| Sn | R | D | Nd | vd | θgF |
| 18 | −107.22047 | DD[18] | | | |
| 19 | −156.44300 | 0.810 | 1.83481 | 42.72 | 0.56486 |
| 20 | 21.67065 | 4.205 | 1.59522 | 67.73 | 0.54426 |
| 21 | −36.75822 | 2.097 | | | |
| 22 | 45.85301 | 0.880 | 1.83481 | 42.72 | 0.56486 |
| 23 | 18.47924 | 4.871 | 1.43875 | 94.66 | 0.53402 |
| 24 | −55.78370 | 0.101 | | | |
| 25 | 28.05382 | 5.706 | 1.43875 | 94.66 | 0.53402 |
| 26 | −22.93917 | DD[26] | | | |
| *27 | −57.58300 | 2.623 | 1.85135 | 40.10 | 0.56954 |
| *28 | −23.68806 | 0.100 | | | |
| 29 | 160.08829 | 0.890 | 1.88300 | 40.76 | 0.56679 |
| 30 | 12.00014 | 6.016 | 1.49700 | 81.54 | 0.53748 |
| 31 | −158.21498 | 0.850 | 1.88300 | 40.76 | 0.56679 |
| 32 | 29.96082 | DD[32] | | | |
| 33 | 141.85857 | 2.380 | 1.95906 | 17.47 | 0.65993 |
| 34 | −111.48733 | 9.154 | | | |
| 35 | ∞ | 2.850 | 1.51680 | 64.20 | 0.53430 |
| 36 | ∞ | 1.000 | | | |

TABLE 17

| Example 6 | | | | |
|---|---|---|---|---|
| | W-Infinity | T-Infinity | W-500 mm | T-500 mm |
| Zr | 1.000 | 1.883 | — | — |
| f | 8.238 | 15.516 | 8.196 | 15.326 |
| FNo. | 2.88 | 2.88 | 2.88 | 2.87 |
| 2ω(°) | 127.0 | 82.8 | 127.2 | 83.2 |
| DD[9] | 29.648 | 2.884 | 29.648 | 2.884 |
| DD[18] | 3.490 | 2.833 | 3.490 | 2.833 |
| DD[26] | 2.000 | 7.132 | 2.127 | 7.452 |
| DD[32] | 3.432 | 8.874 | 3.305 | 8.555 |

TABLE 18

| Example 6 | | | | |
|---|---|---|---|---|
| Sn | 3 | 4 | 5 | 6 |
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | 2.1423762E−04 | 2.1440967E−04 | −4.4333454E−05 | −4.2166156E−05 |
| A5 | −1.2860612E−05 | −1.4833935E−05 | −6.7407497E−06 | −1.4656569E−05 |
| A6 | −2.2230835E−06 | −1.6725069E−06 | 5.7894923E−07 | 3.2751332E−06 |
| A7 | 2.2005520E−07 | −2.6036575E−09 | 1.2265825E−07 | −7.4943007E−09 |
| A8 | 9.9925805E−09 | 1.2874461E−08 | −8.0755244E−08 | −7.4707534E−08 |
| A9 | −1.7282871E−09 | 2.7825445E−09 | −1.2695205E−09 | 7.6514628E−09 |
| A10 | −1.9846229E−12 | −2.0831625E−10 | 1.0802086E−10 | 8.2849948E−10 |
| A11 | 7.7561162E−12 | −3.4586025E−11 | 1.0254071E−11 | −1.6617348E−10 |
| A12 | −1.7228286E−13 | 2.5251030E−12 | −1.1173814E−12 | −3.0949327E−12 |
| A13 | −2.0928965E−14 | 2.0736951E−13 | −5.4518550E−14 | 1.7223681E−12 |
| A14 | 7.7750415E−16 | −1.6062516E−14 | 6.6420253E−15 | −2.5351650E−14 |
| A15 | 3.3579792E−17 | −6.9067559E−16 | 1.6104324E−16 | −9.7966289E−15 |
| A16 | −1.6239313E−18 | 5.3904155E−17 | −2.1276004E−17 | 3.2648525E−16 |
| A17 | −2.9466587E−20 | 1.2233749E−18 | −2.3466829E−19 | 2.9236360E−17 |
| A18 | 1.7139629E−21 | −9.1154381E−20 | 3.4456476E−20 | −1.3248173E−18 |
| A19 | 1.0874543E−23 | −9.0037505E−22 | 1.2873223E−22 | −3.5650707E−20 |
| A20 | −7.3870423E−25 | 6.1179838E−23 | −2.2189480E−23 | 1.9101090E−21 |
| Sn | 11 | 12 | 27 | 28 |
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | 1.9849890E−05 | 3.2218499E−05 | 1.0918038E−05 | 1.1989134E−04 |
| A5 | −7.6007113E−06 | −1.1886776E−05 | −6.0674016E−06 | −3.3785499E−05 |
| A6 | −6.9919185E−07 | 8.9983427E−06 | −1.1736718E−06 | 9.2174691E−07 |
| A7 | 8.4763986E−07 | −2.4027339E−06 | 2.7572327E−07 | 1.6475087E−06 |
| A8 | 7.2612963E−08 | −1.1557586E−07 | 2.5619232E−08 | −2.5134088E−07 |
| A9 | −8.4585482E−08 | 1.7378028E−07 | −8.4908382E−09 | −3.2029399E−08 |
| A10 | 5.3796563E−10 | −1.8299834E−08 | 1.0637345E−11 | 9.6163797E−09 |
| A11 | 4.5791792E−09 | −4.5748454E−09 | 1.7020255E−10 | 1.1581511E−10 |
| A12 | −3.0070219E−10 | 9.1518481E−10 | −1.2272838E−11 | −1.7967278E−10 |
| A13 | −1.2826106E−10 | 4.4411464E−11 | −2.1763795E−12 | 5.7956884E−12 |
| A14 | 1.2817630E−11 | −1.9280095E−11 | 2.8328002E−13 | 1.8364760E−12 |
| A15 | 1.9257080E−12 | 3.7346071E−13 | 1.7104935E−14 | −1.0312909E−13 |
| A16 | −2.3826486E−13 | 1.7938670E−13 | −3.1210304E−15 | −9.8248294E−15 |
| A17 | −1.4911582E−14 | −9.1401909E−15 | −7.5201681E−17 | 7.0088430E−16 |
| A18 | 2.1374327E−15 | −6.4700736E−16 | 1.7567024E−17 | 2.1530224E−17 |

TABLE 18-continued

| | | Example 6 | | |
|---|---|---|---|---|
| A19 | 4.7350473E-17 | 5.1025190E-17 | 1.4141081E-19 | -1.7689095E-18 |
| A20 | -7.6372357E-18 | -5.4238076E-19 | -4.0498652E-20 | 2.2781682E-22 |

Example 7

Figure 8:
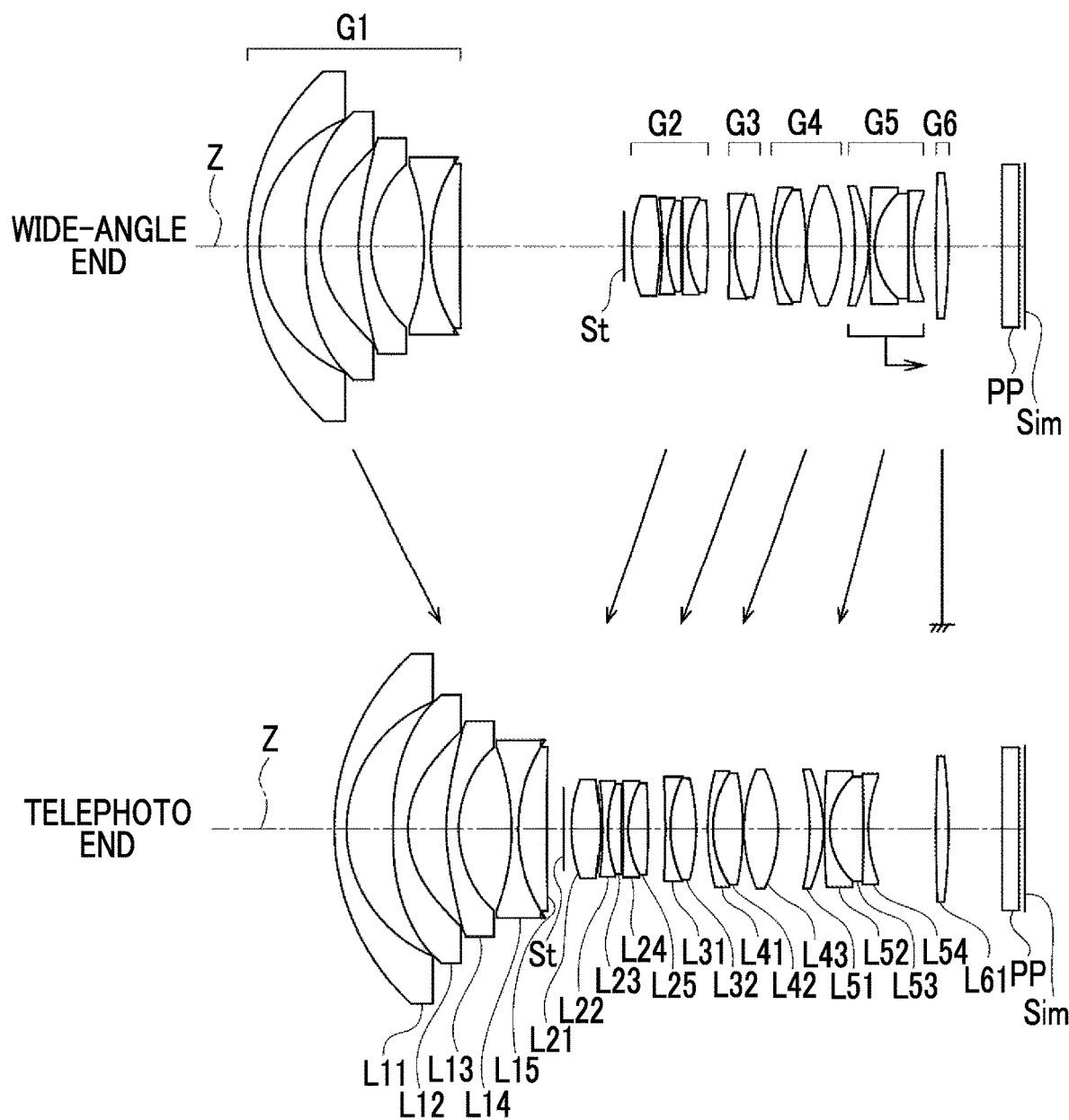
FIG. 8 is a diagram showing cross sections of lens configurations of a zoom lens according to Example 7 of the present invention at the wide-angle end and at the telephoto end and movement loci.

FIG. 8 shows cross sections and schematic movement loci of a zoom lens according to Example 7. The zoom lens according to Example 7 consists of a first lens group G1 having a negative refractive power, a second lens group G2 having a positive refractive power, a third lens group G3 having a positive refractive power, a fourth lens group G4 having a positive refractive power, a fifth lens group G5 having a negative refractive power, and a sixth lens group G6 having a positive refractive power in order from the object side to the image side. During zooming from the wide-angle end to the telephoto end, the first lens group G1 moves to the image side, the second lens group G2, the third lens group G3, the fourth lens group G4, and the fifth lens group G5 move to the object side, and the sixth lens group G6 is fixed on to the image plane Sim. Thus, all the distances between the adjacent lens groups change. The first lens group G1 consists of five lenses such as lenses L11 to L15 in order from the object side to the image side, the second lens group G2 consists of an aperture stop St and five lenses such as lenses L21 to L25 in order from the object side to the image side, the third lens group G3 consists of two lenses such as lenses L31 and L32 in order from the object side to the image side, the fourth lens group G4 consists of three lenses such as lenses L41 to L43 in order from the object side to the image side, the fifth lens group G5 consists of four lenses such as lenses L51 to L54 in order from the object side to the image side, and the sixth lens group G6 consists of one lens such as a lens L61. The focusing lens group Gf is the entire fifth lens group G5. The outline of the zoom lens according to Example 7 has been described above.

Figure 19:
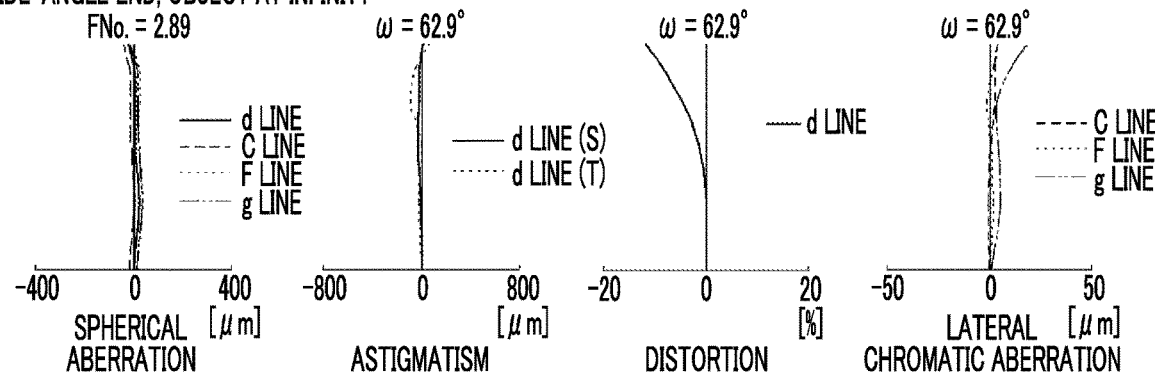
FIG. 19 shows aberration diagrams of the zoom lens according to Example 7 of the present invention.
Figure 19:
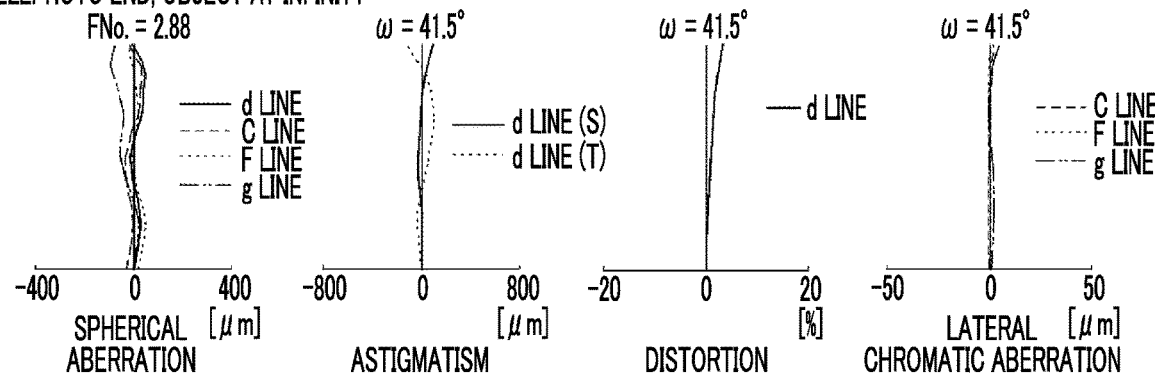
Figure 19:
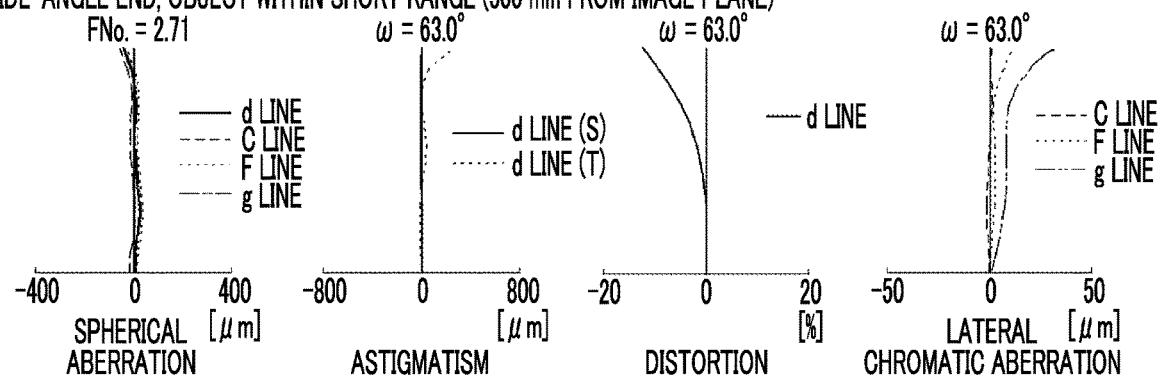
Figure 19:
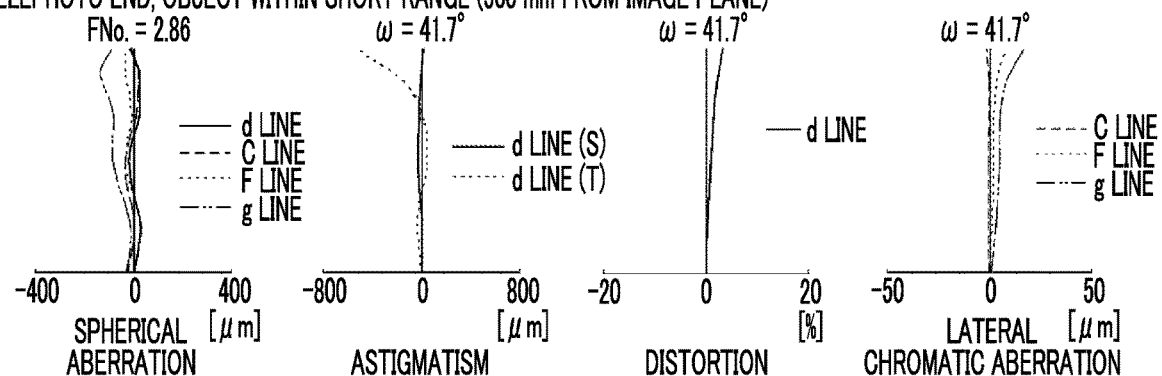

Table 19 shows basic lens data of the zoom lens according to Example 7, Table 20 shows specifications and variable surface distances, Table 21 shows aspherical surface coefficients thereof, and FIG. 19 shows aberration diagrams.

TABLE 19

| | | Example 7 | | | |
|---|---|---|---|---|---|
| Sn | R | D | Nd | vd | θgF |
| 1 | 41.41349 | 2.050 | 1.85150 | 40.78 | 0.56958 |
| 2 | 23.68980 | 7.769 | | | |
| *3 | 199.98788 | 2.504 | 1.69350 | 53.18 | 0.54831 |
| *4 | 18.73877 | 6.380 | | | |

TABLE 19-continued

| | | Example 7 | | | |
|---|---|---|---|---|---|
| Sn | R | D | Nd | vd | θgF |
| *5 | 28.19466 | 2.100 | 1.85108 | 40.12 | 0.56852 |
| *6 | 17.30816 | 8.877 | | | |
| 7 | -40.03562 | 1.120 | 1.43875 | 94.66 | 0.53402 |
| 8 | 27.48902 | 4.908 | 1.95375 | 32.32 | 0.59015 |
| 9 | 786.83703 | DD[9] | | | |
| 10(St) | ∞ | 1.300 | | | |
| *11 | 26.32190 | 4.783 | 1.69350 | 53.18 | 0.54831 |
| *12 | -38.38722 | 0.349 | | | |
| 13 | -67.29617 | 0.820 | 1.73623 | 52.87 | 0.54689 |
| 14 | 24.12365 | 2.232 | 1.59522 | 67.73 | 0.54426 |
| 15 | 206.47051 | 0.400 | | | |
| 16 | -317.40797 | 0.790 | 1.83256 | 44.74 | 0.55814 |
| 17 | 17.26597 | 3.377 | 1.64769 | 33.79 | 0.59393 |
| 18 | -92.86424 | DD[18] | | | |
| 19 | -168.26505 | 0.810 | 1.83838 | 42.57 | 0.56382 |
| 20 | 20.78142 | 4.333 | 1.59522 | 67.73 | 0.54426 |
| 21 | -34.61154 | DD[21] | | | |
| 22 | 42.21395 | 0.880 | 1.82973 | 43.48 | 0.56192 |
| 23 | 18.02672 | 5.040 | 1.43875 | 94.66 | 0.53402 |
| 24 | -48.65002 | 0.154 | | | |
| 25 | 26.16490 | 5.758 | 1.43875 | 94.66 | 0.53402 |
| 26 | -24.22834 | DD[26] | | | |
| *27 | -61.27599 | 2.306 | 1.85135 | 40.10 | 0.56954 |
| *28 | -23.15576 | 0.154 | | | |
| 29 | 139.18827 | 0.895 | 1.88300 | 40.76 | 0.56679 |
| 30 | 12.43898 | 5.652 | 1.49700 | 81.54 | 0.53748 |
| 31 | -594.76701 | 0.850 | 1.88300 | 40.76 | 0.56679 |
| 32 | 25.22333 | DD[32] | | | |
| 33 | 295.93334 | 2.145 | 1.95906 | 17.47 | 0.65993 |
| 34 | -107.09171 | 8.947 | | | |
| 35 | ∞ | 2.850 | 1.51680 | 64.20 | 0.53430 |
| 36 | ∞ | 0.999 | | | |

TABLE 20

| | Example 7 | | | |
|---|---|---|---|---|
| | W-Infinity | T-Infinity | W-500 mm | T-500 mm |
| Zr | 1.000 | 1.883 | — | — |
| f | 8.236 | 15.513 | 8.191 | 15.326 |
| FNo. | 2.89 | 2.88 | 2.71 | 2.86 |
| 2ω(°) | 125.8 | 83.0 | 126.0 | 83.4 |
| DD[9] | 27.461 | 2.812 | 27.461 | 2.812 |
| DD[18] | 3.629 | 2.866 | 3.629 | 2.866 |
| DD[21] | 1.800 | 1.907 | 1.800 | 1.907 |
| DD[26] | 2.304 | 5.348 | 2.432 | 5.632 |
| DD[32] | 3.721 | 11.312 | 3.593 | 11.028 |

TABLE 21

| | | Example 7 | | |
|---|---|---|---|---|
| Sn | 3 | 4 | 5 | 6 |
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | 1.8553228E-04 | 1.3000184E-04 | -1.4792318E-04 | -1.5306723E-04 |
| A5 | -1.1851358E-05 | -8.4069821E-06 | -1.5544082E-05 | -1.4372529E-05 |
| A6 | -1.2659055E-06 | -6.7543398E-07 | 4.8362473E-06 | 6.7974853E-06 |
| A7 | 1.8761495E-07 | -8.0505450E-08 | 2.4245530E-07 | -1.1029997E-08 |
| A8 | -2.0805031E-10 | 1.8330809E-08 | -8.8361107E-08 | -1.4038291E-07 |

TABLE 21-continued

| | | | | |
|---|---|---|---|---|
| A9 | −1.3997685E−09 | 2.7355343E−09 | −2.3093577E−09 | 7.3217584E−09 |
| A10 | 5.6155111E−11 | −5.0180351E−10 | 9.7931536E−10 | 1.5624812E−09 |
| A11 | 6.0301820E−12 | −2.6844337E−11 | 1.5816741E−11 | −1.5622836E−10 |
| A12 | −3.6807346E−13 | 6.0545668E−12 | −6.9687921E−12 | −8.3530659E−12 |
| A13 | −1.5795700E−14 | 1.3868447E−13 | −7.0811183E−14 | 1.6187204E−12 |
| A14 | 1.1731402E−15 | −3.8440545E−14 | 3.1516817E−14 | 3.7421809E−16 |
| A15 | 2.4898128E−17 | −4.1488753E−16 | 1.8283073E−16 | −9.2467812E−15 |
| A16 | −2.0814946E−18 | 1.3530839E−16 | −8.6548556E−17 | 2.4016862E−16 |
| A17 | −2.1736241E−20 | 6.8958764E−19 | −2.3636332E−19 | 2.7746103E−17 |
| A18 | 1.9771119E−21 | −2.5075486E−19 | 1.3073685E−19 | −1.1489803E−18 |
| A19 | 8.0896630E−24 | −5.0042124E−22 | 1.1194514E−22 | −3.4007141E−20 |
| A20 | −7.8808961E−25 | 1.9150718E−22 | −8.3081387E−23 | 1.7533308E−21 |
| Sn | 11 | 12 | 27 | 28 |
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | 1.2953078E−05 | 3.8187078E−05 | −5.3074031E−05 | 6.4427925E−05 |
| A5 | −1.1431193E−05 | −3.9115044E−06 | 3.8936446E−05 | −2.5777359E−05 |
| A6 | 3.4816488E−06 | 2.0305904E−06 | −2.8717510E−05 | 3.6642664E−06 |
| A7 | 3.0023422E−07 | −6.5395269E−07 | 1.0298252E−05 | 9.4260637E−07 |
| A8 | −2.4371425E−07 | 1.4178091E−07 | −1.7426583E−06 | −3.5149342E−07 |
| A9 | −5.4670342E−09 | 1.4350928E−08 | −1.8365173E−08 | −3.2612970E−09 |
| A10 | 1.1260902E−08 | −1.6124062E−08 | 5.8733961E−08 | 1.2010914E−08 |
| A11 | 2.2763050E−10 | 2.1475395E−09 | −7.5510424E−09 | −5.5705836E−10 |
| A12 | −4.0397419E−10 | 4.4367988E−10 | −2.8707194E−10 | −2.1914572E−10 |
| A13 | −2.2081897E−12 | −1.1405504E−10 | 1.3616276E−10 | 1.5330299E−11 |
| A14 | 9.5557490E−12 | −3.5033932E−12 | −7.1855743E−12 | 2.2915109E−12 |
| A15 | −1.2027268E−13 | 2.5423780E−12 | −6.9735936E−13 | −1.8377007E−13 |
| A16 | −1.2940446E−13 | −7.6845163E−14 | 8.9041920E−14 | −1.3387991E−14 |
| A17 | 2.7726178E−15 | −2.5146835E−14 | −1.4816220E−15 | 1.0759703E−15 |
| A18 | 9.0086136E−16 | 1.4584662E−15 | −2.4309853E−16 | 3.8600887E−17 |
| A19 | −1.6533706E−17 | 1.0023624E−16 | 1.5679569E−17 | −2.5074494E−18 |
| A20 | −2.4778335E−18 | −7.5577201E−18 | −3.2059225E−19 | −3.7003863E−20 |

Example 8

Figure 9:
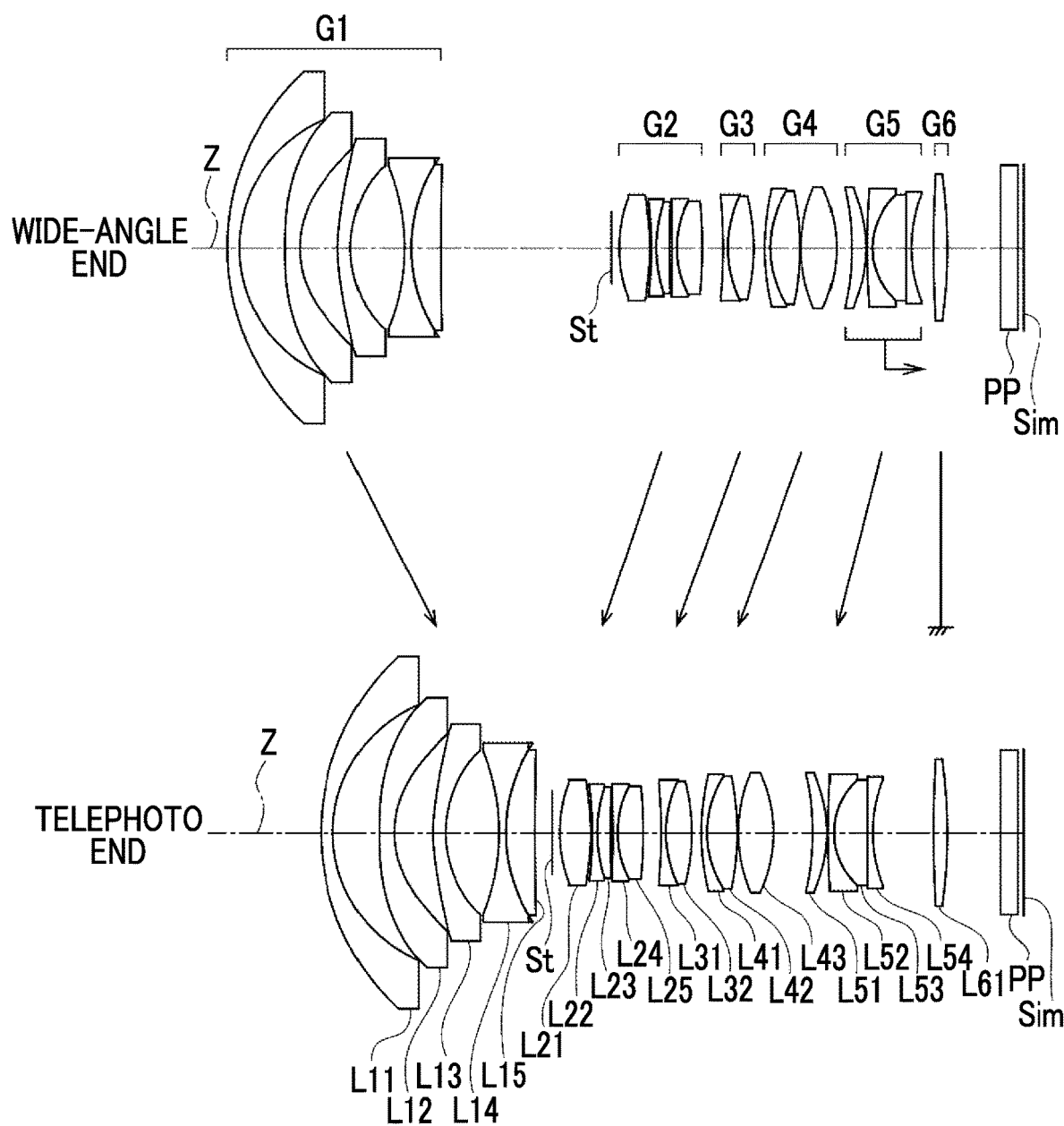
FIG. 9 is a diagram showing cross sections of lens configurations of a zoom lens according to Example 8 of the present invention at the wide-angle end and at the telephoto end and movement loci.
Figure 20:
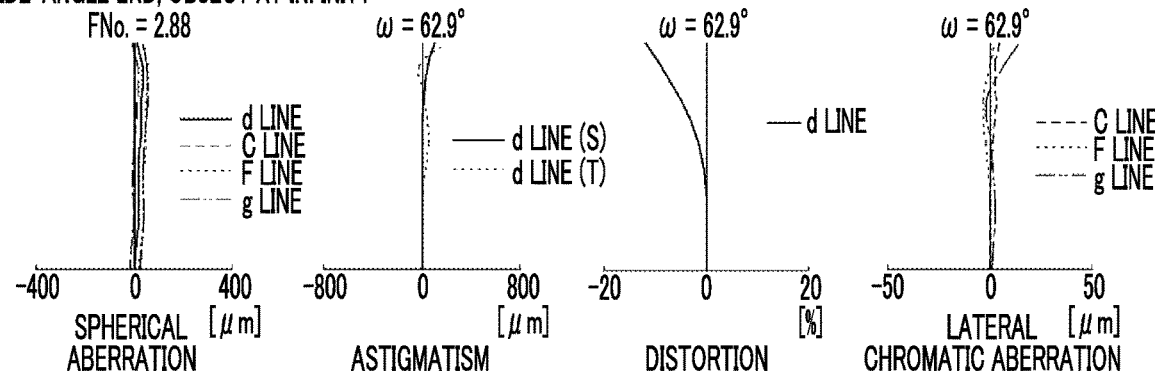
FIG. 20 shows aberration diagrams of the zoom lens according to Example 8 of the present invention.
Figure 20:
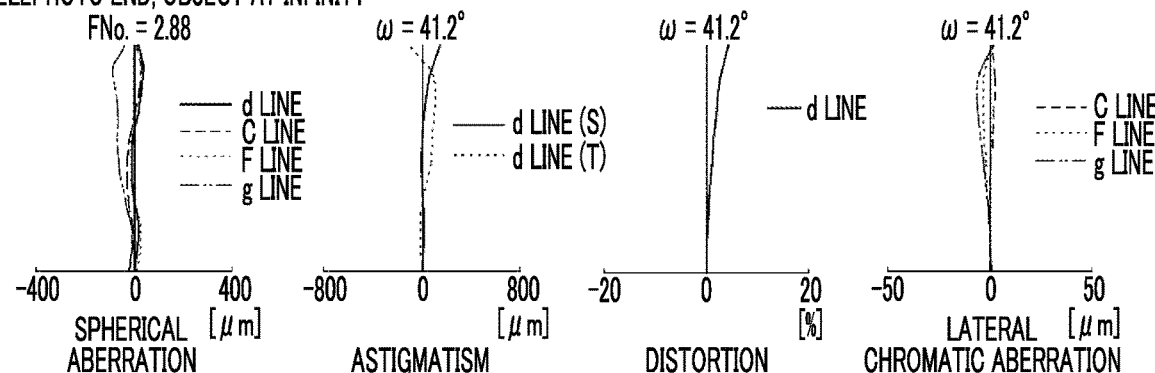
Figure 20:
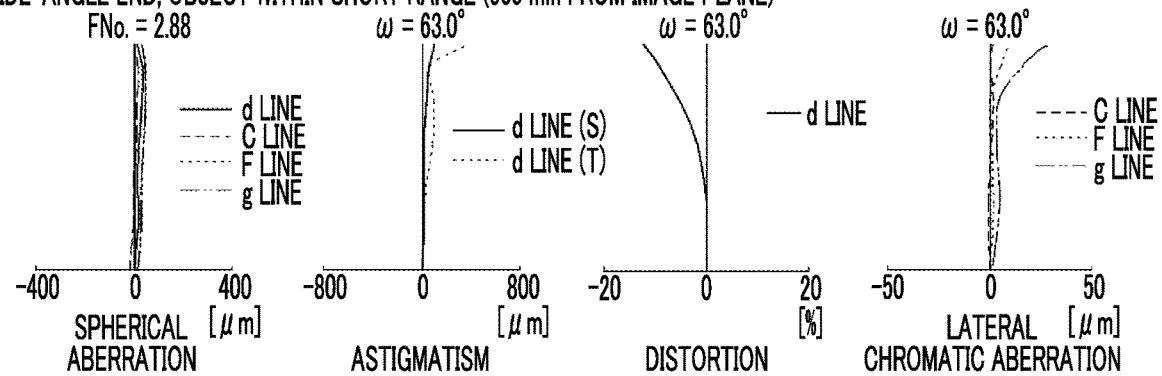
Figure 20:
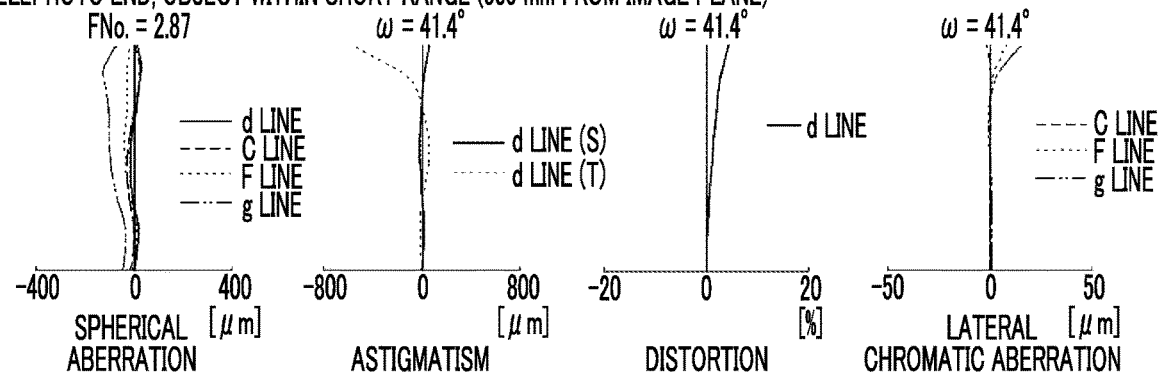

FIG. 9 shows cross sections and schematic movement loci of a zoom lens according to Example 8. The zoom lens of Example 8 has the same configuration as the outline of the zoom lens according to Example 7 except that a third lens group G3 has a negative refractive power. Table 22 shows basic lens data of the zoom lens according to Example 8, Table 23 shows specifications and variable surface distances, Table 24 shows aspherical surface coefficients thereof, and FIG. 20 shows aberration diagrams.

TABLE 22

Example 8

| Sn | R | D | Nd | vd | θgF |
|---|---|---|---|---|---|
| 1 | 41.28848 | 2.050 | 1.85150 | 40.78 | 0.56958 |
| 2 | 23.79980 | 7.687 | | | |
| *3 | 180.00350 | 2.504 | 1.69350 | 53.18 | 0.54831 |
| *4 | 18.77514 | 6.430 | | | |
| *5 | 28.05765 | 2.100 | 1.85108 | 40.12 | 0.56852 |
| *6 | 17.24984 | 8.964 | | | |
| 7 | −37.41452 | 1.120 | 1.43875 | 94.66 | 0.53402 |
| 8 | 27.57374 | 4.978 | 1.95375 | 32.32 | 0.59015 |
| 9 | 717.69516 | DD[9] | | | |
| 10(St) | ∞ | 1.300 | | | |
| *11 | 25.89581 | 5.160 | 1.69350 | 53.18 | 0.54831 |
| *12 | −37.94826 | 0.245 | | | |
| 13 | −69.40994 | 0.820 | 1.73135 | 51.51 | 0.55044 |
| 14 | 25.15690 | 2.208 | 1.59522 | 67.73 | 0.54426 |
| 15 | 235.28308 | 0.400 | | | |
| 16 | −373.54363 | 0.807 | 1.82926 | 45.07 | 0.55751 |
| 17 | 17.53423 | 4.254 | 1.64769 | 33.79 | 0.59393 |
| 18 | −88.29190 | DD[18] | | | |
| 19 | −100.00000 | 0.810 | 1.83438 | 41.71 | 0.56655 |
| 20 | 20.78142 | 4.317 | 1.59522 | 67.73 | 0.54426 |
| 21 | −36.00000 | DD[21] | | | |
| 22 | 42.27530 | 0.958 | 1.83348 | 44.64 | 0.55836 |
| 23 | 18.00679 | 5.050 | 1.43875 | 94.66 | 0.53402 |
| 24 | −47.63396 | 0.153 | | | |
| 25 | 26.18926 | 5.898 | 1.43875 | 94.66 | 0.53402 |
| 26 | −24.44917 | DD[26] | | | |
| *27 | −61.27006 | 2.391 | 1.85135 | 40.10 | 0.56954 |
| *28 | −23.18567 | 0.150 | | | |
| 29 | 139.58321 | 0.904 | 1.88300 | 40.76 | 0.56679 |
| 30 | 12.31147 | 5.630 | 1.49700 | 81.54 | 0.53748 |
| 31 | −712.05790 | 0.850 | 1.88300 | 40.76 | 0.56679 |
| 32 | 25.13792 | DD[32] | | | |
| 33 | 235.51432 | 2.299 | 1.95906 | 17.47 | 0.65993 |
| 34 | −94.05982 | 8.956 | | | |
| 35 | ∞ | 2.850 | 1.51680 | 64.20 | 0.53430 |
| 36 | ∞ | 1.000 | | | |

TABLE 23

Example 8

| | W-Infinity | T-Infinity | W-500 mm | T-500 mm |
|---|---|---|---|---|
| Zr | 1.000 | 1.883 | — | — |
| f | 8.237 | 15.515 | 8.193 | 15.326 |
| FNo. | 2.88 | 2.88 | 2.88 | 2.87 |
| 2ω(°) | 125.8 | 82.4 | 126.0 | 82.8 |
| DD[9] | 28.542 | 2.827 | 28.542 | 2.827 |
| DD[18] | 3.443 | 3.029 | 3.443 | 3.029 |
| DD[21] | 1.800 | 1.572 | 1.800 | 1.572 |
| DD[26] | 2.516 | 6.639 | 2.646 | 6.946 |
| DD[32] | 3.698 | 10.127 | 3.568 | 9.820 |

TABLE 24

Example 8

| Sn | 3 | 4 | 5 | 6 |
|---|---|---|---|---|
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | 1.7817121E−04 | 1.2444958E−04 | −1.5587216E−04 | −1.6218411E−04 |
| A5 | −1.1802753E−05 | −8.9427786E−06 | −1.6729001E−05 | −1.5553424E−05 |
| A6 | −1.1501893E−06 | −6.1712191E−07 | 4.9713132E−06 | 6.9411257E−06 |
| A7 | 1.8547406E−07 | −6.5020599E−08 | 2.6695675E−07 | 9.1785685E−09 |
| A8 | −1.1206100E−09 | 1.8976916E−08 | −8.9674357E−08 | −1.4072804E−07 |
| A9 | −1.3787239E−09 | 2.5137525E−09 | −2.5904793E−09 | 7.0965568E−09 |
| A10 | 5.9938885E−11 | −5.1833720E−10 | 9.8728804E−10 | 1.5282655E−09 |
| A11 | 5.9228813E−12 | −2.4987063E−11 | 1.7759970E−11 | −1.5463453E−10 |
| A12 | −3.7586298E−13 | 6.1853726E−12 | −7.0000889E−12 | −7.6510182E−12 |
| A13 | −1.5476728E−14 | 1.2913358E−13 | −7.9095186E−14 | 1.6117876E−12 |
| A14 | 1.1765419E−15 | −3.8945337E−14 | 3.1594679E−14 | −6.3305179E−15 |
| A15 | 2.4343431E−17 | −3.8518743E−16 | 2.0414552E−16 | −9.2294545E−15 |
| A16 | −2.0644460E−18 | 1.3624220E−16 | −8.6659745E−17 | 2.7514649E−16 |
| A17 | −2.1213337E−20 | 6.3836977E−19 | −2.6670701E−19 | 2.7725498E−17 |
| A18 | 1.9449063E−21 | −2.5128020E−19 | 1.3080572E−19 | −1.2447243E−18 |
| A19 | 7.8832520E−24 | −4.6287962E−22 | 1.3029291E−22 | −3.4001309E−20 |
| A20 | −7.7021012E−25 | 1.9115709E−22 | −8.3081387E−23 | 1.8610909E−21 |

| Sn | 11 | 12 | 27 | 28 |
|---|---|---|---|---|
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | 1.4210051E−05 | 4.3913590E−05 | −5.5075379E−05 | 6.2703642E−05 |
| A5 | −8.3583091E−06 | −6.2397130E−06 | 3.6892406E−05 | −2.7867151E−05 |
| A6 | 2.6445290E−06 | 2.0885726E−06 | −2.8501178E−05 | 3.9373888E−06 |
| A7 | 2.3587006E−08 | −4.6298237E−07 | 1.0455105E−05 | 1.0595667E−06 |
| A8 | −1.4699944E−07 | 1.4356892E−07 | −1.7515840E−06 | −3.5913547E−07 |
| A9 | 8.3253169E−09 | 2.4151710E−09 | −2.5022612E−08 | −7.3773982E−09 |
| A10 | 5.8951528E−09 | −1.6370228E−08 | 5.8893509E−08 | 1.1939750E−08 |
| A11 | −1.8396741E−10 | 2.6052287E−09 | −7.3858674E−09 | −4.6433025E−10 |
| A12 | −2.3322022E−10 | 4.5039701E−10 | −2.8754647E−10 | −2.1130212E−10 |
| A13 | 5.3055800E−12 | −1.2441622E−10 | 1.3371201E−10 | 1.4016372E−11 |
| A14 | 6.2855015E−12 | −3.5736137E−12 | −7.2125746E−12 | 2.1167422E−12 |
| A15 | −2.0253567E−13 | 2.6773523E−12 | −6.7596338E−13 | −1.7252059E−13 |
| A16 | −9.2258767E−14 | −7.6802008E−14 | 8.9481906E−14 | −1.1503559E−14 |
| A17 | 3.2688325E−15 | −2.6082185E−14 | −1.5829260E−15 | 1.0229135E−15 |
| A18 | 6.7081531E−16 | 1.4629201E−15 | −2.4587246E−16 | 2.8365930E−17 |
| A19 | −1.7801597E−17 | 1.0290669E−16 | 1.5880101E−17 | −2.4016237E−18 |
| A20 | −1.8802842E−18 | −7.5818878E−18 | −3.1409511E−19 | −1.4533514E−20 |

Example 9

Figure 10:
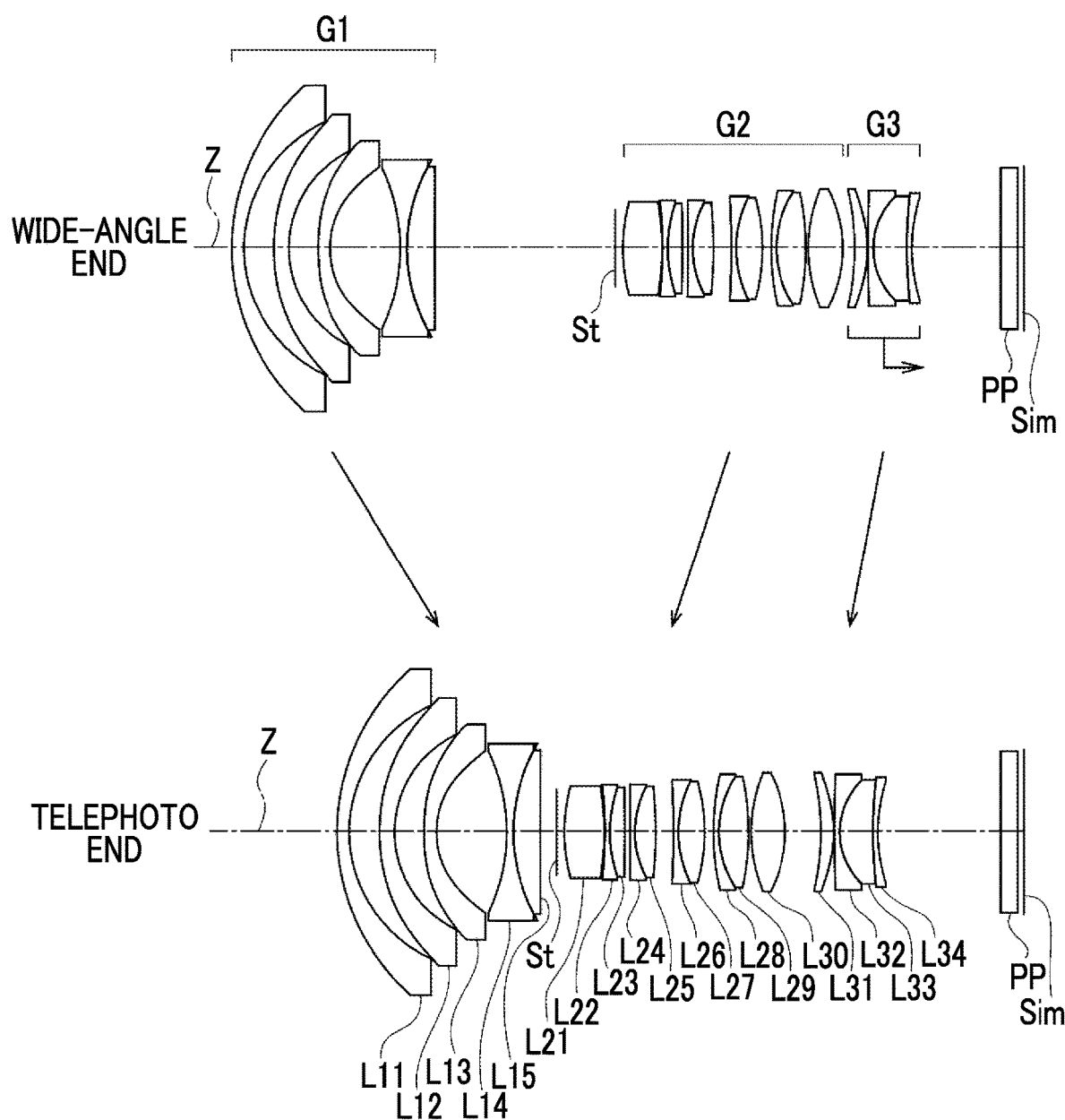
FIG. 10 is a diagram showing cross sections of lens configurations of a zoom lens according to Example 9 of the present invention at the wide-angle end and at the telephoto end and movement loci.

FIG. 10 shows cross sections and schematic movement loci of a zoom lens according to Example 9. The zoom lens according to Example 9 consists of a first lens group G1 having a negative refractive power, a second lens group G2 having a positive refractive power, and a third lens group G3 having a negative refractive power in order from the object side to the image side. During zooming from the wide-angle end to the telephoto end, the first lens group G1 moves to the image side and the second lens group G2 and the third lens group G3 move to the object side. Thus, all the distances between the adjacent lens groups change. The first lens group G1 consists of five lenses such as lenses L11 to L15 in order from the object side to the image side, the second lens group G2 consists of an aperture stop St and ten lenses such as lenses L21 to L30 in order from the object side to the image side, and the third lens group G3 consists of four lenses such as lenses L31 and L34 in order from the object side to the image side. The focusing lens group Gf is the entire third lens group G3.

Figure 21:
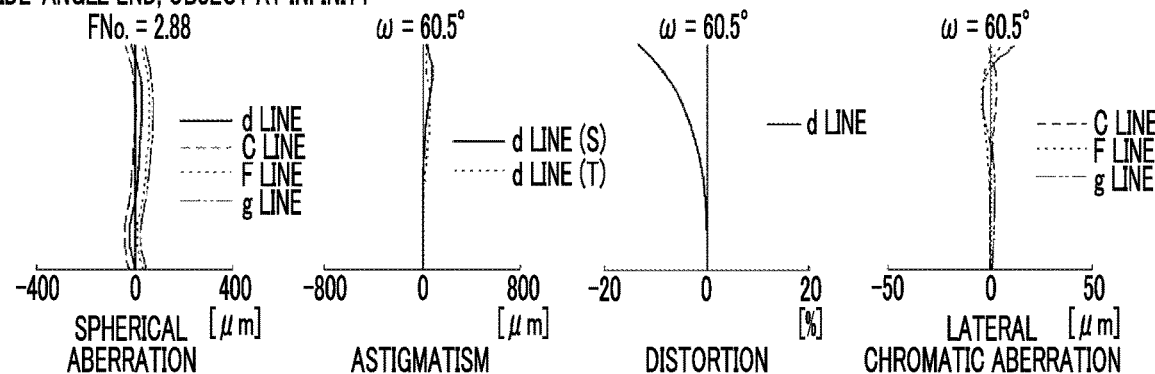
FIG. 21 shows aberration diagrams of the zoom lens according to Example 9 of the present invention.
Figure 21:
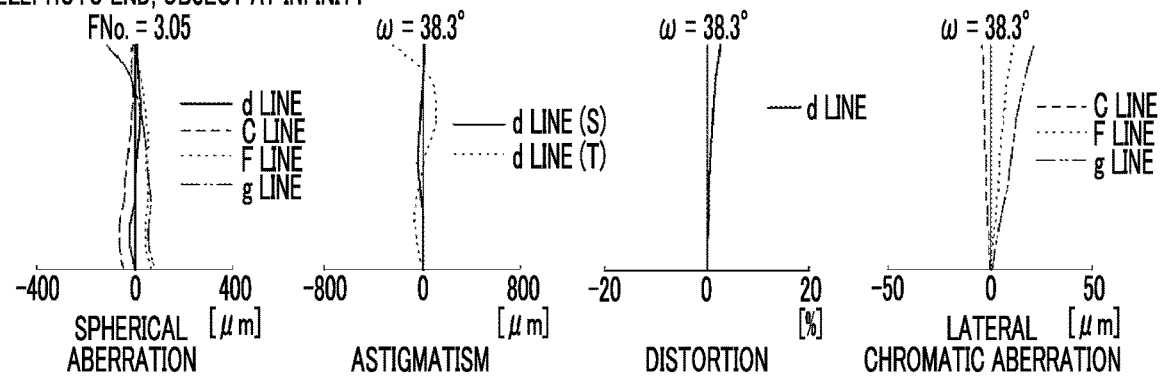
Figure 21:
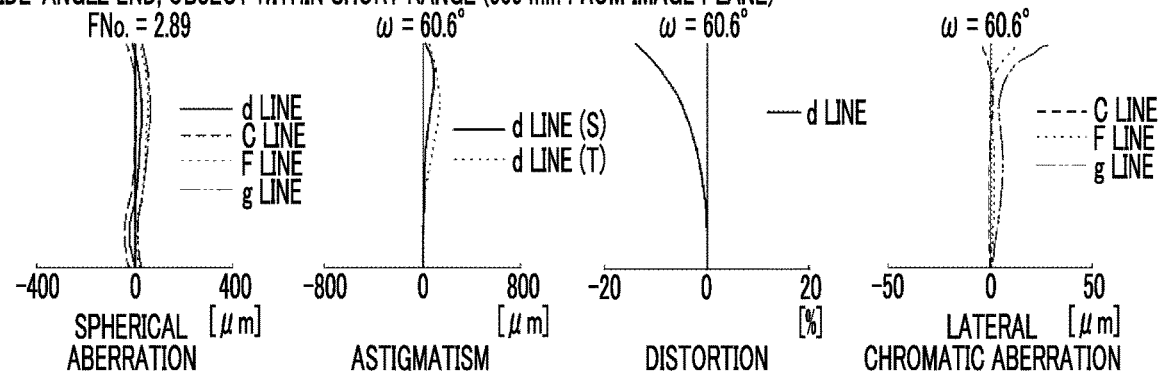
Figure 21:
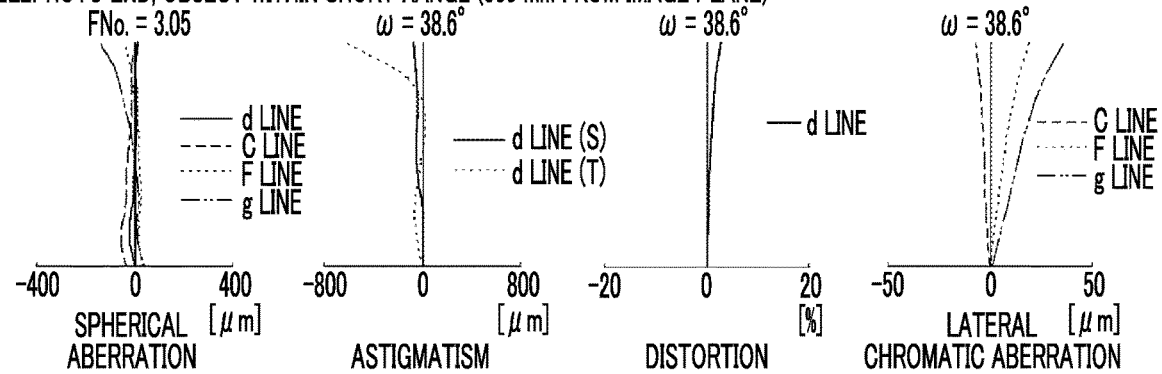

Table 25 shows basic lens data of the zoom lens according to Example 9, Table 26 shows specifications and variable surface distances, Table 27 shows aspherical surface coefficients thereof, and FIG. 21 shows aberration diagrams.

TABLE 25

Example 9

| Sn | R | D | Nd | vd | θgF |
|---|---|---|---|---|---|
| 1 | 37.99918 | 2.050 | 1.71897 | 55.55 | 0.54271 |
| 2 | 24.17952 | 5.101 | | | |
| *3 | 35.85033 | 2.504 | 2.00001 | 23.18 | 0.62355 |
| *4 | 19.06832 | 4.938 | | | |
| *5 | 42.99544 | 2.100 | 1.85108 | 40.12 | 0.56852 |
| *6 | 16.97544 | 11.741 | | | |
| 7 | −33.00862 | 1.120 | 1.43875 | 94.66 | 0.53402 |
| 8 | 30.18923 | 4.645 | 1.95375 | 32.32 | 0.59015 |
| 9 | 6769.26125 | DD[9] | | | |
| 10(St) | ∞ | 1.300 | | | |
| *11 | 30.66930 | 6.569 | 1.77632 | 50.37 | 0.54870 |
| *12 | −41.97745 | 0.100 | | | |
| 13 | −72.34341 | 0.820 | 1.74057 | 49.63 | 0.55390 |
| 14 | 24.55432 | 2.480 | 1.49700 | 81.54 | 0.53748 |
| 15 | −340.45558 | 0.919 | | | |
| 16 | −492.43359 | 0.790 | 1.83328 | 44.67 | 0.55828 |
| 17 | 17.46525 | 3.460 | 1.67995 | 31.43 | 0.59475 |
| 18 | −82.20649 | 3.000 | | | |
| 19 | −157.76127 | 0.810 | 1.84642 | 43.36 | 0.56090 |
| 20 | 20.32879 | 4.384 | 1.59522 | 67.73 | 0.54426 |
| 21 | −34.31739 | 1.499 | | | |
| 22 | 47.63975 | 0.880 | 1.85605 | 42.39 | 0.56292 |
| 23 | 18.05021 | 4.994 | 1.43875 | 94.66 | 0.53402 |
| 24 | −45.78783 | 0.398 | | | |
| 25 | 27.10191 | 5.772 | 1.43875 | 94.66 | 0.53402 |

TABLE 25-continued

Example 9

| Sn | R | D | Nd | vd | θgF |
|---|---|---|---|---|---|
| 26 | −22.80653 | DD[26] | | | |
| *27 | −53.93129 | 2.150 | 1.85135 | 40.10 | 0.56954 |
| *28 | −23.82934 | 0.100 | | | |
| 29 | 278.71803 | 0.890 | 1.88300 | 40.76 | 0.56679 |
| 30 | 12.71252 | 5.610 | 1.49700 | 81.54 | 0.53748 |
| 31 | 84.11043 | 0.850 | 1.88300 | 40.76 | 0.56679 |
| 32 | 30.46524 | DD[32] | | | |
| 33 | ∞ | 2.850 | 1.51680 | 64.20 | 0.53430 |
| 34 | ∞ | 0.999 | | | |

TABLE 26

Example 9

| | W-Infinity | T-Infinity | W-500 mm | T-500 mm |
|---|---|---|---|---|
| Zr | 1.000 | 1.883 | — | — |
| f | 9.267 | 17.454 | 9.200 | 17.115 |
| FNo. | 2.88 | 3.05 | 2.89 | 3.05 |
| 2ω(°) | 121.0 | 76.6 | 121.2 | 77.2 |
| DD[9] | 30.189 | 2.702 | 30.189 | 2.702 |
| DD[26] | 2.004 | 6.002 | 2.147 | 6.352 |
| DD[32] | 14.911 | 20.579 | 14.768 | 20.229 |

TABLE 27

Example 9

| Sn | 3 | 4 | 5 | 6 |
|---|---|---|---|---|
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | 4.3579078E−06 | −3.7647125E−05 | 2.5118056E−06 | 2.4038898E−05 |
| A5 | 6.1108418E−07 | 3.2857428E−06 | −1.4092283E−06 | 2.7797585E−06 |
| A6 | 1.1776328E−07 | 5.0274397E−07 | 1.4526221E−06 | 1.3007142E−06 |
| A7 | 1.0115853E−08 | −6.6981646E−08 | 1.4139088E−07 | 1.8378201E−08 |
| A8 | −2.4062256E−09 | 1.4858137E−09 | −3.0260189E−08 | −2.6143690E−08 |
| A9 | −1.6471722E−10 | 7.8665955E−10 | −2.1843838E−09 | −4.0100028E−10 |
| A10 | 1.6766142E−11 | −1.0104289E−10 | 3.0167062E−10 | 2.5400355E−10 |
| A11 | 1.0477521E−12 | −5.6742015E−12 | 1.8895037E−11 | −6.6204539E−12 |
| A12 | −5.4951876E−14 | 9.8123825E−13 | −1.9514802E−12 | −1.7451201E−12 |
| A13 | −3.5612552E−15 | 2.5892073E−14 | −9.4488704E−14 | 1.9784564E−13 |
| A14 | 8.0877467E−17 | −4.1347873E−15 | 8.4303048E−15 | 6.5258629E−15 |
| A15 | 6.7812206E−18 | −7.2494749E−17 | 2.6281415E−16 | −1.8124128E−15 |
| A16 | −1.4094079E−20 | 7.4163194E−18 | −2.2544121E−17 | 1.1663618E−17 |
| A17 | −6.8304100E−21 | 1.1284937E−19 | −3.7122465E−19 | 7.2364181E−18 |
| A18 | −9.1130345E−23 | −1.7775910E−21 | 3.2758004E−20 | −1.7946465E−19 |
| A19 | 2.8371738E−24 | −7.4427328E−23 | 2.0425494E−22 | −1.0652633E−20 |
| A20 | 7.2328607E−26 | −6.7144633E−24 | −1.9438197E−23 | 3.8746057E−22 |

| Sn | 11 | 12 | 27 | 28 |
|---|---|---|---|---|
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | 7.6946070E−06 | −1.2927788E−06 | −8.1522204E−05 | 2.2257820E−05 |
| A5 | −9.0052179E−06 | 1.8404413E−05 | 4.4785414E−05 | −2.0695347E−05 |
| A6 | 1.9598414E−06 | −2.9902905E−06 | −2.7303849E−05 | 6.3009873E−06 |
| A7 | 2.2991459E−07 | −1.5386880E−06 | 1.0161013E−05 | 5.6988808E−07 |
| A8 | −7.3086519E−08 | 6.1195410E−07 | −1.8123594E−06 | −4.5670856E−07 |
| A9 | −2.6441714E−08 | 8.5266581E−09 | −1.7874046E−08 | 1.2437554E−08 |
| A10 | 4.4460171E−09 | −3.5989259E−08 | 6.1361268E−08 | 1.4661368E−08 |
| A11 | 1.6807750E−09 | 3.8337577E−09 | −7.4833603E−09 | −9.5145924E−10 |
| A12 | −2.8826307E−10 | 8.8503967E−10 | −3.5265530E−10 | −2.6110524E−10 |
| A13 | −4.4750000E−11 | −1.7729499E−10 | 1.3425097E−10 | 2.1342391E−11 |
| A14 | 9.1887318E−12 | −8.0299735E−12 | −6.1448677E−12 | 2.7085617E−12 |
| A15 | 5.2209189E−13 | 3.6758768E−12 | −6.7366121E−13 | −2.3820354E−13 |
| A16 | −1.4238812E−13 | −7.7251489E−14 | 7.9031516E−14 | −1.5904921E−14 |
| A17 | −2.1183120E−15 | −3.5360385E−14 | −1.6260453E−15 | 1.3447522E−15 |
| A18 | 1.0437771E−15 | 1.8530613E−15 | −1.9023049E−16 | 4.6900274E−17 |
| A19 | −1.7320943E−18 | 1.3729732E−16 | 1.6031226E−17 | −3.0643517E−18 |
| A20 | −2.8234116E−18 | −9.8547997E−18 | −4.3787098E−19 | −4.815618E−20 |

Example 10

Figure 11:
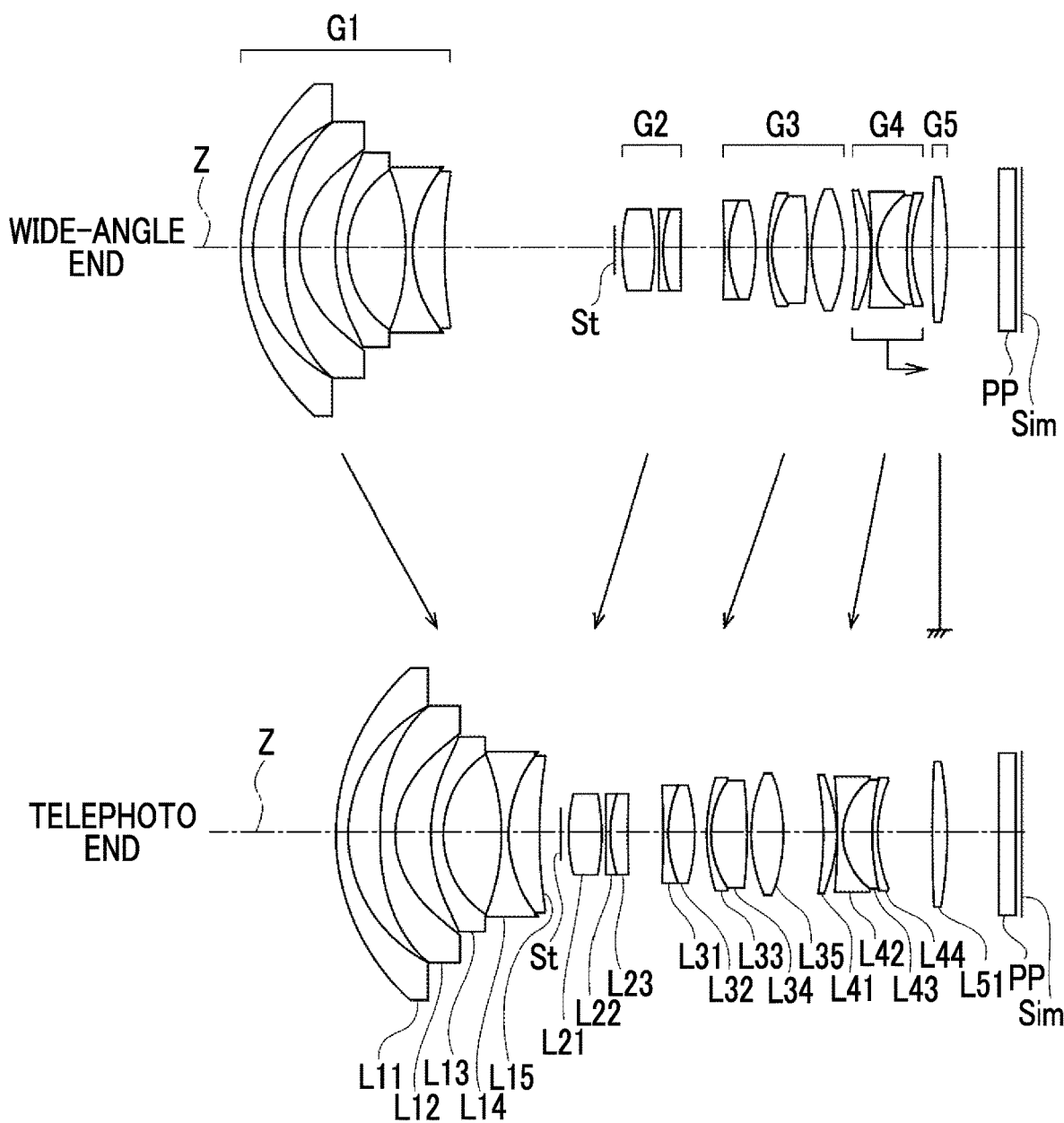
FIG. 11 is a diagram showing cross sections of lens configurations of a zoom lens according to Example 10 of the present invention at the wide-angle end and at the telephoto end and movement loci.
Figure 22:
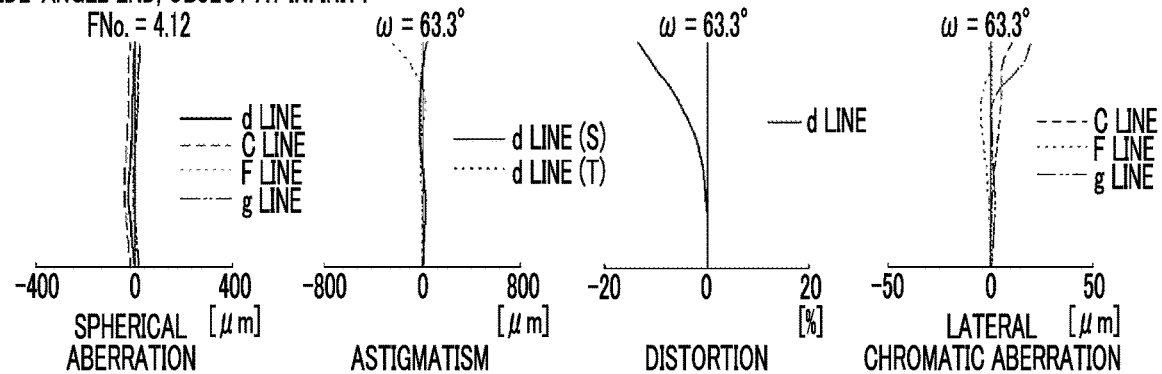
FIG. 22 shows aberration diagrams of the zoom lens according to Example 10 of the present invention.
Figure 22:
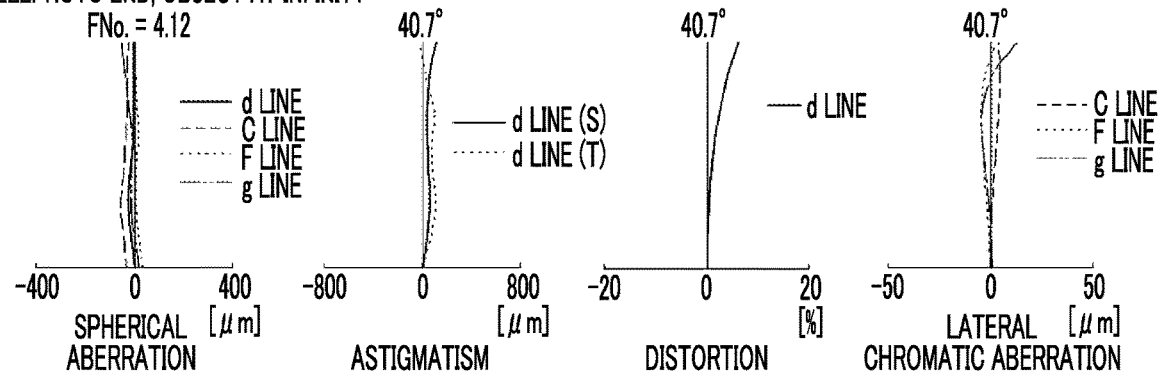
Figure 22:
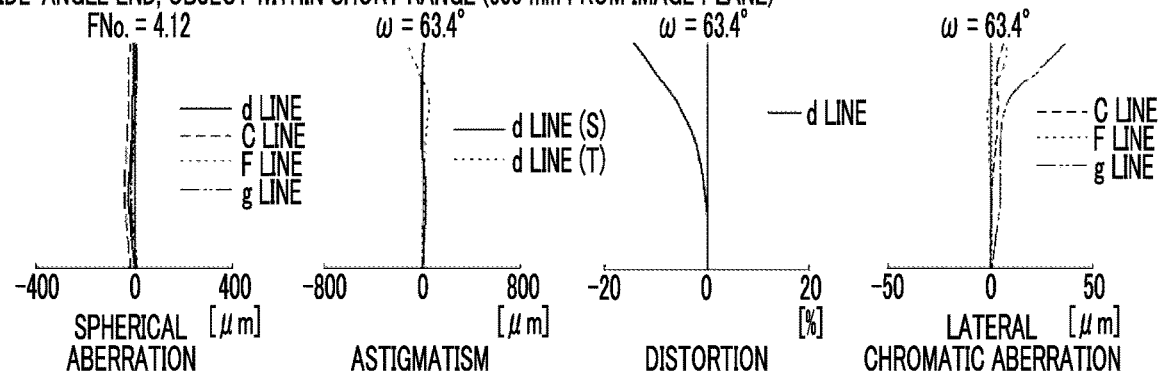
Figure 22:
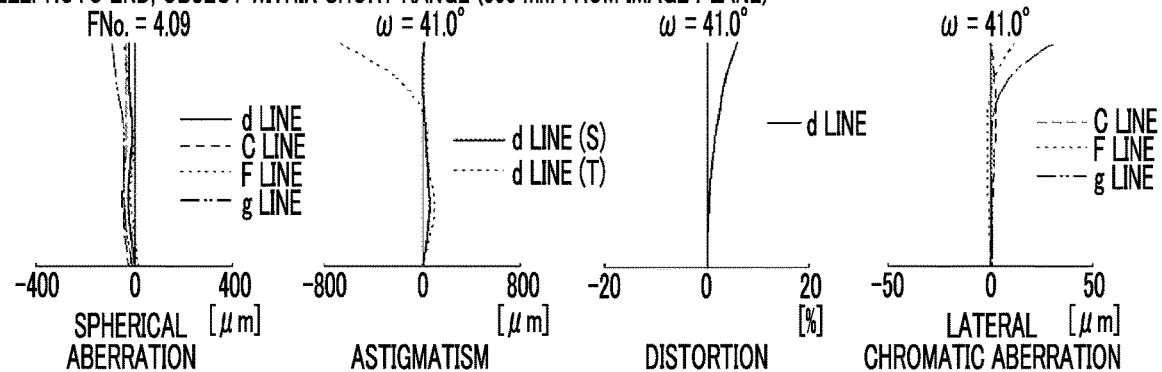

FIG. 11 shows cross sections and schematic movement loci of a zoom lens according to Example 10. The zoom lens according to Example 10 has the same configuration as the outline of the zoom lens according to Example 1 except that a second lens group G2 consists of an aperture stop St and three lenses such as lenses L21 to L23 in order from the object side to the image side. Table 28 shows basic lens data of the zoom lens according to Example 10, Table 29 shows specifications and variable surface distances, Table 30 shows aspherical surface coefficients thereof, and FIG. 22 shows aberration diagrams.

TABLE 28

Example 10

| Sn | R | D | Nd | vd | θgF |
|---|---|---|---|---|---|
| 1 | 38.83843 | 2.050 | 2.00100 | 29.13 | 0.59952 |
| 2 | 24.81705 | 5.377 | | | |
| *3 | 178.21729 | 2.504 | 1.61881 | 63.85 | 0.54182 |
| *4 | 20.19309 | 5.936 | | | |
| *5 | 27.60432 | 2.100 | 1.85135 | 40.10 | 0.56954 |
| *6 | 17.98825 | 9.721 | | | |
| 7 | −37.48868 | 1.155 | 1.48749 | 70.44 | 0.53062 |
| 8 | 22.37597 | 5.287 | 1.98423 | 28.81 | 0.60204 |
| 9 | 85.39061 | DD[9] | | | |
| 10(St) | ∞ | 1.300 | | | |
| *11 | 31.29381 | 5.414 | 1.49710 | 81.56 | 0.53848 |
| *12 | −32.44803 | 0.700 | | | |
| 13 | −478.66283 | 0.710 | 1.82761 | 45.24 | 0.55720 |
| 14 | 22.66145 | 2.928 | 1.72717 | 28.77 | 0.60157 |
| 15 | 291.93512 | DD[15] | | | |
| 16 | −176.40583 | 0.810 | 1.84317 | 43.68 | 0.56023 |
| 17 | 21.84639 | 4.444 | 1.59522 | 67.73 | 0.54426 |

TABLE 28-continued

Example 10

| Sn | R | D | Nd | vd | θgF |
|---|---|---|---|---|---|
| 18 | −31.58888 | 2.000 | | | |
| 19 | 33.09781 | 0.710 | 1.87525 | 40.48 | 0.56722 |
| 20 | 16.90117 | 6.030 | 1.43875 | 94.66 | 0.53402 |
| 21 | −90.33111 | 0.672 | | | |
| 22 | 26.61789 | 5.480 | 1.49710 | 81.56 | 0.53848 |
| 23 | −28.19034 | DD[23] | | | |
| *24 | −65.30460 | 2.254 | 1.80139 | 45.45 | 0.55814 |
| *25 | −20.94046 | 0.100 | | | |
| 26 | −116.23532 | 0.915 | 1.88300 | 40.76 | 0.56679 |
| 27 | 12.01637 | 4.943 | 1.48749 | 70.44 | 0.53062 |
| 28 | 42.59105 | 0.890 | 2.00100 | 29.13 | 0.59952 |
| 29 | 25.03413 | DD[29] | | | |
| 30 | 266.58306 | 2.476 | 2.00272 | 19.32 | 0.64514 |
| 31 | −79.08354 | 8.637 | | | |
| 32 | ∞ | 2.850 | 1.51680 | 64.20 | 0.53430 |
| 33 | ∞ | 0.999 | | | |

TABLE 29

Example 10

| | W-Infinity | T-Infinity | W-500 mm | T-500 mm |
|---|---|---|---|---|
| Zr | 1.000 | 1.885 | — | — |
| f | 8.240 | 15.533 | 8.197 | 15.348 |
| FNo. | 4.12 | 4.12 | 4.12 | 4.09 |
| 2ω(°) | 126.6 | 81.4 | 126.8 | 82.0 |
| DD[9] | 28.420 | 3.583 | 28.420 | 3.583 |
| DD[15] | 7.280 | 5.934 | 7.280 | 5.934 |
| DD[23] | 2.267 | 6.676 | 2.373 | 6.937 |
| DD[29] | 3.387 | 9.151 | 3.281 | 8.890 |

TABLE 30

Example 10

| Sn | 3 | 4 | 5 | 6 |
|---|---|---|---|---|
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | 1.9988206E−04 | 2.2009889E−04 | −2.6325038E−05 | −2.5890038E−05 |
| A5 | −4.7884304E−06 | −1.0663953E−05 | −5.7523622E−06 | 1.9710509E−06 |
| A6 | −1.8522010E−06 | −1.7633881E−06 | 1.5282618E−06 | 3.4973820E−07 |
| A7 | 9.6926862E−08 | 2.3494988E−07 | 8.3207313E−08 | −3.5512780E−08 |
| A8 | 7.0116788E−09 | −3.4605810E−09 | −3.1985403E−08 | 8.4350774E−09 |
| A9 | −8.1338669E−10 | −3.0732589E−09 | −7.4922729E−10 | −1.4286840E−10 |
| A10 | 6.2196004E−12 | 1.5039080E−10 | 3.6791953E−10 | −2.5462979E−10 |
| A11 | 3.8306313E−12 | 2.4944170E−11 | 4.2829353E−12 | 9.7842492E−12 |
| A12 | −1.5985066E−13 | −1.1592000E−12 | −2.4659380E−12 | 3.2348980E−12 |
| A13 | −1.0751405E−14 | −1.2363197E−13 | −1.5690233E−14 | −1.1585534E−13 |
| A14 | 6.4095225E−16 | 5.1641000E−15 | 9.9352692E−15 | −2.3229015E−14 |
| A15 | 1.7820004E−17 | 3.6213610E−16 | 3.5325188E−17 | 6.5232270E−16 |
| A16 | −1.2614112E−18 | −1.5549728E−17 | −2.3984950E−17 | 9.7319306E−17 |
| A17 | −1.6088054E−20 | −5.7615451E−19 | −4.3808930E−20 | −1.8232077E−18 |
| A18 | 1.2725085E−21 | 2.8974518E−20 | 3.2320249E−20 | −2.2629889E−19 |
| A19 | 6.0996528E−24 | 3.8383269E−22 | 2.2332247E−23 | 2.0560322E−21 |
| A20 | −5.2582305E−25 | −2.4030749E−23 | −1.8866554E−23 | 2.3213927E−22 |

| Sn | 11 | 12 | 24 | 25 |
|---|---|---|---|---|
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | 1.8131929E−05 | 2.9461519E−05 | 9.7916315E−06 | 1.2671312E−04 |
| A5 | −1.1623542E−05 | −1.2037429E−06 | 1.2360732E−06 | −2.6567039E−05 |
| A6 | 1.1508714E−06 | 3.0985175E−06 | −5.5252711E−06 | −4.8731882E−07 |
| A7 | 9.7231567E−07 | −4.6213219E−07 | 1.1267236E−06 | 1.8568389E−06 |
| A8 | −1.8473299E−07 | −2.5190760E−07 | 2.0764734E−07 | −2.0238319E−07 |
| A9 | −4.5550852E−08 | 7.1919616E−08 | −7.7624633E−08 | −5.4245866E−08 |
| A10 | 1.1178587E−08 | 6.6202336E−09 | −1.6843708E−09 | 9.5285746E−09 |
| A11 | 1.4330916E−09 | −3.9519480E−09 | 2.3591950E−09 | 8.3542650E−10 |
| A12 | −3.9796202E−10 | 7.8278058E−11 | −7.5970152E−11 | −2.1185700E−10 |

TABLE 30-continued

| | | | |
|---|---|---|---|
| A13 | −2.8191691E−11 | 1.1365987E−10 | −3.9277257E−11 | −6.4079304E−12 |
| A14 | 8.6365562E−12 | −8.6181468E−12 | 2.3487847E−12 | 2.6838311E−12 |
| A15 | 3.2889333E−13 | −1.8044608E−12 | 3.7105894E−13 | 1.3189721E−14 |
| A16 | −1.1093195E−13 | 2.0416055E−13 | −2.8582230E−14 | −1.9789987E−14 |
| A17 | −2.0838167E−15 | 1.4964872E−14 | −1.8684311E−15 | 1.1141902E−16 |
| A18 | 7.7164688E−16 | −2.1487185E−15 | 1.6679874E−16 | 7.9323252E−17 |
| A19 | 5.5291926E−18 | −5.0592800E−17 | 3.8989609E−18 | −5.3075735E−19 |
| A20 | −2.2362317E−18 | 8.7275034E−18 | −3.8550221E−19 | −1.3413935E−19 |

Example 11

Figure 12:
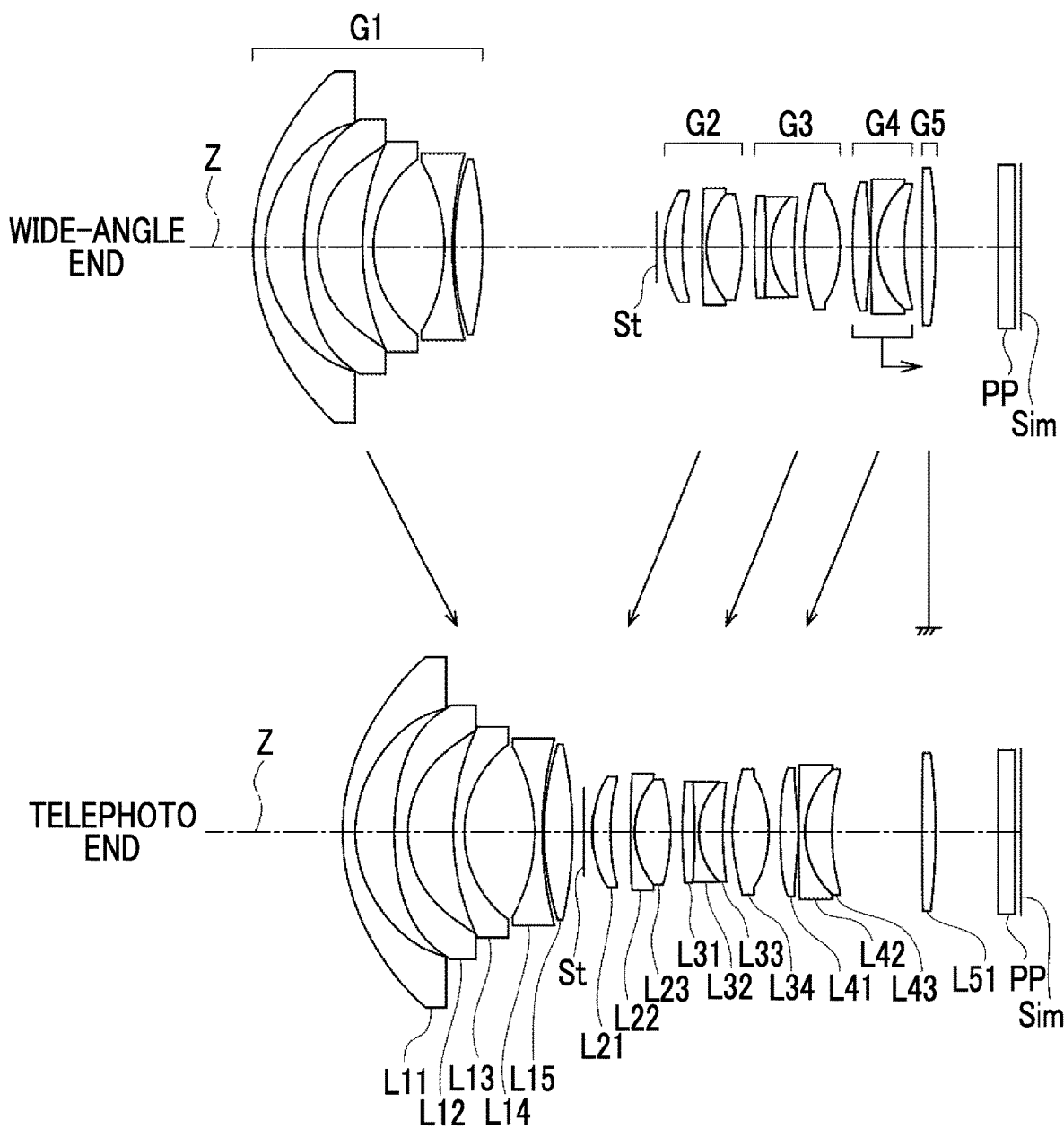
FIG. 12 is a diagram showing cross sections of lens configurations of a zoom lens according to Example 11 of the present invention at the wide-angle end and at the telephoto end and movement loci.
Figure 23:
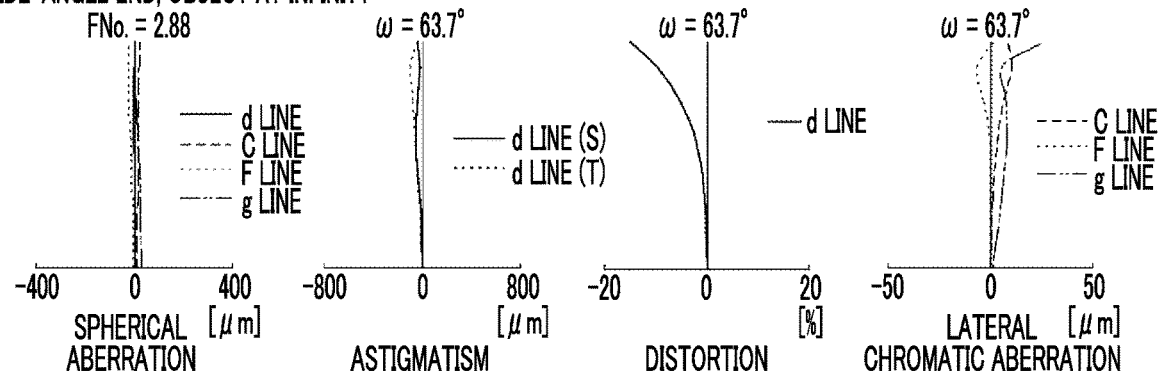
FIG. 23 shows aberration diagrams of the zoom lens according to Example 11 of the present invention.
Figure 23:
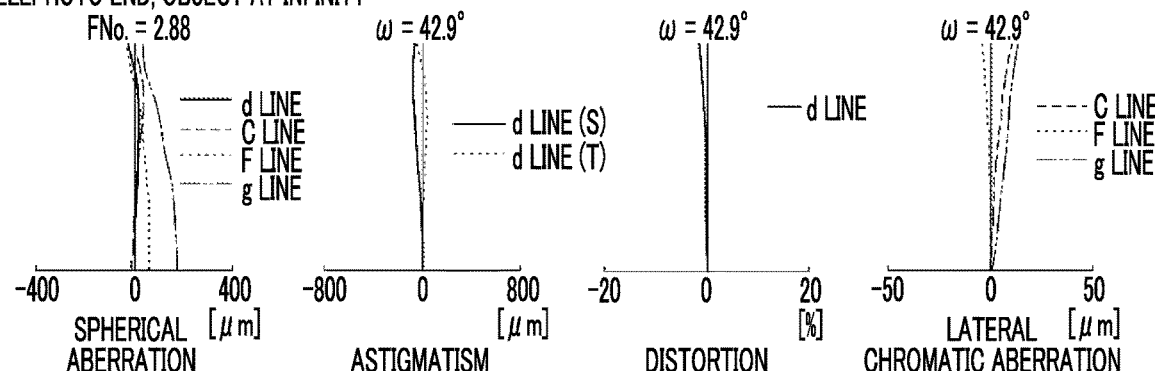
Figure 23:
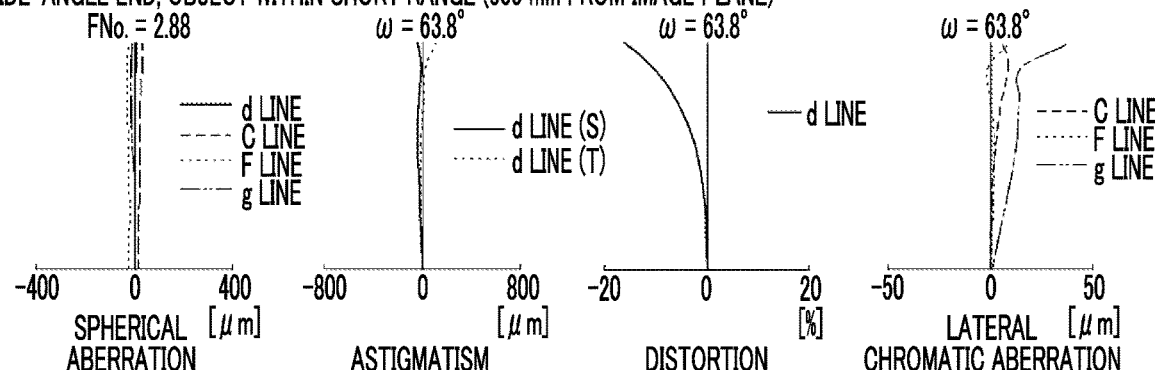
Figure 23:
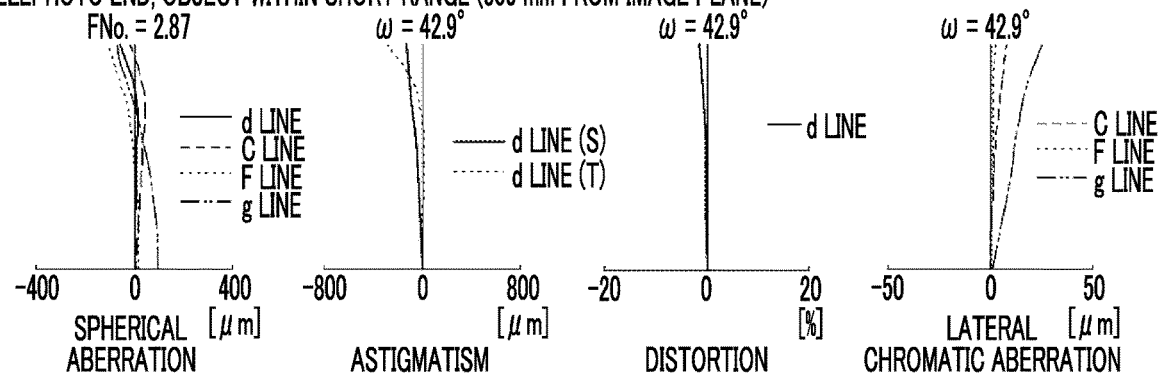

FIG. 12 shows cross sections and schematic movement loci of a zoom lens according to Example 11. The zoom lens according to Example 11 has the same configuration as the outline of the zoom lens according to Example 1 except that a second lens group G2 consists of an aperture stop St and three lenses such as lenses L21 to L23 in order from the object side to the image side, a third lens group G3 consists of four lenses such as lenses L31 to L34 in order from the object side to the image side, and the fourth lens group G4 consists of three lenses such as lenses L41 to L43 in order from the object side to the image side. Table 31 shows basic lens data of the zoom lens according to Example 11, Table 32 shows specifications and variable surface distances, Tables 33 and 34 show aspherical surface coefficients thereof, and FIG. 23 shows aberration diagrams.

TABLE 31

Example 11

| Sn | R | D | Nd | vd | θgF |
|---|---|---|---|---|---|
| *1 | 38.01958 | 2.100 | 1.85344 | 33.58 | 0.58902 |
| *2 | 21.67083 | 6.500 | | | |
| *3 | 49.75342 | 2.262 | 1.78355 | 49.64 | 0.54977 |
| *4 | 18.81885 | 7.613 | | | |
| 5 | 42.22009 | 1.800 | 1.68191 | 57.40 | 0.54263 |
| 6 | 18.94412 | 11.882 | | | |
| 7 | −29.44155 | 1.300 | 1.49700 | 81.54 | 0.53748 |
| 8 | 63.89485 | 0.300 | | | |
| 9 | 50.54214 | 4.750 | 1.91082 | 35.25 | 0.58224 |
| 10 | −70.20454 | DD[10] | | | |
| 11(St) | ∞ | 1.300 | | | |
| *12 | 20.93165 | 3.000 | 1.49710 | 81.56 | 0.53848 |
| *13 | 58.85146 | 3.296 | | | |
| 14 | 174.57085 | 0.710 | 1.81330 | 24.43 | 0.61471 |

TABLE 31-continued

Example 11

| Sn | R | D | Nd | vd | θgF |
|---|---|---|---|---|---|
| 15 | 14.32932 | 6.000 | 1.73658 | 28.17 | 0.60317 |
| 16 | −32.59552 | DD[16] | | | |
| 17 | 96.80123 | 2.010 | 1.58335 | 39.66 | 0.57725 |
| 18 | −143.06846 | 0.710 | 1.77264 | 49.26 | 0.55182 |
| 19 | 12.42943 | 4.000 | 1.49700 | 81.54 | 0.53748 |
| 20 | 57.90386 | 1.628 | | | |
| *21 | 27.68454 | 6.068 | 1.49710 | 81.56 | 0.53848 |
| *22 | −22.01245 | DD[22] | | | |
| *23 | 85.62851 | 3.008 | 1.68948 | 31.02 | 0.59874 |
| *24 | −41.08714 | 0.100 | | | |
| 25 | 500.70959 | 1.010 | 2.00069 | 25.46 | 0.61364 |
| 26 | 14.88552 | 4.500 | 1.49700 | 81.54 | 0.53748 |
| 27 | 40.04588 | DD[27] | | | |
| 28 | 616.37490 | 2.255 | 1.81797 | 32.50 | 0.59283 |
| 29 | −114.53368 | 10.393 | | | |
| 30 | ∞ | 2.850 | 1.51680 | 64.20 | 0.53430 |
| 31 | ∞ | 1.000 | | | |

TABLE 32

Example 11

| | W-Infinity | T-Infinity | W-500 mm | T-500 mm |
|---|---|---|---|---|
| Zr | 1.000 | 1.885 | — | — |
| f | 8.242 | 15.537 | 8.199 | 15.391 |
| FNo. | 2.88 | 2.88 | 2.88 | 2.87 |
| 2ω(°) | 127.4 | 85.8 | 127.6 | 85.8 |
| DD[10] | 29.049 | 1.905 | 29.049 | 1.905 |
| DD[16] | 2.000 | 1.977 | 2.000 | 1.977 |
| DD[22] | 2.090 | 1.999 | 2.364 | 2.521 |
| DD[27] | 3.000 | 15.096 | 2.726 | 14.574 |

TABLE 33

Example 11

| Sn | 1 | 2 | 3 | 4 |
|---|---|---|---|---|
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | 2.3538914E−06 | −6.1204523E−06 | 1.2112840E−05 | 1.3975901E−05 |
| A5 | −3.4907564E−08 | −5.3472016E−08 | −7.4620073E−09 | −1.5061890E−07 |
| A6 | −4.4722488E−09 | −4.3584587E−09 | 6.6324806E−09 | −5.1554822E−09 |
| A7 | 4.3913012E−11 | −9.2519054E−11 | −1.5157417E−10 | 4.2577001E−10 |
| A8 | −2.7550962E−13 | 2.7468421E−12 | 1.0339000E−11 | 2.8085677E−11 |
| A9 | 1.1425808E−15 | −9.1925037E−14 | 1.9791555E−13 | −4.8544102E−13 |
| A10 | −7.8590812E−16 | −1.5338856E−14 | 1.1545987E−14 | −3.1533737E−14 |
| A11 | −4.1648225E−18 | 8.2566210E−18 | 2.9601859E−16 | −2.6247435E−16 |
| A12 | 1.0747580E−18 | −2.3837349E−17 | 5.2816041E−17 | −8.9734797E−16 |
| A13 | −5.0833046E−22 | 1.6661231E−19 | −5.8674993E−19 | −1.1351214E−17 |
| A14 | 1.4697881E−21 | 4.8059808E−20 | 1.5290329E−20 | 6.0284294E−19 |
| A15 | 1.2803528E−24 | 5.8639768E−22 | −5.9878088E−22 | 2.8994109E−21 |
| A16 | 1.3808693E−24 | 2.3949824E−22 | −3.5280410E−23 | −3.8481462E−21 |
| A17 | −2.5706403E−27 | 4.6754151E−25 | −6.8874513E−25 | −1.7011615E−23 |
| A18 | −1.6908626E−28 | 3.0085461E−25 | −8.8996738E−27 | −1.6401607E−23 |

TABLE 33-continued

| | | | | |
|---|---|---|---|---|
| A19 | −5.7251870E−30 | 1.2814567E−27 | 3.2557651E−27 | −3.1846491E−27 |
| A20 | −1.8105323E−30 | −1.9856837E−27 | −3.2952552E−28 | −3.3725389E−26 |
| Sn | 12 | 13 | 21 | 22 |
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | 1.2438273E−05 | 5.7094962E−05 | −3.3920976E−05 | −2.7234264E−05 |
| A5 | 3.2438500E−07 | 3.6641458E−07 | 9.1209364E−08 | −4.7392270E−08 |
| A6 | 6.7064519E−08 | 1.3547340E−07 | −9.1075703E−08 | −1.0451403E−07 |
| A7 | 9.0662184E−09 | −2.0551815E−08 | 6.6879648E−10 | 3.1133983E−10 |
| A8 | 1.8201054E−09 | 9.1324518E−09 | 4.7101690E−10 | −3.3831822E−10 |
| A9 | −1.1401647E−10 | −5.6857535E−10 | 7.4650881E−12 | −2.9938769E−12 |
| A10 | −5.2325496E−11 | −4.6323958E−11 | 9.3430648E−13 | 4.7431754E−12 |
| A11 | −3.1240698E−12 | 2.7073350E−12 | −1.2993896E−13 | −1.3962563E−13 |
| A12 | 1.3366222E−12 | −6.2383808E−13 | −8.7353465E−15 | −8.3874335E−14 |
| A13 | 1.9997329E−15 | 5.8218492E−15 | 1.7710798E−15 | 2.8923215E−15 |
| A14 | −4.1895357E−15 | 1.6006435E−14 | −9.9429173E−16 | −1.0284337E−16 |
| A15 | 3.5085904E−16 | 1.5149915E−15 | 4.2495272E−17 | 8.8453051E−18 |
| A16 | −8.3138080E−17 | −2.4668233E−16 | 1.3131198E−18 | 1.3296931E−18 |
| A17 | −3.8192093E−18 | 1.4115625E−17 | 4.2892092E−20 | −1.7747536E−19 |
| A18 | 1.4963264E−18 | −2.6533787E−18 | 1.3021721E−20 | 3.5448239E−21 |
| A19 | −2.1099707E−19 | −1.6589720E−19 | 2.4739017E−21 | −2.7073562E−21 |
| A20 | 1.4025700E−20 | 3.1529794E−20 | −2.6700698E−22 | 2.5008909E−22 |

TABLE 34

Example 11

| Sn | 23 | 24 |
|---|---|---|
| KA | 1.0000000E+00 | 1.0000000E+00 |
| A3 | 0.0000000E+00 | 0.0000000E+00 |
| A4 | 2.4655987E−05 | 5.9031115E−05 |
| A5 | 1.0515050E−07 | 1.8664432E−07 |
| A6 | 1.0268190E−07 | 1.7747794E−08 |
| A7 | 7.1369499E−11 | 2.7928601E−10 |
| A8 | 4.3488916E−13 | −4.1694372E−10 |
| A9 | 2.7915694E−11 | 4.9870126E−13 |
| A10 | −1.0914253E−12 | 1.1023631E−12 |
| A11 | −3.4033712E−14 | 4.1779752E−14 |
| A12 | −4.8664457E−14 | 3.1863440E−15 |
| A13 | 1.7202965E−15 | 2.9318215E−15 |
| A14 | 9.6695648E−17 | −3.0190039E−16 |
| A15 | −2.4331206E−19 | 1.3471653E−17 |
| A16 | 5.0914166E−18 | −4.7314493E−18 |
| A17 | 2.6786239E−20 | 3.4994751E−19 |
| A18 | −1.7253807E−19 | −1.4489281E−19 |
| A19 | 3.8700030E−21 | 4.4688877E−21 |
| A20 | 7.9498617E−22 | 8.4953025E−22 |

Table 35 shows values corresponding to Conditional Expressions (1) to (12) of the zoom lenses according to Examples 1 to 11. In Examples 1 to 11, the d line is set as the reference wavelength. Table 35 shows the values with the d line as the reference.

TABLE 35

| Expression number | | Example 1 | Example 2 | Example 3 | Example 4 | Example 5 | Example 6 |
|---|---|---|---|---|---|---|---|
| (1) | Nd1ave | 1.798 | 1.798 | 1.886 | 1.799 | 1.803 | 1.799 |
| (2) | \|ff/f1\| | 1.660 | 1.610 | 1.881 | 1.713 | 1.330 | 1.685 |
| (3) | \|(1 − βfw$^2$) × βrw$^2$\| | 1.441 | 1.496 | 1.584 | 1.438 | 1.725 | 1.390 |
| (4) | Nd1amin | 1.693 | 1.693 | 1.814 | 1.694 | 1.600 | 1.694 |
| (5) | vdf | 81.54 | 81.54 | 81.54 | 81.54 | 81.54 | 81.54 |
| (6) | vd1bn | 94.66 | 94.66 | 94.66 | 94.66 | 94.66 | 94.66 |
| (7) | Nd1 | 1.852 | 1.852 | 1.814 | 1.852 | 1.600 | 1.852 |
| (8) | BFw/(fw × tanωw) | 0.736 | 0.735 | 1.089 | 0.735 | 0.714 | 0.729 |
| (9) | tanωw/FNow | 0.676 | 0.677 | 0.613 | 0.677 | 0.613 | 0.695 |
| (10) | (R1 + R2)/(R1 − R2) | 3.750 | 3.800 | 4.484 | 3.613 | 4.315 | 3.450 |
| (11) | \|f1/f2\| | 0.338 | 0.610 | 0.368 | 0.328 | 0.394 | 0.344 |
| (12) | \|f1a/f1b\| | 0.094 | 0.082 | 0.065 | 0.057 | 0.084 | 0.059 |
| Expression number | | Example 7 | Example 8 | Example 9 | Example 10 | Example 11 | |
| (1) | Nd1ave | 1.799 | 1.799 | 1.857 | 1.847 | 1.773 | |
| (2) | \|ff/f1\| | 1.738 | 1.746 | 1.943 | 1.593 | 2.795 | |
| (3) | \|(1 − βfw$^2$) × βrw$^2$\| | 1.364 | 1.354 | 1.554 | 1.641 | 0.636 | |
| (4) | Nd1amin | 1.694 | 1.694 | 1.719 | 1.619 | 1.682 | |
| (5) | vdf | 81.54 | 81.54 | 81.54 | 70.44 | 81.54 | |
| (6) | vd1bn | 94.66 | 94.66 | 94.66 | 70.44 | 81.54 | |
| (7) | Nd1 | 1.852 | 1.852 | 1.719 | 2.001 | 1.835 | |
| (8) | BFw/(fw × tanωw) | 0.735 | 0.735 | 1.087 | 0.703 | 0.795 | |
| (9) | tanωw/FNow | 0.677 | 0.677 | 0.613 | 0.483 | 0.702 | |
| (10) | (R1 + R2)/(R1 − R2) | 3.673 | 3.722 | 4.499 | 4.540 | 3.651 | |

TABLE 35-continued

| (11) | \|f1/f2\| | 0.310 | 0.342 | 0.670 | 0.325 | 0.658 |
|------|-----------|-------|-------|-------|-------|-------|
| (12) | \|f1a/f1b\| | 0.085 | 0.074 | 0.054 | 0.030 | 0.098 |

As can be seen from the above data, in the zoom lenses according to Examples 1 to 11, the maximum full-angle of view in a state in which the object at infinity at the wide-angle end is in focus is equal to or greater than 120 degrees, the wide angle of view is secured, reduction in size is achieved, and various aberrations are satisfactorily corrected. Accordingly, high optical performance is achieved.

Figure 24:
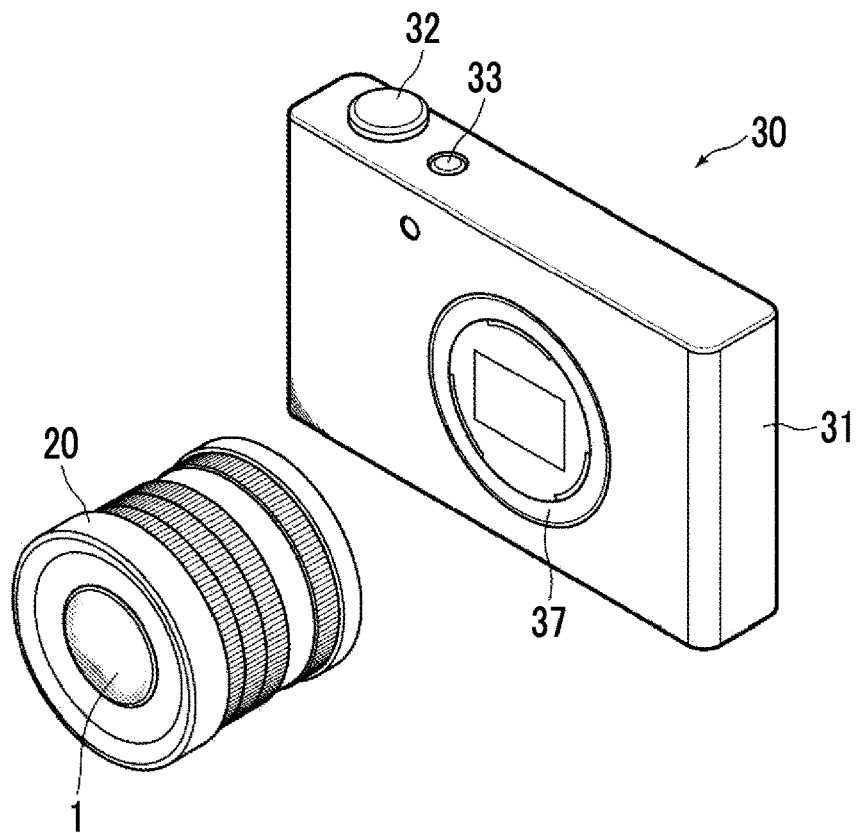
FIG. 24 is a perspective view of an imaging apparatus according to the embodiment of the present invention when viewed from a front side.
Figure 25:
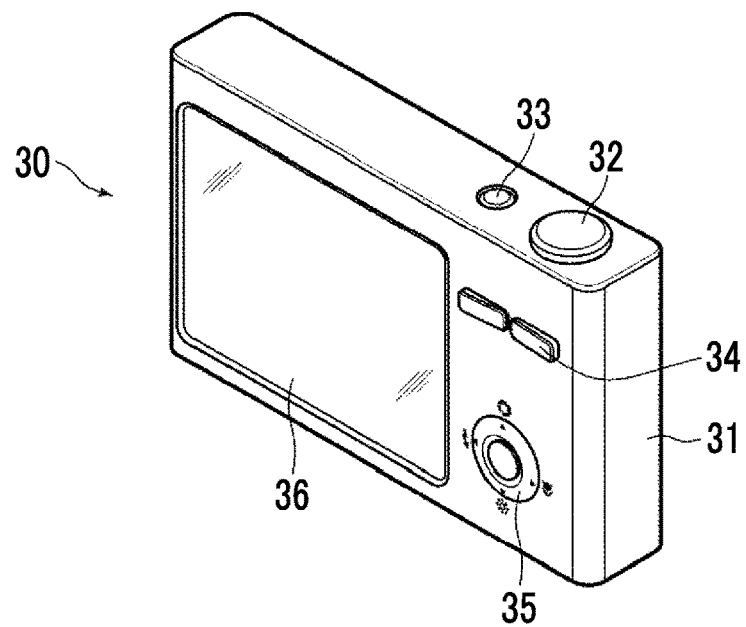
FIG. 25 is a perspective view of the imaging apparatus according to the embodiment of the present invention when viewed from a rear side.

Next, an imaging apparatus according to an embodiment of the present invention will be described. FIGS. 24 and 25 are external views of a camera 30 which is the imaging apparatus according to the embodiment of the present invention. FIG. 24 is a perspective view in a case where the camera 30 is viewed from the front side, and FIG. 25 is a perspective view in a case where the camera 30 is viewed from the rear side. The camera 30 is a mirrorless digital camera to which an interchangeable lens 20 is detachably attached. The interchangeable lens 20 includes the zoom lens 1 according to the embodiment of the present invention which is accommodated in a lens barrel.

The camera 30 comprises a camera body 31, and a shutter button 32 and a power button 33 are provided on the upper surface of the camera body 31. A manipulation unit 34, a manipulation unit 35, and a display unit 36 are provided on the rear surface of the camera body 31. The display unit 36 displays a captured image and an image within an angle of view before the image is captured.

An imaging opening on which rays from an imaging target are incident is formed in the central portion of the front surface of the camera body 31, a mount 37 is provided in a position corresponding to the imaging opening, and the interchangeable lens 20 is attached to the camera body 31 through the mount 37.

An imaging element such as a charge coupled device (CCD) or a complementary metal oxide semiconductor (CMOS) that outputs imaging signals corresponding to a subject image formed by the interchangeable lens 20, a signal processing circuit that generates an image by processing the imaging signals output from the imaging element, and a recording medium for recording the generated image are provided within the camera body 31. In the camera 30, it is possible to image a still image or a motion picture by pressing the shutter button 32, and image data obtained through the imaging is recorded in the recording medium.

The present invention has been hitherto described through embodiments and examples, but the present invention is not limited to the above-mentioned embodiments and examples, and may be modified into various forms. For example, values such as the radius of curvature, the surface distance, the refractive index, the Abbe number, and the aspherical surface coefficient of each lens are not limited to the values shown in the numerical examples, and different values may be used therefor.

The imaging apparatus according to the embodiment of the present invention is not limited to the examples. For example, various aspects such as cameras other than non-reflex cameras, film cameras, video cameras, movie shooting cameras, and broadcasting cameras may be used.

What is claimed is:

1. A zoom lens consisting of:
in order from an object side to an image side,
a first lens group having a negative refractive power;
a second lens group having a positive refractive power; and
a subsequent lens group,
wherein mutual distances between the first lens group, the second lens group, and the subsequent lens group change due to movement of at least the first lens group and the second lens group during zooming,
a focusing lens group disposed so as to be closer to the image side than the first lens group moves during focusing from an object at infinity from an object within a short range,
the first lens group includes a negative lens, a negative lens of which a convex surface faces the object side, and a negative lens, consecutively, in order from a side closest to the object side to the image side,
the first lens group includes a positive lens closest to the image side,
a biconcave lens is disposed so as to be adjacent to an object side of the positive lens closest to an image side in the first lens group,
a total number of cemented lenses, disposed so as to be closer to the image side than the first lens group, consisting of, in order from the object side, one negative lens of which an object-side surface is in contact with air and one positive lens of which an image-side surface is in contact with air, is four, and
assuming that an on-axis air-equivalent distance from a lens surface closest to the image side to an image plane in a state in which the object at infinity at the wide-angle end is in focus is BFw, a focal length of the zoom lens in a state in which the object at infinity at the wide-angle end is in focus is fw, a maximum half-angle of view in a state in which the object at infinity at the wide-angle end is in focus is ωw, and an open F number at the wide-angle end is FNow, Conditional Expressions (8-4) and (9) are satisfied, $$0.714 \leq BFw/(fw \times \tan \omega w) < 1.5 \qquad (8\text{-}4), \text{ and}$$

$$0.45 < \tan \omega w/FNow < 1 \qquad (9).$$

2. The zoom lens according to claim 1,
wherein the subsequent lens group consists of a third lens group having a positive refractive power and a fourth lens group having a negative refractive power, in order from the object side to the image side, and
the third lens group and the fourth lens group move during zooming.

3. The zoom lens according to claim 1,
wherein the subsequent lens group consists of only a third lens group which moves during zooming.

4. The zoom lens according to claim 1,
wherein the subsequent lens group consists of two lens groups having a positive refractive power and one lens group having a negative refractive power,
wherein one of the two lens groups having a positive refractive power is disposed so as to be closest to an object side in the subsequent lens group, and
wherein, of the subsequent lens group, at least one of the two lens groups having a positive refractive power, and the lens group having a negative refractive power, move during zooming.

5. The zoom lens according to claim 1,
wherein Conditional Expression (8-5) is satisfied, $$0.736 \leq BFw/(fw \times \tan \omega w) < 1.3 \qquad (8\text{-}5).$$

6. The zoom lens according to claim 2,
wherein Conditional Expression (8-5) is satisfied, $$0.736 \leq BFw/(fw \times \tan \omega w) < 1.3 \qquad (8\text{-}5).$$

7. The zoom lens according to claim 3,
wherein Conditional Expression (8-5) is satisfied, $$0.736 \leq BFw/(fw \times \tan \omega w) < 1.3 \qquad (8\text{-}5).$$

8. The zoom lens according to claim 5,
wherein a number of focusing lens groups which move during focusing from an object at infinity to an object within a short range is only one, and
the focusing lens group includes a cemented lens.

9. The zoom lens according to claim 6,
wherein a number of focusing lens groups which move during focusing from an object at infinity to an object within a short range is only one, and
the focusing lens group includes a cemented lens.

10. The zoom lens according to claim 7,
wherein a number of focusing lens groups which move during focusing from an object at infinity to an object within a short range is only one, and
the focusing lens group includes a cemented lens.

11. The zoom lens according to claim 1,
wherein a number of focusing lens groups which move during focusing from an object at infinity to an object within a short range is only one, and
the focusing lens group includes a cemented lens.

12. The zoom lens according to claim 2,
wherein a number of focusing lens groups which move during focusing from an object at infinity to an object within a short range is only one, and
the focusing lens group includes a cemented lens.

13. The zoom lens according to claim 3,
wherein a number of focusing lens groups which move during focusing from an object at infinity to an object within a short range is only one, and
the focusing lens group includes a cemented lens.

14. The zoom lens according to claim 4,
wherein a number of focusing lens groups which move during focusing from an object at infinity to an object within a short range is only one,
the focusing lens group includes a cemented lens, and
wherein Conditional Expression (8-5) is satisfied, $$0.736 \leq BFw/(fw \times \tan \omega w) < 1.3 \qquad (8\text{-}5).$$

15. An imaging apparatus comprising a zoom lens,
wherein the zoom lens consists of:
in order from an object side to an image side,
a first lens group having a negative refractive power;
a second lens group having a positive refractive power; and
a subsequent lens group,
wherein mutual distances between the first lens group, the second lens group, and the subsequent lens group change due to movement of at least the first lens group and the second lens group during zooming,
a focusing lens group disposed so as to be closer to the image side than the first lens group moves during focusing from an object at infinity from an object within a short range,
the first lens group includes a negative lens, a negative lens of which a convex surface faces the object side, and a negative lens, consecutively, in order from a side closest to the object side to the image side,
the first lens group includes a positive lens closest to the image side,
a biconcave lens is disposed so as to be adjacent to an object side of the positive lens closest to an image side in the first lens group,
a total number of cemented lenses, disposed so as to be closer to the image side than the first lens group, consisting of, in order from the object side, one negative lens of which an object-side surface is in contact with air and one positive lens of which an image-side surface is in contact with air, is four, and
assuming that an on-axis air-equivalent distance from a lens surface closest to the image side to an image plane in a state in which the object at infinity at the wide-angle end is in focus is BFw, a focal length of the zoom lens in a state in which the object at infinity at the wide-angle end is in focus is fw, a maximum half-angle of view in a state in which the object at infinity at the wide-angle end is in focus is ωw, and an open F number at the wide-angle end is FNow, Conditional Expressions (8-4) and (9) are satisfied, $$0.714 \leq BFw/(fw \times \tan \omega w) < 1.5 \qquad (8\text{-}4), \text{ and}$$

$$0.45 < \tan \omega w/FNow < 1 \qquad (9).$$

16. The imaging apparatus according to claim 15,
wherein the subsequent lens group consists of a third lens group having a positive refractive power and a fourth lens group having a negative refractive power, in order from the object side to the image side, and
the third lens group and the fourth lens group move during zooming.

17. The imaging apparatus according to claim 15,
wherein the subsequent lens group consists of only a third lens group which moves during zooming.

18. The imaging apparatus according to claim 15,
wherein the subsequent lens group consists of two lens groups having a positive refractive power and one lens group having a negative refractive power,
wherein one of the two lens groups having a positive refractive power is disposed so as to be closest to an object side in the subsequent lens group, and
wherein, of the subsequent lens group, at least one of the two lens groups having a positive refractive power, and the lens group having a negative refractive power, move during zooming.

19. The imaging apparatus according to claim 15,
wherein Conditional Expression (8-5) is satisfied, $$0.736 \leq BFw/(fw \times \tan \omega w) < 1.3 \qquad (8\text{-}5).$$

20. The imaging apparatus according to claim 16,
wherein Conditional Expression (8-5) is satisfied, $$0.736 \leq BFw/(fw \times \tan \omega w) < 1.3 \qquad (8\text{-}5).$$

21. The imaging apparatus according to claim 17,
wherein Conditional Expression (8-5) is satisfied, $$0.736 \leq BFw/(fw \times \tan \omega w) < 1.3 \qquad (8\text{-}5).$$

22. The imaging apparatus according to claim 18,
wherein Conditional Expression (8-5) is satisfied, $$0.736 \leq BFw/(fw \times \tan \omega w) < 1.3 \qquad (8\text{-}5).$$

23. The imaging apparatus according to claim 19,
wherein a number of focusing lens groups which move during focusing from an object at infinity to an object within a short range is only one, and
the focusing lens group includes a cemented lens.

24. The imaging apparatus according to claim 20,
wherein a number of focusing lens groups which move during focusing from an object at infinity to an object within a short range is only one, and
the focusing lens group includes a cemented lens.

25. The imaging apparatus according to claim 21,
wherein a number of focusing lens groups which move during focusing from an object at infinity to an object within a short range is only one, and
the focusing lens group includes a cemented lens.

26. The imaging apparatus according to claim 22,
wherein a number of focusing lens groups which move during focusing from an object at infinity to an object within a short range is only one, and
the focusing lens group includes a cemented lens.

27. The imaging apparatus according to claim 15,
wherein a number of focusing lens groups which move during focusing from an object at infinity to an object within a short range is only one, and
the focusing lens group includes a cemented lens.

28. The imaging apparatus according to claim 16,
wherein a number of focusing lens groups which move during focusing from an object at infinity to an object within a short range is only one, and
the focusing lens group includes a cemented lens.

29. The imaging apparatus according to claim 17,
wherein a number of focusing lens groups which move during focusing from an object at infinity to an object within a short range is only one, and
the focusing lens group includes a cemented lens.

30. The imaging apparatus according to claim 18,
wherein a number of focusing lens groups which move during focusing from an object at infinity to an object within a short range is only one, and
the focusing lens group includes a cemented lens.

* * * * *